(12) United States Patent
Saito

(10) Patent No.: US 7,899,273 B2
(45) Date of Patent: Mar. 1, 2011

(54) IMAGE PROCESSING APPARATUS, IMAGE PROCESSING METHOD, AND COMPUTER PROGRAM

(75) Inventor: Yasushi Saito, Saitama (JP)

(73) Assignee: Sony Corporation, Tokyo (JP)

( * ) Notice: Subject to any disclaimer, the term of this patent is extended or adjusted under 35 U.S.C. 154(b) by 775 days.

(21) Appl. No.: 11/778,782

(22) Filed: Jul. 17, 2007

(65) Prior Publication Data

US 2008/0107357 A1 May 8, 2008

(30) Foreign Application Priority Data

Jul. 21, 2006 (JP) ............................. P2006-199925

(51) Int. Cl.
*G06K 9/32* (2006.01)

(52) U.S. Cl. ......... 382/300; 382/274; 382/275; 358/463; 358/525

(58) Field of Classification Search .................. 382/274, 382/275, 282, 300; 358/3.26, 3.27, 463, 358/525

See application file for complete search history.

(56) References Cited

U.S. PATENT DOCUMENTS

| 7,085,430 B2 * | 8/2006 | Winsor et al. ................ 382/275 |
| 7,149,355 B2 * | 12/2006 | Kubota ......................... 382/199 |
| 7,239,908 B1 * | 7/2007 | Alexander et al. ............ 600/427 |
| 7,263,397 B2 * | 8/2007 | Hauck et al. .................. 600/374 |
| 7,418,131 B2 * | 8/2008 | Wang et al. ................... 382/165 |

FOREIGN PATENT DOCUMENTS

| JP | 05-207271 | 8/1993 |
| JP | 11-191861 | 7/1999 |
| JP | 2000-224460 | 8/2000 |
| JP | 2001-8037 | 1/2001 |
| JP | 2005-038396 | 2/2005 |
| JP | 2005-326977 | 11/2005 |

OTHER PUBLICATIONS

Japanese Office Action for Japanese Patent Application No. 2006-199925, Japanese Patent Office, Jul. 6, 2010.

* cited by examiner

*Primary Examiner* — Yosef Kassa
(74) *Attorney, Agent, or Firm* — Finnegan, Henderson, Farabow, Garrett & Dunner, L.L.P.

(57) ABSTRACT

An image processing apparatus that generates an output image according to interpolation performed by using an input image includes a pixel-value calculating unit that calculates a pixel value of a pixel of the output image according to interpolation performed by using pixel values of pixels of the input image and an interpolation function, an edge determining unit that determines an edge direction, which is a direction of an edge in the pixel of the output image, using the input image, and an adjusting unit that adjusts the interpolation function such that a degree of pixels of the input image present in a direction along the edge direction contributing to the interpolation is large and a degree of pixels of the input image present in a direction orthogonal to the edge direction contributing to the interpolation is small.

7 Claims, 24 Drawing Sheets

IMAGE PROCESSING APPARATUS, IMAGE PROCESSING METHOD, AND COMPUTER PROGRAM

CROSS-REFERENCES TO RELATED APPLICATIONS

The present invention contains subject matter related to Japanese Patent Application JP 2006-199925 filed in the Japanese Patent Office on Jul. 21, 2006, the entire contents of which being incorporated herein by reference.

BACKGROUND OF THE INVENTION

1. Field of the Invention

The present invention relates to an image processing apparatus, an image processing method, and a computer program. More particularly, the present invention relates to an image processing apparatus, an image processing method, and a computer program that make it possible to obtain high-quality images in a digital still camera and the like.

2. Description of the Related Art

For example, when a user photographs an image with a digital still camera or the like held by the hand, if an exposure time inevitably becomes long because an amount of light is insufficient, an image photographed by the digital still camera may be blurred because of hand shake. In order to prevent such a blurred image from being formed, there is a method of obtaining an image without a blur by, so to speak, superimposing plural dark images continuously photographed with an exposure time short enough for preventing the image from being affected by hand shake (see, for example, JP-A-2005-38396).

In the method disclosed in JP-A-2005-38396, plural times of photographing are temporally continuously performed by a digital still camera to obtain temporally continuous plural photographed images as plural input images. With one of the plural photographed images set as a reference image, overall movements of the respective plural photographed images with respect to the reference image are calculated. Positioning of the plural photographed images is performed on the basis of the movements. One image (an output, image) is obtained by superimposing (combining) the plural photographed images after the positioning.

FIG. 1 snows a method of obtaining an output image in the case in which there are two photographed images.

In FIG. 1, two photographed images $P_1$ and $P_2$ are photographed images continuously photographed by a digital still camera. In the photographed images $P_1$ and $P_2$, positions of subjects deviate from each other because of hand shako or the like.

When, for example, the photographed image $P_1$ of the two photographed images $P_1$ and $P_2$ is set as a reference image, movements of the respective photographed images $P_1$ and $P_2$ with respect to the reference image are calculated. Positioning of the photographed images $P_1$ and $P_2$ is performed on the basis of the movements to superimpose the subjects in the two photographed images $P_1$ and $P_2$. An output image $P_{out}$ is obtained by super imposing the photographed images $P_1$ and $P_2$ after the positioning.

In this case, the plural photographed images are photographed with a short exposure time. However, the plural photographed images may foe photographed with proper exposure. When the plural photographed images are photographed with the proper exposure and superimposed as described above, it is possible to obtain an output image with a high S/N (signal to Noise ratio).

When the positioning of the plural photographed images is performed and the plural photographed images after the positioning are superimposed to generate one output image as described above, positions of pixels of the plural photographed images after the positioning do not always coincide with positions of pixels of the output image.

Therefore, if a pixel for which a pixel value is calculated among the pixels of the output image is referred to as pixel of interest, superimposition of the plural photographed images after the positioning is performed by interpolating the pixel value of the pixel of interest using, among the pixels of the plural photographed images (hereinafter also referred to as photographed pixels as appropriate) after the positioning, pixel values of photographed pixels in positions near the position of the pixel of interest.

Examples of a method of the interpolation of the pixel value of the pixel of interest include a method of performing a simple addition for directly adding up pixel values of one or more photographed pixels in positions near the position of the pixel of interest and a method of performing interpolation using pixel values of one or more photographed pixels in positions near the position of the pixel of interest and an interpolation function.

The interpolation function is a function that changes according to a relative position of the photographed pixel used for the interpolation with respect to the pixel of interest of (a distance between the pixel used for the interpolation and the pixel of interest). For example, a linear function represented by a primary expression, a cubic function, and the like are used. The simple addition is equivalent to using a function with a value of 1 as the interpolation function regardless of the (relative) position of the photographed pixel used for the interpolation.

SUMMARY OF THE INVENTION

When an output image is calculated by interpolation performed by using photographed images, granular noise called zipper noise and false colors may appear in an output image unless high-frequency components of the photographed images used for the interpolation are controlled to some extent. As a result, the output, image may be an unnatural image.

In particular, when, for example, a single plate sensor having a color array such as the Bayer array is adopted as an imaging device of a digital still camera used for the photographing of the photographed images, the photographed images are images in which respective pixels have, as a pixel value, only one color signal (color component) among an R (Red) signal, a G (Green) signal, and a B (Blue) signal. In interpolation performed by using such photographed images, zipper noise and false colors may appear conspicuously.

On the other hand, if the high-frequency components of the photographed images used for the interpolation are controlled excessively, edges are blurred and an image quality of an output image is deteriorated.

Therefore, it is desirable to make it possible to obtain a high-quality image according to interpolation.

According to an embodiment of the present invention, there is provided an image processing apparatus that generates an output image according to interpolation performed by using an input image, the image processing apparatus including pixel-value calculating means for calculating a pixel value of a pixel of the output image according to interpolation performed by using pixel values of pixels of the input image and an interpolation function, edge determining means for determining an edge direction, which is a direction of an edge in the pixel of the output image, using the input image, and adjusting means for adjusting the interpolation function such that a degree of pixels of the input image present in a direction along the edge direction contributing to the interpolation is large and a degree of pixels of the input, image present, in a direction orthogonal to the edge direction contributing to the interpolation is small.

According to another embodiment of the invention, there is provided an image processing method of generating an output image according to interpolation performed by using an input image or a computer program for causing a computer to execute image processing for generating an output image according to interpolation performed by using an input image, the image processing method or the computer program including a pixel-value calculating step of calculating a pixel value of a pixel of the output image according to interpolation performed by using pixel values of pixels of the input image and an interpolation function, an edge determining step of determining an edge direction, which is a direction of an edge in the pixel of the output image, using the input, image, and an adjusting step of adjusting the interpolation function such that a degree of pixels of the input image present in a direction along the edge direction contributing to the interpolation is large and a degree of pixels of the input image present in a direction orthogonal to the edge direction contributing to the interpolation is small.

It is possible to record the computer program in various recording media. It is possible to transmit the computer program via various transmission media.

According to the embodiments of the present invention, a pixel value of a pixel of the output image is calculated by the interpolation performed by using pixel values of pixels of an input image and the interpolation function. In calculating the pixel value, an edge direction, which is a direction of an edge in the pixel of the output image, is determined using the input image. The interpolation function is adjusted such that a degree of pixels of the input image present in a direction along the edge direction contributing to the interpolation is large and a degree of pixels of the input image present in a direction orthogonal to the edge direction contributing to the interpolation is small.

According to the embodiments of the present invention, it is possible to obtain a high-quality image according to the interpolation.

DESCRIPTION OF THE PREFERRED EMBODIMENTS

Figure 1:
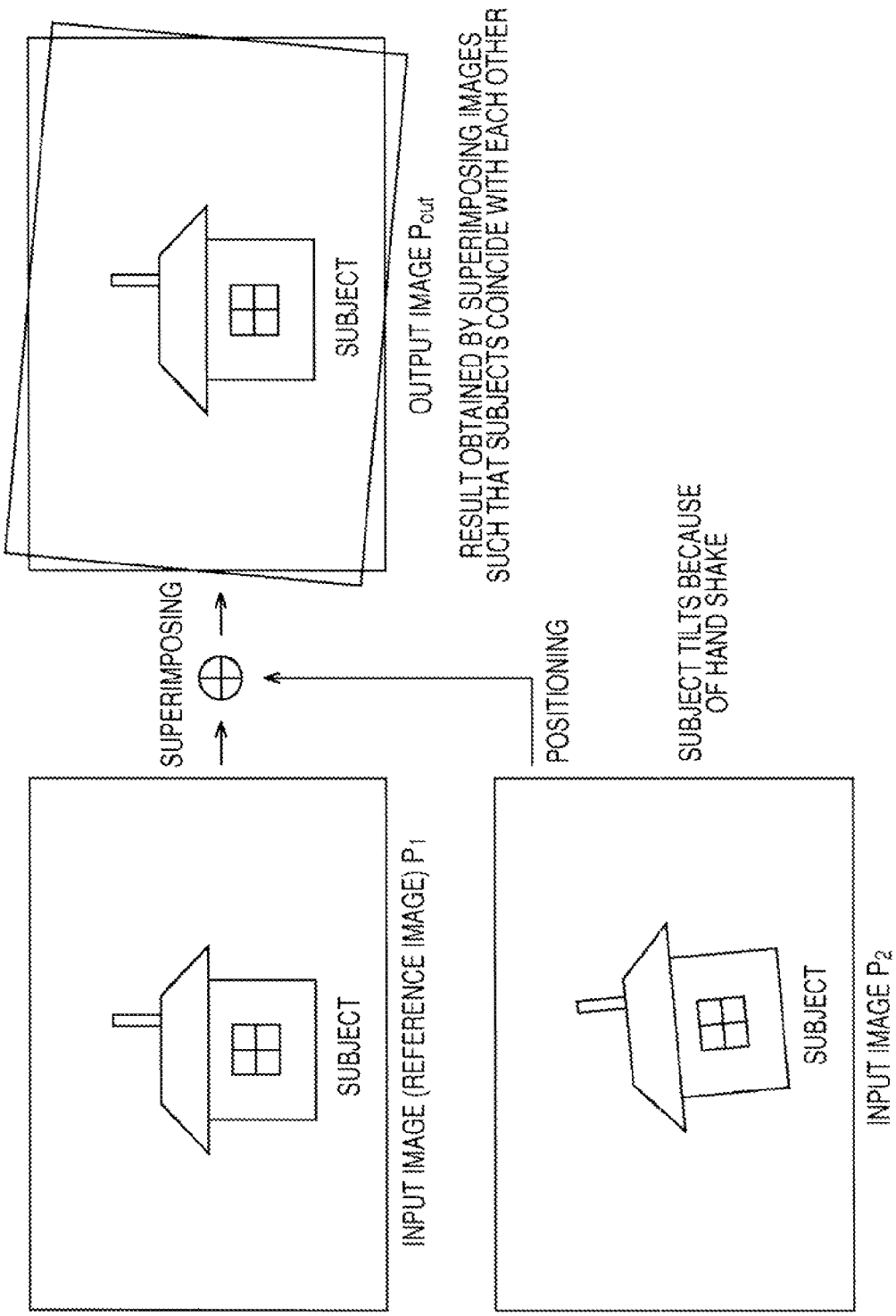
FIG. 1 is a diagram for explaining a method of obtaining an output image in the case in which there are two photographed images.

Embodiments of the present invention will be hereinafter explained. A correspondence relation between elements of the present invention and the embodiments described or shown in the specification or the drawings is described as follows. This description is a description for confirming that the embodiments supporting the present invention are described or shown in the specification or the drawings. Therefore, even if there is an embodiment that is described or shown in the specification or the drawings but is not described herein as an embodiment corresponding to an element of the present invention, this does not means that the embodiment does not correspond to the element. Conversely, even if an embodiment is described herein as an embodiment corresponding to an element of the present invention, this does not means that the embodiment does not correspond to elements other than the element.

An image processing apparatus according to an embodiment of the present invention is an image processing apparatus (e.g., a digital still camera 1 in FIG. 2) that generates an output image according to interpolation performed by using an input image. The image processing apparatus includes pixel-value calculating means (e.g., an arithmetic circuit 24 in FIG. 5 that executes processing in steps S106, S108, and 8110 in FIG. 17 and processing in steps S202 to S206 and step S210 in FIG. 23) for calculating a pixel value of a pixel of the output image according to interpolation performed by using pixel values of pixels of the input image and an interpolation function, edge determining means (e.g., the arithmetic circuit 24 in FIG. 5 that executes processing in step S102 in FIG. 17 and processing in step S207 in FIG. 23) for determining an edge direction, which is a direction of an edge in the pixel of the output image, using the input image, and adjusting means (e.g., the arithmetic circuit 24 in FIG. 5 that executes processing in step S104 in FIG. 17 and processing in steps S202 to S206 in FIG. 23) for adjusting the interpolation function such that a degree of pixels of the input image present in a direction along the edge direction contributing to the interpolation is large and a degree of pixels of the input, image present in a direction orthogonal to the edge direction contributing to the interpolation is small.

In the image processing apparatus, it is possible to provide detecting means (e.g., a signal processing circuit 7 in FIG. 2 that executes processing in step S3 in FIG. 3) for detecting a positional relation among plural input images continuously photographed by an imaging unit which takes an image.

In this case, it is possible to cause the adjusting means to adjust the interpolation function such that, among pixels of the plural input images after positioning obtained by performing positioning of the plural input images on the basis of the positional relation, a degree of pixels present in a direction along the edge direction contributing to the interpolation is large and a degree of pixels present in a direction orthogonal to the edge direction contributing to the interpolation is small. It is possible to cause the pixel-value calculating means to calculate a pixel value of a pixel of the output image according to interpolation performed by using pixel values of pixels of the plural input images and the interpolation function.

An image processing method or a computer program according to another embodiment of the invention is an image processing method of generating an output image according to interpolation performed by using an input image or a computer program for causing a computer to execute image processing for generating an output image according to interpolation performed by using an input image. The image processing method or the computer program includes a pixel-value calculating step (e.g., processing in steps S106, S108, and S110 in FIG. 17 and processing in steps S202 to S206 and step S210 in FIG. 23) of calculating a pixel value of a pixel of the output image according to interpolation performed by using pixel values of pixels of the input image and an interpolation function, an edge determining step (e.g., processing in step S102 in FIG. 17 and processing in step S207 in FIG. 23) of determining an edge direction, which is a direction of an edge in the pixel of the output image, using the input image, and an adjusting step (e.g., processing in step S104 in FIG. 17 and processing in steps S202 to S206 in FIG. 23) of adjusting the interpolation function such that a degree of pixels of the input, image present in a direction along the edge direction contributing to the interpolation is large and a degree of pixels of the input image present in a direction orthogonal to the edge direction contributing to the interpolation is small.

Embodiments of the present invention will be hereinafter explained with reference to the drawings.

Figure 2:
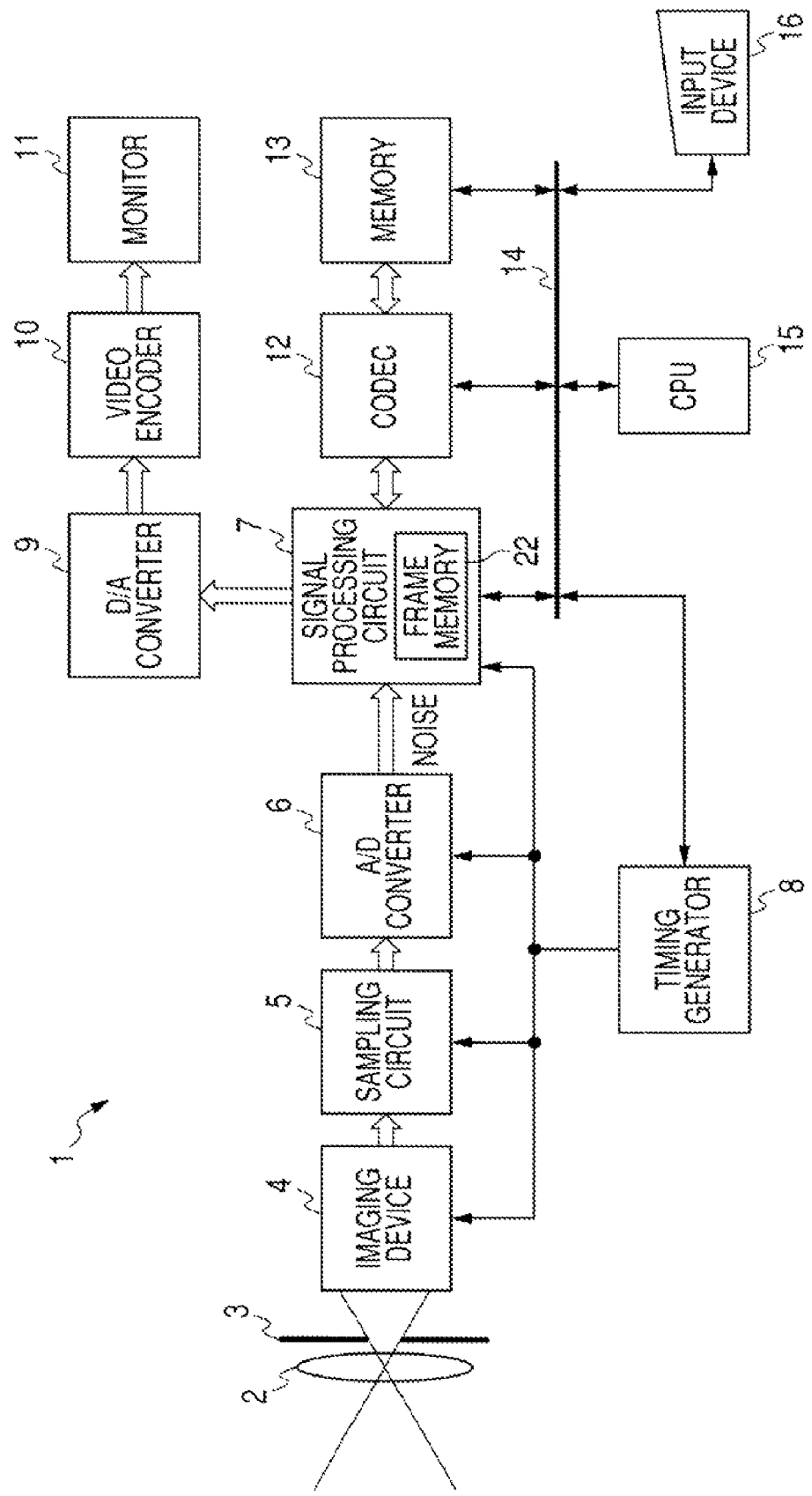
FIG. 2 is a block diagram showing an example of a structure of a digital still camera according to a first embodiment of the present invention.

FIG. 2 is a block diagram showing an example of a structure of a digital still camera according to an embodiment of the present invention.

A digital still camera 1 in FIG. 2 includes a lens 2, a stop 3, an imaging device 4, a correlated double sampling circuit 5, an A/D (Analog/Digital) converter 6, a signal processing circuit 7, a timing generator 8, a D/A (Digital/Analog) converter 9, a video encoder 10, a monitor 11, a CODEC 12, a memory 13, a bus 14, a CPU (Central Processing Unit) 15, and an input device 16. The signal processing circuit 7 has a frame memory 22.

Light from a not-shown subject passes through an optical system of the lens 2, the stop 3, and the like and is made incident, on the imaging device 4. The imaging device 4 is constituted by a single plate sensor formed by a CCD (Charge Coupled Device), a CMOS (Complementary Metal Oxide Semiconductor), or the like and has a predetermined number of pixels (light receiving elements).

The imaging device 4 receives the light of the subject made incident, thereon at a predetermined interval and for a predetermined time (shutter time) in accordance with an exposure timing signal supplied from the timing generator 8. Moreover, the imaging device 4 converts a light reception amount of the light received by the respective light receiving elements serving as the pixels into an image signal as an electric signal according to photoelectric conversion and supplies the image signal to the correlated double sampling circuit 5. The imaging device 4 is, for example, the single plate sensor. The image signal supplied from the imaging device 4 to the correlated double sampling circuit 5 is a color signal (data) of any one of an R signal, a G signal, and a B signal for one pixel.

Even if camera shake (hand shake) occurs, in order to output a clearer image, the imaging device 4 performs, by performing photographing once (operating a release button once), imaging K times at speed higher than a shutter speed in proper exposure (in a shutter time shorter than a shutter time (exposure time) in proper exposure), Consequently, the imaging device 4 outputs image signals of R photographed images in time series as input images to be inputs to the signal processing circuit 7 at the post stage.

The correlated double sampling circuit 5 removes noise components of the image signals of the photographed images supplied from the imaging device 4 according to correlated double sampling and supplies the image signals to the A/D converter 6.

A/D converter 6 subjects the image signals supplied from the correlated double sampling circuit 5 to A/D conversion, i.e., sampling and quantizes the image signals.

The A/D converter 6 subjects (the digital image signals of) the photographed images after the A/D conversion to, for example, bit shift to increase a gain of the photographed images to have photographed images of proper exposure and supplies the photographed images to the signal processing circuit 7.

The signal processing circuit 7 is constituted by, for example, a DSP (Digital Signal Processor). The Signal processing circuit 7 temporarily stores the photographed images supplied from the A/D converter 6 in the frame memory 22 built therein and applies predetermined image processing to the photographed images.

As described above, the imaging device 4 outputs the N photographed images in time series in one photographing. Thus, the M photographed images are sequentially supplied to the signal processing circuit 7 from, the imaging device 4 through the sampling circuit 5 and the A/D converter 6.

The signal processing circuit 7 supplies the N photographed images supplied thereto to the frame memory 22 built therein and causes the frame memory 2 to temporarily store the N photographed images. Moreover, the signal processing circuit 7 applies predetermined image processing to the N photographed images stored in the frame memory 22.

The signal processing circuit 7 sets, for example, a first photographed image among the N photographed images as a reference image and sets second to Nth photographed images as target images, respectively. The signal processing circuit 7 detects what kind of positional deviation the targets images cause with respect to the reference image, respectively, i.e., a positional relation between the reference image and the target images (a positional relation of an identical subject in the reference image and the target images).

The signal processing circuit 7 obtains an output image having all a G signal, an R signal, and a B signal for one pixel, which is one clear image with camera shake corrected, on the basis of the positional relation between the reference image and the target images. The signal processing circuit 71 supplies the output image to one or both, of the D/A converter 9 and the CODEC 12.

The timing generator 8 supplies an exposure timing signal to the imaging device 4, the correlated double sampling circuit 5, the A/D converter 6, and the signal processing circuit 7 such that high-speed imaging for the N photographed images is performed at predetermined intervals in one photographing. A user can change an exposure time of the high-speed imaging (or the number N of photographed images imaged by the high-speed imaging) according to, for example, brightness of a subject. When the user changes the exposure time of the high-speed imaging, the user operates the input device 16 to supply a changed value of the exposure time determined by the CPU 15 from the CPU 15 to the timing generator 8 through the bus 14.

The D/A converter 9 subjects an image signal of an output image supplied from the signal processing circuit 7 to D/A conversion and supplies the image signal to the video encoder 10.

The video encoder 10 converts the image signal (the analog signal) supplied from the D/A converter 9 into an image signal that can be displayed on the monitor 11 and supplies the image signal to the monitor 11. The monitor 11 plays a role of a finder or the like of the digital still camera 1. The monitor 11 is constituted by an LCD or the like and displays an image signal supplied from the video encoder 10. Consequently, the output image is displayed on the monitor 11.

The CODEC 12 encodes the image signal of the output image supplied from the signal processing circuit 7 in accordance with a predetermined system such as the JPEG (Joint Photographic Experts Group) system and supplies the image signal to the memory 13.

The memory 13 is constituted by a semiconductor memory such as a flash memory and stores (records) the encoded image signal supplied from the CODEC 12. It is possible to use a recording medium such as a magnetic disk or an optical (magneto-optical) disk instead of the memory 13. The memory 13 or the recording medium, used instead of the memory 13 is detachably insertable in the digital still camera 1. It is possible to provide both the recording medium built in the digital still camera 1 and the recording medium detachably insertable in the digital still camera 1.

The CPU 15 supplies control signals to the respective units through the bus 14 and controls various kinds of processing. For example, the CPU 15 supplies the control signals to the respective units such that the subject is photographed in accordance with an operation signal for starting photographing supplied from the input device 16 according to operation of the user and an output image finally obtained by the photographing is stored in the memory 13.

The input device 16 has operation buttons such as a release button provided in a main body of the digital still camera 1. Various operation signals generated by the operation of the operation buttons by the user are supplied from the input device 16 to the CPU 15 through the bus 14. The CPU 15 controls the respective units to execute processing conforming to the various operation signals supplied from the input device 16 through the bus 14. It is possible to display one or more operation buttons of the input device 16 on the monitor 11. For example, a transparent tablet is provided on the monitor 11. It is possible to detect, the operation of the operation buttons displayed on the monitor 11 using the tablet.

Photographing processing of the digital still camera I will be explained with reference to a flowchart in FIG. 3.

First, in step S1, the imaging device 4 photographs a subject. In photographing per formed by depressing the release button (a shutter button) once, the imaging device 4 receives light of the subject continuously made incident thereon N times at predetermined intervals in accordance with an exposure timing signal supplied from the timing generator 8 and photoelectrically converts the light to perform high-speed imaging N times. Therefore, H photographed images are obtained in one photographing and the respective photographed images are dark images with exposure equal to or lower than (or lower than) proper exposure. Image signals of the N photographed images obtained by the photoelectric conversion in the imaging device 4 are sequentially supplied to the correlated double sampling circuit 5 and, after noise components are removed, supplied to the A/D converter 6.

Thereafter, the processing proceeds from step S1 to step S2. The A/D converter 6 subjects image signals of the N photographed images sequentially supplied from the correlated double sampling circuit 5 to A/D conversion. Thereafter, the A/D converter 6 subjects the dark photographed images with exposure equal to or lower than the proper exposure to bit shift to convert the dark photographed images into image signals with brightness of the proper exposure and supplies the image signals to the signal processing circuit 7. The processing proceeds to step S3.

In step S3, the signal processing circuit 7 sets, for example, a first photographed image among the N photographed images from the A/D converter 6 as a reference image and detects what kind of positional deviation the N photographed images cause with respect to the reference image, respectively, i.e., a positional relation of the N photographed images to the reference image. The processing proceeds to step S4.

In step S4, the signal processing circuit 7 performs image generation processing for generating one output image from the N photographed images on the basis of the N photographed images and the positional relation of the N photographed images detected in step S3. The processing proceeds to step S5.

Although details of the image generation processing will be described later, an output image having all of a G signal, an R signal, and a B signal for one pixel, which is one clear image without camera shake (with little camera shake) and with the proper exposure, is generated by this image generation processing. An image signal of the output image obtained by the image generation processing is supplied from the signal processing circuit 7 to one or both of the D/A converter 9 and the CODEC 12.

In step S5, the output image obtained by the signal processing circuit 7 is displayed on the monitor 11 and recorded in the memory 13 such as a flash memory. Then, the processing is finished.

In step S5, the image signal supplied from the signal processing circuit 7 to the D/A converter 9 in step S4 is converted into an analog signal and supplied to the video encoder 10. Moreover, in step S5, the video encoder 10 converts the analog image signal supplied from the D/A converter 9 into an image signal that can be displayed on the monitor 11 and supplies the image signal to the monitor 11. In step S5, the monitor 11 displays an output image on the basis of the image signal supplied from the video encoder 10. In step S5, predetermined encoding of JPEG or the like is applied to the image signal supplied from the signal processing circuit 7 to the CODEC 12 in step S4 and the image signal is recorded in the memory 13 such as a flash memory.

Figure 4:
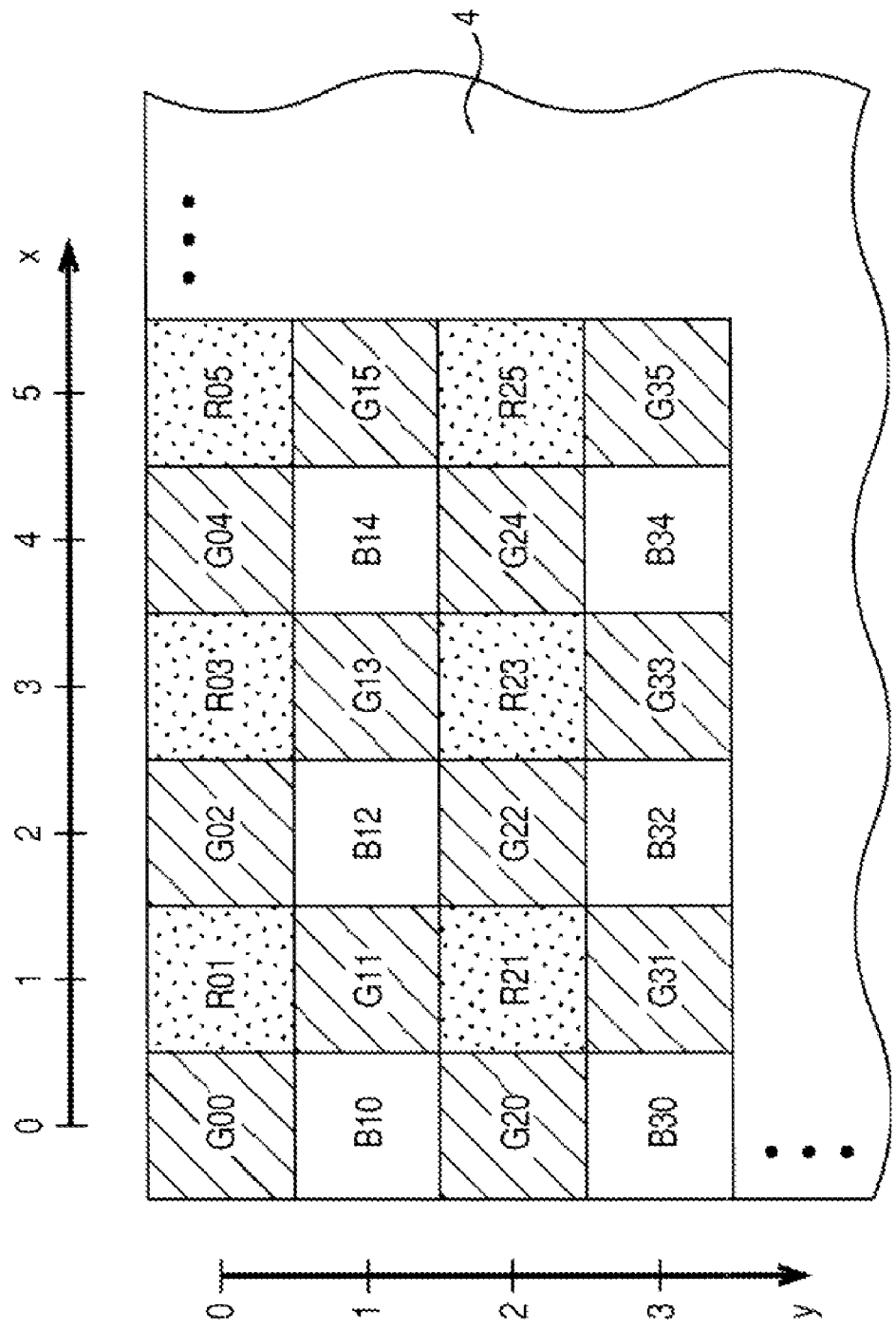
FIG. 4 is a diagram showing an array of pixels of an imaging device 4 in FIG. 2.

FIG. 4 shows an array of pixels of the imaging device 4 in FIG. 2.

In FIG. 4, pixels in a portion at the upper left of the imaging device 4 (six pixels in the horizontal direction and the four pixels in the vertical direction; twenty-four pixels in total) are shown. Pixels in other portions are arranged in the same way.

In FIG. 4, with the center (the center of gravity) of the pixels at the upper left of the imaging device 4 as an origin, an xy coordinate system with the horizontal (right) direction set as an x direction and the vertical (down) direction set as a y direction is set. It is assumed that the pixels have a rectangular shape and the lengths (the widths) in the horizontal and vertical direction of one pixel is 1, respectively.

When a position of a pixel is represented by a coordinate of the center of gravity of the rectangle as the pixel having the lengths in the horizontal and vertical direction of 1, (a coordinate of) a position (x,y) of a pixel ith from the left and jth from the top can be represented as (i−1,j−1).

In FIG. 4, an array of the pixels of the imaging device 4 is a so-called Bayer array. The array of the pixels of the imaging device 4 is not 1 limited to the Bayer array and may be other arrays.

An image having pixel values of color signals corresponding to positions of pixels is outputted from the imaging device 4 of the Bayer array.

In the Bayer array, as pixels from which the G signal can be extracted, a pixel G00 that is a pixel first in the x direction and first in the y direction from the origin, a pixel G02 that is a pixel third in the x direction and first in the y direction from the origin, a pixel G04 that is a pixel fifth in the x direction and first in the y direction from the origin, and a pixel G11 that is a pixel second in the x direction and second in the y direction from the origin are arranged. In the same manner, a pixel G13, a pixel G15, a pixel G20, a pixel G22, a pixel G24, a pixel G31, a pixel G33, and a pixel G35 are arranged.

As pixels from which the R signal can be extracted, a pixel R01 that is a pixel second in the x direction and first in the y direction from the origin, a pixel R03 that is a pixel fourth in the x direction and first in the y direction from the origin, a pixel R05 that is a pixel sixth in the x direction and first in the y direction from the origin, and a pixel R21 that is a pixel second in the x direction and third in the y direction from the origin are arranged. In the same manner, a pixel R23 and a pixel R25 are arranged.

As pixels from, which the B signal can be extracted, a pixel B10 that is a pixel first in the x direction and second in the y direction from the origin, a pixel B12 that is a pixel third in the x direction and second in the y direction from the origin, a pixel B14 that is a pixel fifth in the x direction and second in the y direction from the origin, and a pixel B30 that is a pixel first in the x direction and fourth in the y direction from the origin are arranged. In the same manner, a pixel B32 and a pixel B34 are arranged.

It is assumed here that the imaging device A is an imaging device in which the G signal, the R signal, and the B signal are obtained in respective pixels. An ideal image photographed without camera shake and with the proper exposure using such an imaging device 4 is assumed. The G signal, the R signal, and the B signal of the ideal image are represented as Lg(x,y), Lr(x,y), and Lb(x,y), respectively, using a position (x,y) on an xy coordinate system with the imaging device 4 set as a reference.

Figure 3:
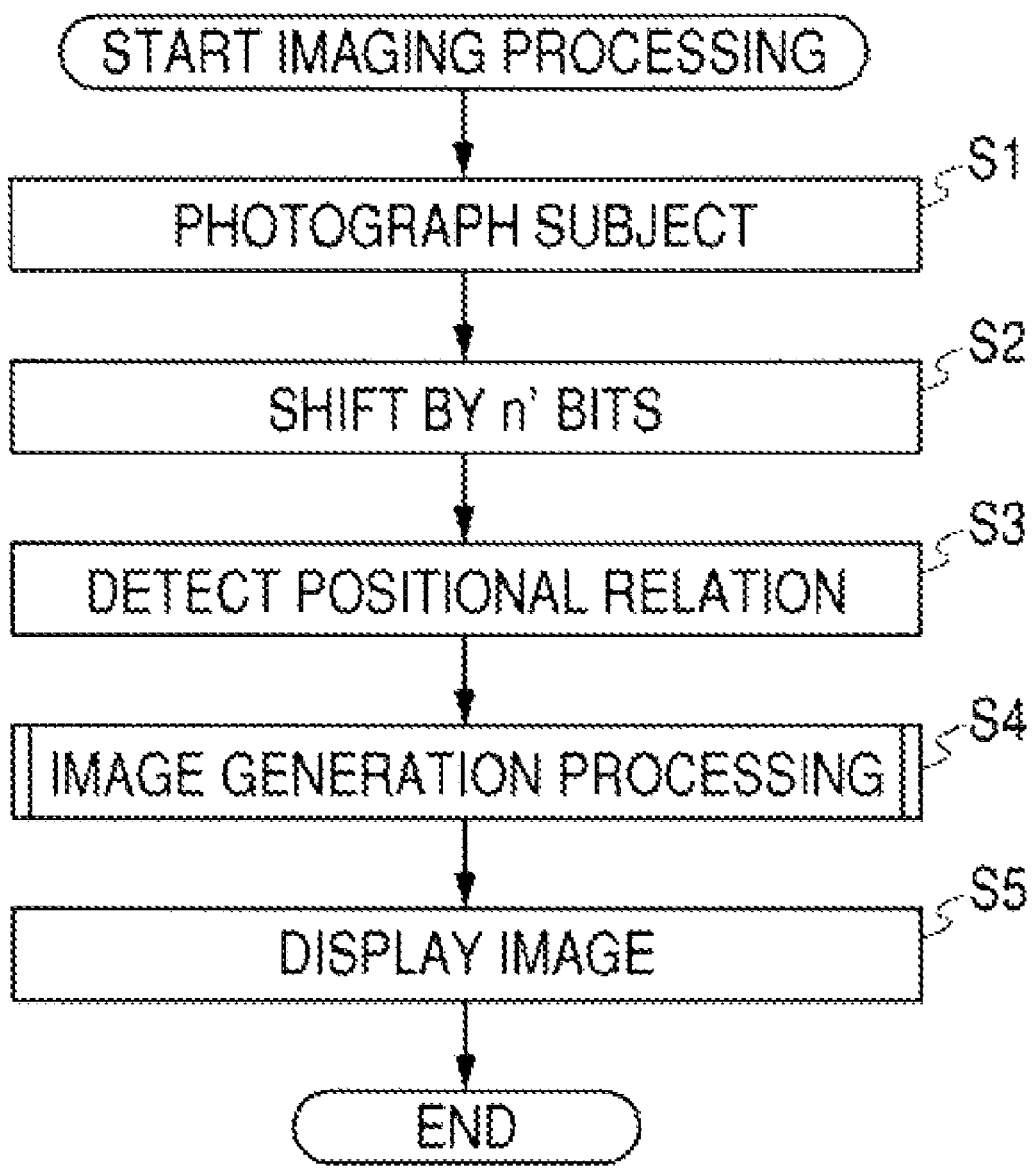
FIG. 3 is a flowchart for explaining photographing processing of a digital still camera 1 in FIG. 2.

This ideal image is an output image that is desired to be obtained in the image generation processing in step S4 in FIG. 3. The G signal, the R signal, and the B signal of an "i+1th and j+1th pixel" i+1th from the left and j+1th from the top of the output image can be represented as Lg(i,j), Lr(i,j), Lb(i,j), respectively.

When the "i+1th and j+1th pixel" i+1th from the left and j+1th from the top of the imaging device 4 is a pixel that outputs the G signal, i and j representing a position of the pixel are also described as ig and jg, respectively. Similarly, when the "i+1th and j+1th pixel" i+1th from the left and j+1th from the top of the imaging device 4 is a pixel that outputs the R signal, i and j representing a position of the pixel are also described as ir and j r, respectively. When the "i+1th and j+1th pixel" i+1th from the left and j+1th from the top of the imaging device 4 is a pixel that outputs the B signal, i and j representing a position of the pixel are also described, as in and jb, respectively.

A combination of the variables ig and jg is equal to a combination of the variables i and j representing the position of the pixel that outputs the G signal. A combination of the variables ir and jr is equal to a combination of the variables i and j representing the position of the pixel that outputs the R signal. A combination of the variables ib and jb is equal to a combination of the variables i and j representing the position of the pixel that outputs the B signal.

When the imaging device 4 is an imaging device of the Bayer array as described above, the variables ig and jg are the variables i and j that satisfy a condition that a difference (i−j) between the variables i and j is an even number. The variables ir and jr are the variables i and j that satisfy a condition that the variable i is an even number and a difference (i−j) between the variables i and j is an odd number. Moreover, the variables ib and jb are the variables i and j that satisfy a condition that the variable i is an odd number and a difference (i−j) between the variables i and j is an even number.

However, when the imaging device 4 is a single plate sensor of an array other than the Bayer array, conditions of the variables i and j forming the variables ig and jg, the variables ir and jr, and the variables ib and jb are different according to characteristics of the array.

When an "if 1th and j+1th pixel" i+1th from the left and j+1th from the top of a kth (k=1, 2, ..., N) photographed image among the N photographed images outputted by the imaging device 4 in one photographing is a pixel having only the G signal as a pixel value, the G signal as the pixel value is represented as Gobs(k,i,j).

Similarly, when the "i+1th and j+1th pixel" i+1th from the left and j+1th from the top of the kth photographed image is a pixel having only the R signal as a pixel value, the R signal as the pixel value is represented as Robs(k,i,j). When the "i+1th and j+1th pixel" i+1th from the left and j+1th from the top of the kth photographed image is a pixel having only the B signal as a pixel value, the S signal as the pixel value is represented as Bobs(k,i,j).

The pixel values Gobs(k,i,j), Robs(k,i,j), and Bobs(k,i,j) can also be represented as Gobs(k,ig,jg), Robs(k,ir,jr), and Bobs(k,ib,jb).

Figure 5:
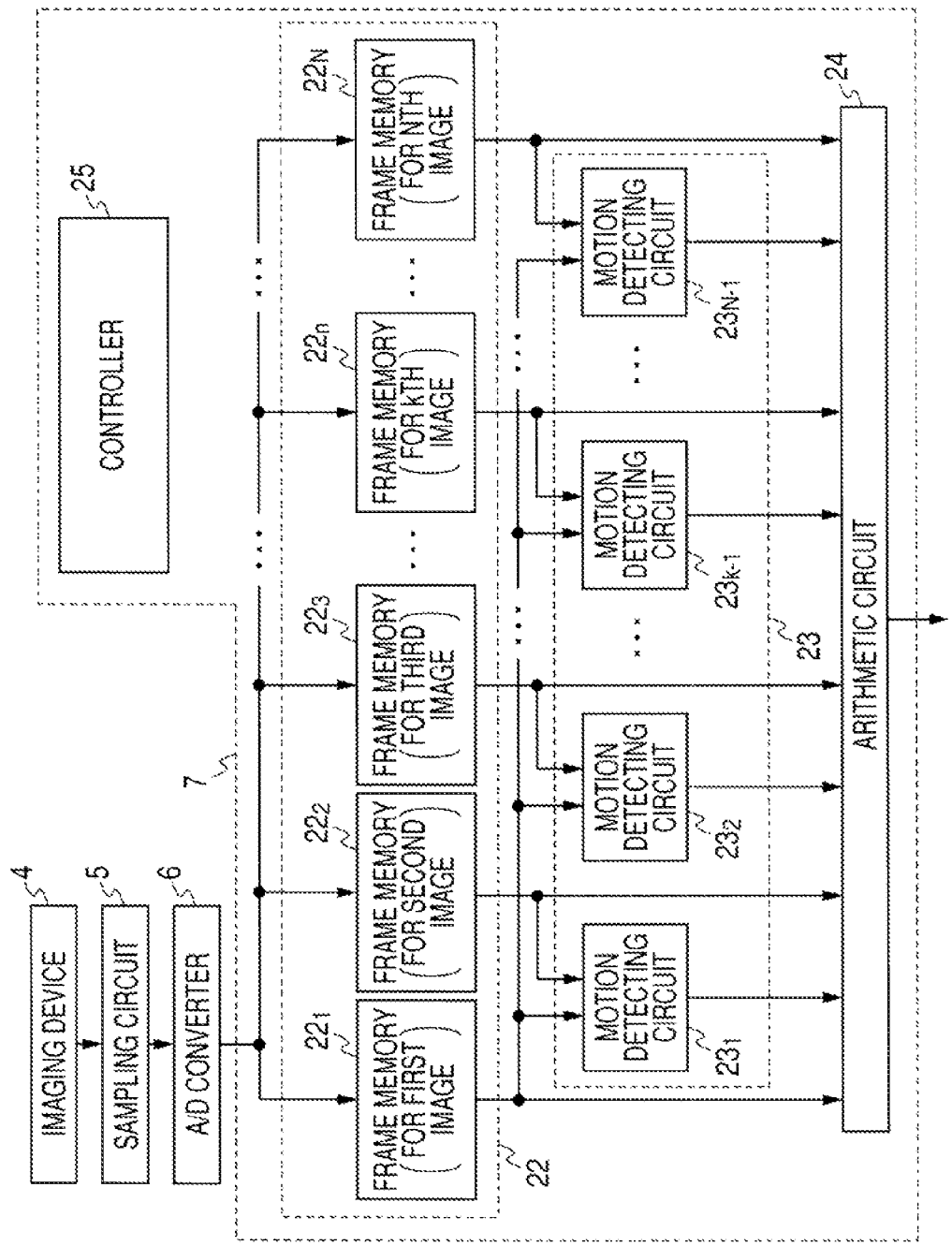
FIG. 5 is a block diagram showing an example of a detailed structure of a signal processing circuit 7 in FIG. 2.

FIG. 5 shows an example of a detailed structure of a part of the signal processing circuit 7 in FIG. 2.

The signal processing circuit 7 includes the frame memory 22, a motion detecting circuit 23, an arithmetic circuit 24, and a controller 25. The frame memory 22 includes N frame memories $22_1$ to $22_N$. The motion detecting circuit 23 includes N−1 motion detecting circuits $23_1$ to $23_{N-1}$).

As described above, the N photographed images are sequentially supplied from the A/D converter 6 to the frame memory 22. The frame memory $22_1$ temporarily stores a first photographed image supplied from the A/D converter 6. The frame memory $22_2$ stores a second photographed image supplied from the A/D converter 6. In the same manner, the frame memory $22_k$ stores a kth photographed image supplied from the A/D converter 6.

The frame memory $22_1$ supplies the first photographed image stored therein to the arithmetic circuit 24 and the motion detecting circuits $23_1$ to $23_{N-1}$ at predetermined timing. The frame memory $22_2$ supplies the second photographed image stored therein to the arithmetic circuit 24 and the motion detecting circuit $23_1$ at predetermined timing. In the same manner, the frame memory $22_k$ supplies the kth photographed image stored therein to the arithmetic circuit 24 and the motion detecting circuits $23_{k-1}$ at predetermined timing.

The motion detecting circuit 23 detects a positional relation between two photographed images. The motion detecting circuit 23 sets the first photographed image as a reference image serving as a reference for detection of the positional relation and sets the second to Nth photographed images as target images. The motion detecting circuit 23 detects deviation amounts of positional deviation of the target images with respect to the reference image indicating what kind of positional deviation the targets images (the second to Nth images) cause with respect, to the reference image. The deviation is caused by hand shake.

The motion detecting circuit 23 detects a positional relation between the reference image and the target images on the basis of the deviation amounts of the positional deviation of the target images with respect, to the reference image.

In a state in which the camera is aimed at the subject, as components of the positional deviation of the images caused by hand shake, there are a translation component generated when the camera deviates to the left and right and a rotation component around an optical axis of a lens generated when the camera rotates in the clockwise direction or the counter-clockwise direction. There are also a rotation component around an axis perpendicular to the optical axis of the lens of the camera and an expansion and reduction component due to the movement in the depth direction of the camera.

The positional relation between the reference image and the target image in which hand shake occurs can be represented by, for example, affine transformation. In the affine transformation, a positional relation between a position (x,y) on the reference image and a position (x',y') on the target images is represented by the following Equation (1).

$$\begin{pmatrix} x \\ y \end{pmatrix} = \begin{pmatrix} a & b \\ c & d \end{pmatrix} \begin{pmatrix} x' \\ y' \end{pmatrix} + \begin{pmatrix} s \\ t \end{pmatrix} \quad (1)$$

For example, when $a = K \times \cos\theta$, $b = -K \times \sin\theta\theta$, $c = K \times \sin\theta$, and $d = K \times \cos\theta$ in Equation (1), Equation (1) represents the affine transformation for applying rotation at an angle $\theta$, translation of (s,t), and expansion and reduction of K times with respect to the position (x',y').

A matrix (a,b,c,d) and a two-dimensional vector (s,t) of the affine transformation are collectively referred to as transformation parameters (a,b,c,d,s,t) as appropriate.

The affine transformation of Equation (1) defined by the transformation parameters represents a positional relation between the reference image and the target image. The motion detecting circuit 23 calculates the transformation parameters defining Equation (1), for example, as described below.

The motion detecting circuit 23 divides the target images into plural blocks and detects motion vectors of the respective blocks with respect, to the reference image as deviation amounts of positional deviation of the target images with respect to the reference image.

The motion detecting circuit 23 calculates, as the positional relation, the transformation parameters (a,b,c,d,s,t) of Equation (1) for minimizing a sum of square errors between a position (x'',y'') after moving (positions) of the respective pixels (x',y') of the target images onto the reference image in accordance with the motion vectors of the respective blocks of the target images and positions (x,y) after converting the respective pixels x',y') of the target images into positions (x,y) on the reference image according to Equation (1).

Specifically, the first photographed image as the reference image is supplied to the motion detecting circuit $23_1$ from the frame memory $22_1$. The second photographed image as the target image is supplied to the motion detecting circuit $23_1$ from the frame memory $22_2$.

The motion detecting circuit $23_1$ detects motion vectors indicating which positions of the first photographed image the respective blocks obtained by dividing the second photographed image into plural blocks correspond to. In other words, the motion detecting circuit $23_1$ detects a position on the first photographed image in which a portion identical with a portion of the subject projected in a certain position of the second photographed image is projected. The motion detecting circuit $23_1$ calculates, on the basis of the motion vectors as a result of the detection, transformation parameters ($a_2,b_2,c_2,d_2,s_2,t_2$) defining Equation (2) identical with Equation (1) representing a positional relation between the first photographed image and the second photographed image and supplies the transformation parameters to the arithmetic circuit 24.

$$\begin{pmatrix} x_{1(2)} \\ y_{1(2)} \end{pmatrix} = \begin{pmatrix} a_2 & b_2 \\ c_2 & d_2 \end{pmatrix} \begin{pmatrix} x_2 \\ y_2 \end{pmatrix} + \begin{pmatrix} s_2 \\ t_2 \end{pmatrix} \quad (2)$$

As in the case of the imaging device 4 in FIG. 4, as a coordinate system of an image, with the center of pixels at the upper left of the image set as an origin, an xy coordinate system with the horizontal direction (the right direction) set as an x direction and the vertical direction (the down direction) set as a y direction is defined. Then, in Equation (2), $(x_2,y_2)$ represents a position of a pixel of the second photographed image on the coordinate system of the second photographed image and $(x_{1(2)},y_{1(2)})$ represents the position at the time when the position $(x_2,y_2)$ of the pixel of the second photographed image is converted into a position where an identical portion of the subject is projected on the coordinate system of the first photographed image. The subscript (2) in the position $(x_{1(2)}, y_{1(2)})$ indicates that the position $(x_2,y_2)$ on the coordinate system of the second photographed image is converted into a position on the coordinate system of the first photographed image. A portion identical with the portion of the subject projected in the position $(x_2,y_2)$ of the pixel of the second photographed image is (ideally) projected in the position $(x_{1(2)},y_{1(2)})$ on the coordinate system of the first photographed image.

The first photographed image as the reference image is supplied to the motion detecting circuit $23_2$ from the frame memory $22_1$. The third photographed image as the target image is supplied to the motion defecting circuit $23_2$ from the frame memory $22_3$.

Like the motion detecting circuit $23_1$, the motion detecting circuit $23_2$ detects motion vectors indicating which positions of the first photographed image respective blocks obtained by dividing the third photographed image into plural blocks correspond to. The motion detecting circuit $23_2$ calculates, on the basis of the motion vectors, transformation parameters $(a_3,b_3,c_3,d_3,s_3,t_3)$ defining the affine transformation of Equation (3) identical with Equation (1) representing a positional relation between the first photographed image and the third photographed image and supplies the transformation parameters to the arithmetic circuit 24.

$$\begin{pmatrix} x_{1(3)} \\ y_{1(3)} \end{pmatrix} = \begin{pmatrix} a_3 & b_3 \\ c_3 & d_3 \end{pmatrix} \begin{pmatrix} x_3 \\ y_3 \end{pmatrix} + \begin{pmatrix} s_3 \\ t_3 \end{pmatrix} \quad (3)$$

In Equation (3), $(x_3,y_3)$ represents a position of a pixel of the third photographed image on the coordinate system of the third photographed image and $(x_{1(3)},y_{1(3)})$ represents the position at the time when the position $(x_3,y_3)$ of the pixel of the third photographed image is converted into a position where an identical portion of the subject is projected on the coordinate system of the first photographed image. As in the case of the Equation (2), the subscript (3) in the position $(x_{1(3)},y_{1(3)})$ indicates that the position $(x_3,y_3)$ on the coordinate system of the third photographed image is converted into a position on the coordinate system of the first photographed image.

In the same manner, the motion detecting circuit $23_{k-1}$ detects a positional relation between the first photographed image and the kth photographed image and supplies the positional relation to the arithmetic circuit 24.

The first photographed image as the reference image is supplied to the motion detecting circuit $23_{k-1}$ from the frame memory $22_1$. The kth photographed image as the target image is supplied to the motion detecting circuit $23_{k-1}$ from the frame memory $22_k$.

The motion detecting circuit $23_{k-1}$ detects motion vectors of respective blocks of the kth photographed image with respect to the first photographed image. The motion detecting circuit $23_{k-1}$ calculates, on the basis of the motion vectors, transformation parameters $(a_k,b_k,c_k,d_k,s_k,t_k)$ defining the affine transformation of Equation (4) identical with Equation (1) representing a positional relation between the first photographed image and the kth photographed image and supplies the transformation parameters to the arithmetic circuit 24.

$$\begin{pmatrix} x_{1(k)} \\ y_{1(k)} \end{pmatrix} = \begin{pmatrix} a_k & b_k \\ c_k & d_k \end{pmatrix} \begin{pmatrix} x_k \\ y_k \end{pmatrix} + \begin{pmatrix} s_k \\ t_k \end{pmatrix} \quad (4)$$

In Equation (4), $(x_k,y_k)$ represents a position of a pixel of the kth photographed image on the coordinate system of the kth photographed image and $(x_{1(k)},y_{1(k)})$ represents the position at the time when the position $(x_k,y_k)$ of the pixel of the kth photographed image is converted into a position where an identical portion of the subject is projected on the coordinate system of the first photographed image. As in the case of the Equation (2), the subscript (k) in the position $(x_{1(k)},y_{1(k)})$ indicates that the position $(x_k,y_k)$ on the coordinate system of the kth photographed image is converted into a position on the coordinate system of the first photographed image.

The N photographed images are supplied to the arithmetic circuit 24 from the frame memories $22_1$ to $22_N$. The transformation parameters $(a_k,b_k,c_k,d_k,s_k,t_k)$ representing the positional relation between the first photographed image and the kth photographed image are supplied to the arithmetic circuit 24 from the motion detecting circuits $23_1$ to $23_{N-1}$.

The arithmetic circuit 24 calculates the G signal, the R signal, and the B signal as the pixel values of the pixels of an output image using at least the pixel values of the pixels of the photographed images supplied from the frame memories $22_1$ to $22_N$ and the interpolation function that changes according to positions of the pixels of the photographed images after positioning. The positions of the pixels are obtained by performing positioning of the N photographed images on the basis of the transformation parameters $(a_k,b_k,c_k,d_k,s_k,t_k)$ representing the positional relation between each of the second to Nth photographed images supplied from the motion detecting circuits $23_1$ to $23_{N-1}$ and the first photographed image. The arithmetic circuit 24 performs image generation processing for generating an output image and supplies the output image obtained as a result of the image generation processing to the D/A converter 9 or the CODEC 12.

Each of the N photographed images supplied from the A/D converter 6 to the signal processing circuit 7 is an image, one pixel of which has a pixel value of any one of the G signal, the R signal, and the B signal. On the other hand, the output image generated by the arithmetic circuit 24 is an image having three pixel values (color signals) of the G signal, the R signal, and the B signal for one pixel.

The controller 25 performs control of the frame memories $22_1$ to $22_N$, the motion detecting circuits $23_1$ to $23_{N-1}$, the arithmetic circuit 24, and the like in the signal processing circuit 7 in accordance with the control by the CPU 15.

In the signal processing circuit 7 constituted as described above, in step S3 in FIG. 3, the motion detecting circuit 23 detects transformation parameters as a positional relation among the N photographed images from the A/D converter 6.

Moreover, in the signal processing circuit 7, in step S4 in FIG. 3, the arithmetic circuit 24 calculates the G signal, the R signal, and the B signal as pixel values of pixels of an output image using pixel values of the pixels of the photographed images, the interpolation function that changes according to positions of the pixels of the photographed images after positioning obtained by performing positioning of the N photographed images on the basis of the transformation parameters, and the like. The arithmetic circuit 24 performs the image generation processing for generating an output image.

In other words, in the image generation processing in step S4, the arithmetic circuit 24 generates, from the N photographed images, a photographed image serving as a reference in detecting the positional relation among the N photographed images, i.e., an image in a range of the subject photographed in the first photographed image as an output image.

In generating the output image from the N photographed images, the arithmetic circuit 24 calculates pixel values of respective pixels of the output image by interpolation.

In order to calculate the pixel values of the output image by interpolation in this way, the arithmetic circuit 24 performs positioning for converting (positions of) the pixels of the N photographed images into positions on the output image, i.e., positions on the first photographed image as the reference image such that respective portions of the subject projected on the respective N photographed images coincide with (correspond to) one another.

In the following explanation, a kth photographed image among the N photographed images used for generation of the output image is also referred to as a kth image as appropriate.

In the arithmetic circuit 24, the conversion of the position of the pixels of the M photographed images into the positions on the output image, which are the positions on the first photographed image as the reference image, i.e., the positioning of the N photographed images is performed according to the affine transformation of Equation (1) defined by the transformation parameters calculated by the motion detecting circuit 23 (FIG. 5).

The arithmetic circuit 24 calculates the G signal Lg(i,j) among the pixel values of the pixels in the positions (i,j) on the coordinate system of the output image by interpolation performed by using the G signal Gobs(k,i,j)=Gobs(k,ig,jg) (k=1, 2, ..., N) among the pixel values of the pixels in the positions after the affine transformation obtained by affine-transforming the positions of the pixels of the N photographed images.

Similarly, the arithmetic circuit 24 calculates the R signal Lr(i,j) among the pixel values of the pixels in the positions (i,j) on the coordinate system of the output image by interpolation performed by using the R signal Robs(k,i,j)=Robs(k,ir,jr) among the pixel values of the pixels in the positions after the affine transformation obtained by affine-transforming the positions of the pixels of the N photographed images. The arithmetic circuit 24 calculates the B signal Lb(i,j) among the pixel values of the pixels in the positions (i,j) on the coordinate system of the output image by interpolation performed by using the B signal Bobs(k,i,j)=Bobs(k,ib,jb).

In the coordinate system of the output image, which is the coordinate system of the reference image, a position (i−1,j−1) of an "ith and jth pixel" of the output image is represented as (I',J'). In other words, I'=i−1 and J'=j−1, I' and J' are integers equal to or larger than 0.

In the following explanation, the coordinate system of the output image, which is the coordinate system of the reference image, is also referred to as a reference coordinate system as appropriate. The pixels of the output image are also referred to as output pixels as appropriate.

The arithmetic circuit 24 affine-transforms (the positions) of the pixels of the first to Nth images into the positions on the reference coordinate system. The arithmetic circuit 24 calculates a G signal Lg(I',J') of the output pixel in the position (I',J') on the reference coordinate by interpolation performed by using the G signals Gobs(k,ig,jg) in the positions after the affine transformation.

However, accuracy of interpolation is deteriorated if all the G signals Gobs(k,ig,jg) of the pixels in the positions after the affine transformation onto the reference coordinate system of the pixels of the first to Nth images are used for the interpolation of the G signal Lg(I',J') of the output pixel in the position (I',J') on the reference coordinate system.

Thus, the arithmetic circuit 24 specifies pixels of the first to Nth images, positions of which after the affine transformation onto the reference coordinate system of the pixels of the first to Nth images are near the position (I',J') of the output pixel for interpolating the G signal Lg(I',J'), as pixels used for the interpolation of the G signal Lg(I',J'). The arithmetic circuit 24 interpolates the G signal Lg(I',J') using the G signals Gobs(k,ig,jg) of the pixels of the first to Nth images specified.

Specifically, the arithmetic circuit 24 sets an area near the position (I',J') of the reference coordinate system as a contributing area in which pixels contributing to interpolation of a pixel value of the output pixel in the position (I',J') are present. The arithmetic circuit 24 specifies pixels of the first to Nth images, positions of which after the affine transformation onto the reference coordinate system are in the contributing area, as pixels used for the interpolation of the pixel value of the output pixel in the position (I',J').

Figure 6:
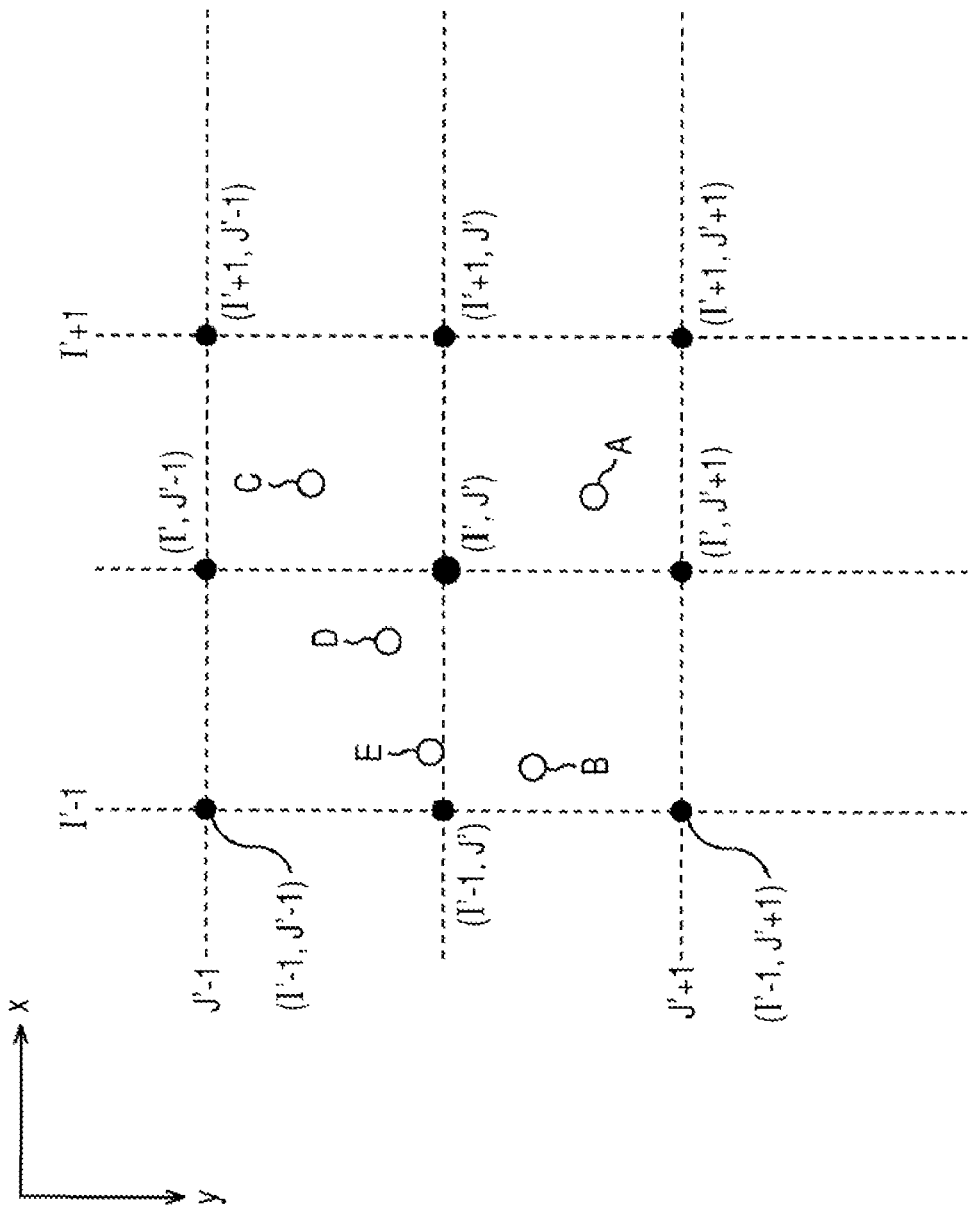
FIG. 6 is a diagram showing a reference coordinate system in which positions of pixels are plotted.

FIG. 6 shows a reference coordinate system in which positions of the pixels of the first to Nth images used for the interpolation of the pixel value of the output pixel in the position (I',J') by the arithmetic circuit 24 are plotted.

The arithmetic circuit 24 sets, for the position (I',J') on the reference coordinate system, an area of a range 2×2 around the position (I',J') satisfying, for example, an expression I'−1≦x<I'+1 and an expression J'−1≦y<J'+1 as a contributing area. The arithmetic circuit 24 specifies pixels of the first to Nth images, positions of which after the affine transformation onto the reference coordinate system are in the contributing area, as pixels used for the interpolation of the G signal Lg(I',J') of the output pixel.

In other words, the arithmetic circuit 24 calculates, for the position (I',J'), all sets of integers k, ig, and jg, with which the positions (x,y) on the reference coordinate system obtained by affine-trans forming the position (ig−1,jg−1) with the transformation parameters $(a_k, b_k, c_k, d_k, s_k, t_k)$ satisfy the expression I'−1≦x<I'+1 and the expression J'−1≦y<J'+1. The arithmetic circuit 24 specifies pixels represented by (k,ig, jg) as pixels used for the interpolation of the G signal Lg(I',J') of the output pixel.

In FIG. 6, there are five G pixels A, B, C, D, and E as pixels, positions of which after the affine transformation onto the reference coordinate system are in the contributing area in the range of the expression I'−1≦x<I'+1 and the expression J'−1≦y<J'+1, among pixels having the G signals as pixels values (hereinafter also referred, to as G pixels as appropriate) in the pixels of the first to Nth images.

Therefore, the arithmetic circuit 24 specifies the five G pixels A to E as pixels used for the interpolation of the G signal Lg(I', J').

The arithmetic circuit 24 interpolates the G signal Lg(I',J') of the output pixel in the position (I',J') using the pixel values (G signals) Gobs(k,ig,jg) of the respective G pixels A to E.

In FIG. 6, the area of the range of 2×2 around the position (I',J') is adopted as the contributing area for the position (I',J'). However, the contributing area for the position (I',J') only has to be an area near the position (I',J') and is not limited to the area of the range of 2×2 around the position (I',J'). In other words, in FIG. 6, as the contributing area for the position (I',J'), other than the area of the range of 2×2 around the position it is possible to adopt, for example, an area of a range of 4×4 around the position (I',J'), i.e., an area satisfying an expression I'−2≦x<1'+2 and an expression J'−2≦y<J'+2, and an area of a range of 1×1.

An interpolation method of interpolating the G signal Lg(I',J') in the position (I',J') using the pixel values (G signals) Gobs(k,ig,jg) of the G pixels, the positions of which after the affine transformation onto the reference coordinate is in the contributing area, among the G pixels of the first to Nth images will be explained with reference to FIG. 7.

Figure 7:
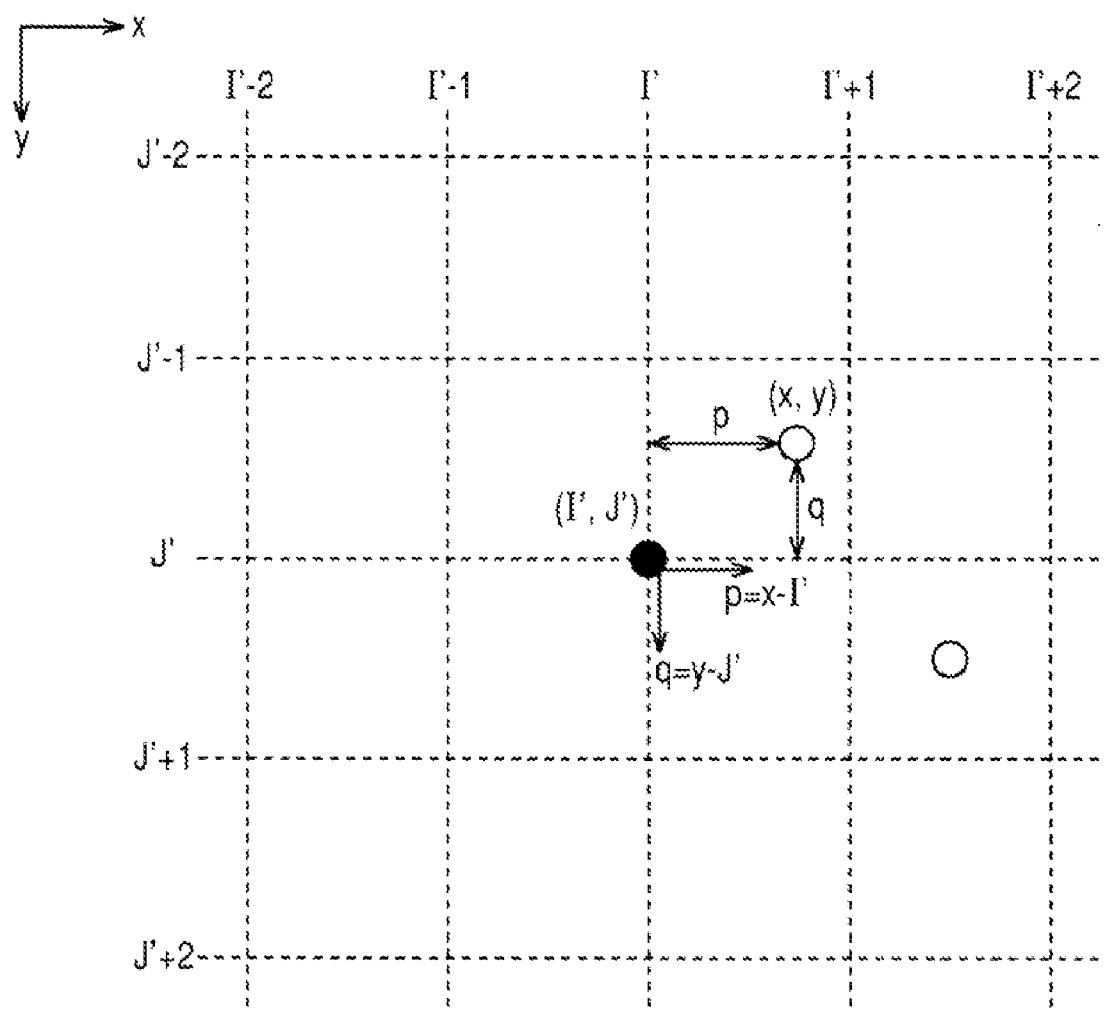
FIG. 7 is a diagram for explaining an interpolation method of interpolating a G signal Lg(I',J') in a position (I',J')

In FIG. 7 (and in the FIG. 8 described later), an area of a range of 4×4 is set as the contributing area.

The arithmetic circuit 24 calculates the G signal Lg(I',J') of the output pixel in the position (I',J') by interpolation indicated by the following equation using the pixel values Gobs (k,ig,jg) of the G pixels in the contributing area for the position (I',J') and an interpolation function that changes according to the positions of the G pixels in the contributing area.

$$Lg(I', J') = \frac{\sum \{w((x, y), (I', J')) \times Gobs(k, ig, jg)\}}{\sum w((x, y), (I', J'))} \quad (5)$$

Σ in Equation (5) indicates a sum for all the G pixels, the positions of which after the positioning of the N photographed images are in the contributing area. In other words, Σ indicates a sum for sets of (k, ig, jg), with which the positions (x,y) on the reference coordinate system obtained by affine-transforming the positions (ig,jg) of the G pixels of the photographed images with the transformation parameters $(a_k,b_k,c_k,d_k,s_k,t_x)$ satisfy the expression $I'-2 \leq x < I'+2$ and the expression $J'-2 \leq y < J'+2$.

In Equation (5), w((x,y),(I',J')) is an interpolation function having, as arguments, the positions (x,y) on the reference coordinate obtained by affine-transforming the positions (ig, jg) of the G pixels of the photographed images with the transformation parameters $(a_k,b_k,c_k,d_k,s_k,t_k)$ and the position (I',J') of the pixel for interpolating the G signal Lg(I',J'). In this way, the interpolation function w((x,y),(I',J')) has, as the argument, the positions (x,y) on the reference coordinate obtained by affine-trans forming the positions (ig,jg) of the G pixels of the photographed images with the transformation parameters $(a_k,b_k,c_k,d_k,s_k,t_k)$, i.e., the positions (x,y) of the G pixels after the positioning of the photographed images. Thus, the interpolation function w((x,y),(I',J')) is a function that, changes according to the positions (x,y) of the G pixels after the positioning of the photographed images.

For example, when a variable "p" is defined by an equation p=x-I' and a variable "q" is defined by an equation q=y-J', as shown in FIG. 7, (p,q) indicates a relative position of the G pixels after the positioning of the photographed images with the position (I',J') set as a reference.

The arithmetic circuit 24 calculates an R signal Lr(I',J') and a B signal Lb(I',J') of the output pixel in the position (I',J') by interpolation in the same manner as the calculation of the G signal Lg(I',J'). The arithmetic circuit 24 calculates the R signal Lr(I',J') and the B signal Lb(I',J') in accordance with Equation (6) and Equation (7) similar to Equation (5).

$$Lr(I', J') = \frac{\sum \{w((x, y), (I', J')) \times Robs(k, ir, jr)\}}{\sum w((x, y), (I', J'))} \quad (6)$$

$$Lb(I', J') = \frac{\sum \{w((x, y), (I', J')) \times Bobs(k, ib, jb)\}}{\sum w((x, y), (I', J'))} \quad (7)$$

$\Sigma$ in Equation (6) indicates a sum for all pixels having only the R signal as pixel values (hereinafter also referred to as R pixels as appropriate), positions of which after the positioning of the N photographed images are in the contributing area. In other words, $\Sigma$ indicates a sum for sets of (k, ir, jr), with which the positions (x,y) on the reference coordinate system obtained by affine-transforming the positions (ir,jr) of the R pixels of the photographed images with the transformation parameters $(a_k,b_k,c_k,d_k,s_k,t_k)$ satisfy the expression $I'-2 \leq x < I'+2$ and the expression $J'-2 \leq y < J'+2$.

$\Sigma$ in Equation (7) indicates a sum for all pixels having only the B signal as pixel values (hereinafter also referred to as B pixels as appropriate), positions of which after the positioning of the N photographed images are in the contributing area. In other words, $\Sigma$ indicates a sum for sets of (k, ib, jb), with which the positions (x,y) on the reference coordinate system obtained by affine-transforming the positions (ib,jb) of the B pixels of the photographed images with the transformation parameters $(a_k,b_k,c_k,d_k,s_k,t_k)$ satisfy the expression $I'-2 \leq x < I'+2$ and the expression $J'-2 \leq y < J'+2$.

Figure 8:
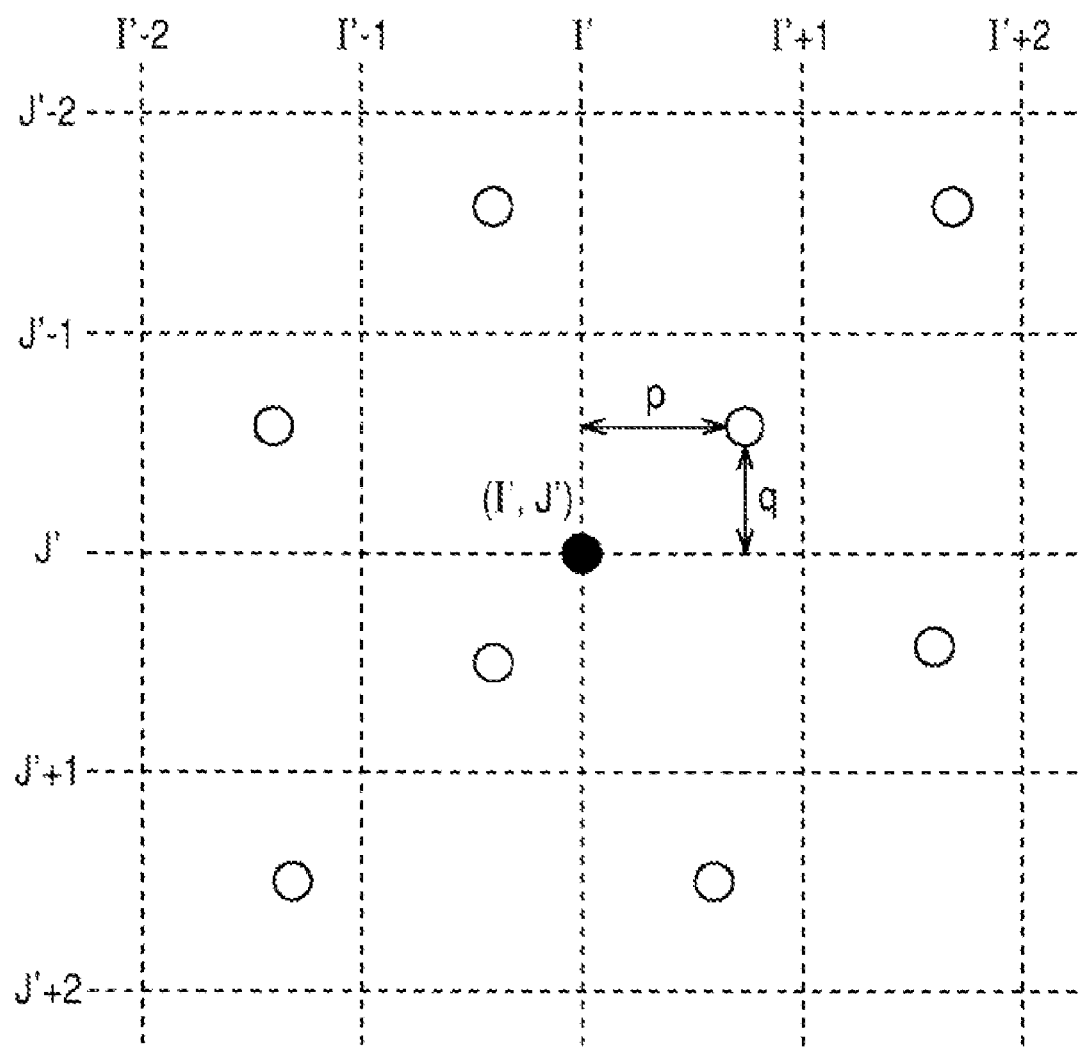
FIG. 8 is a diagram showing eight G pixels present in a 4×4 contributing area of a photographed image of the Bayer array.

Since the imaging device 4 of the Bayer array is adopted, if the photographed images after the positioning overlap over the entire contributing area of 4×4 for the position (I',J'), for example, as indicated by circles in FIG. 8, eight pixels are present as G pixels for one photographed image after the positioning in the contributing area. On the other hand, four pixels are present as R pixels and B pixels, respectively, for one photographed image after the positioning in the contributing area.

The interpolation function w((x,y),(I',J')) of Equations (5) to (7) will be explained.

As described above, the variable "p" is defied by the equation p=x-I', the variable "q" is defined by the equation q=y-J', and a function f(p,q) having the variables "p" and "q" as arguments is adopted as the interpolation function w((x,y), (I',J')).

In this case, it is possible to adopt, for example, a bilinear function and a bicubic function as the interpolation function f(p,q).

A bilinear function (p,q) is a product of two linear functions Linear(z) and represented by, for example, Equation (8).

$$f(p, q) = \text{Bilinear}(p, q) = \text{Linear}(p) \times \text{Linear}(q), \quad (8)$$

$$\text{Linear}(z) = \begin{cases} z+1 & (-1 < z \leq 0) \\ -z+1 & (0 \leq z < 1) \\ 0 & (1 \leq |z|) \end{cases}$$

Figure 9:
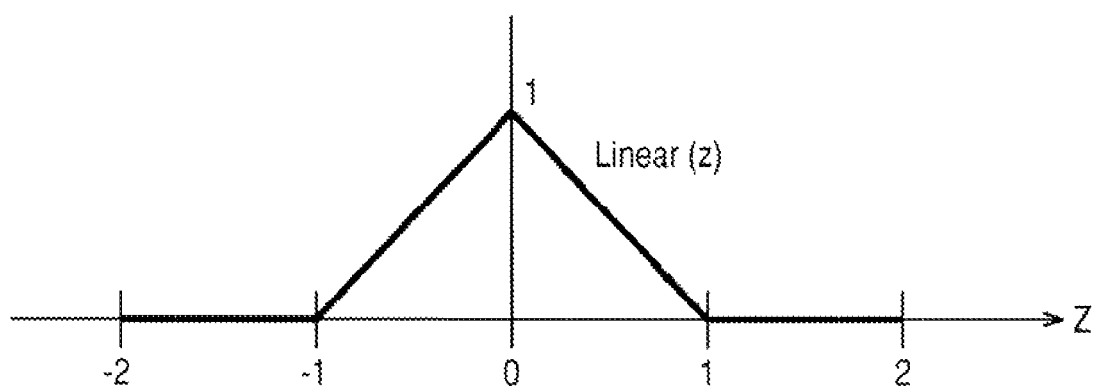
FIG. 9 is a waveform chart showing a linear function Linear(z)

The linear function Linear (z) of Equation (8) is shown in FIG. 9.

The bicubic function Bicubic(p,q) is a product of two cubic functions Cubic(z) and represented by, for example, Equation (9).

$$f(p, q) = \text{Bilcubic}(p, q) = \text{Cubic}(p) \times \text{Cubic}(q), \quad (9)$$

$$\text{Cubic}(z) = \begin{cases} |z|^3 - 2|z|^2 + 1 & (|z| < 1) \\ -|z|^3 + 5|z|^2 - 8|z| + 4 & (1 \leq |z| < 2) \\ 0 & (2 \leq |z|) \end{cases}$$

Figure 10:
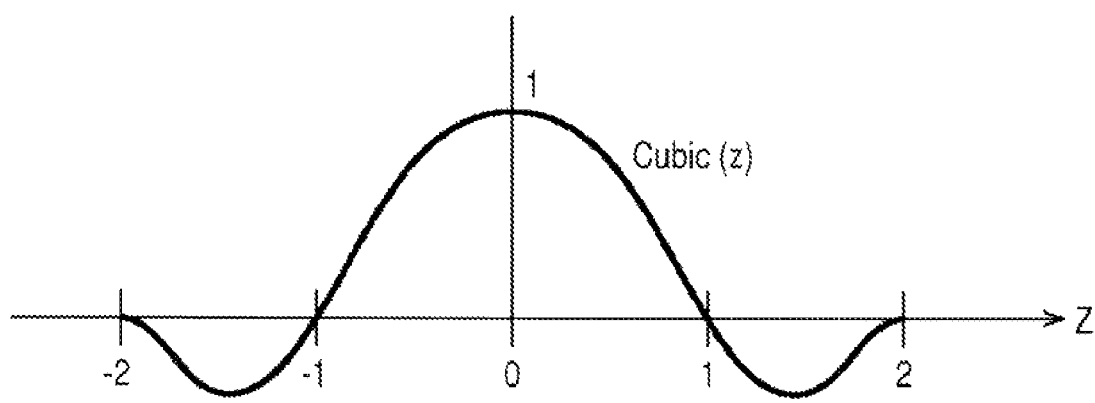
FIG. 10 is a waveform chart showing a cubic function Cubic(z)

The cubic function Cubic(z) of Equation (9) is shown in FIG. 10.

For example, the bicubic function of Equation (9) is adopted as the interpolation function f(p,q), the G signal, the R signal, or the B signal, which is a pixel value of a pixel in the position (i,j) of the kth image among the N photographed images, is represented as inputPixel(k,i,j), and the G signal, the R signal, or the E signal, which is a pixel value of an output pixel in the position (I',J'), is represented as outputPixel(I',J'). Then, Equations (5) to (7) can be represented by Equation (10).

$$outputPixel(I', J') = \quad (10)$$

$$\sum_{\text{All photographed images } k} \left[ \frac{\sum\limits_{\text{All pixels}(i,j)\text{of photographed images } k} \text{Bicubic}\binom{p(k, i, j), q(k, i, j) \times}{\text{inputPixel}(k, i, j)}}{\sum\limits_{\text{All pixels}(i,j)\text{of photographed images } k} \text{Bicubic}(p(k, i, j), q(k, i, j))} \right]$$

However, in Equation (10), p(k,i,j) and q(k,i,j) are represented by the following equation with a position (a position on the reference coordinate system) after the positioning of the pixel in the position (i,j) of the kth image set as (x,y).

$p(k,i,j)=x-I'$ $q(k,i,j)=y-J'$

According to Equation (11), (p(k,i,j),q(k,i,j)) represents a coordinate (a relative coordinate) of the pixel in the position (i,j) of the kth image with the position (I',J') of the output pixel set as a reference (an origin).

In Equation (10), Σ before parentheses on the right-hand side indicates a sum for the N photographed images.

Moreover, in Equation (10), the G signal among the G signal, the R signal, and the B signal is calculated as the pixel value outputPixel(I',J') of the output pixel in the position (I',J'). In this case, Σ of the denominator and the numerator of the fraction on the right-hand side of Equation (10) indicates a sum for all the G pixels in the contributing area among the pixels of the N photographed images after the positioning, InputPixel(k,i,j) indicates a pixel value of the G pixel in the position (i,j) of the kth image, a position of which after the positioning is a position in the contributing area.

In Equation (10), the R signal is calculated as the pixel value outputPixel(I',J') of the output pixel in the position (I',J'). In this case, Σ of the denominator and the numerator of the fraction on the right-hand side of Equation (10) indicates a sum for all the R pixels in the contributing area among the pixels of the N photographed images after the positioning. InputPixel (k,i,j) indicates a pixel value of the R pixel in the position (i,j) of the kth image, a position of which after the positioning is a position in the contributing area.

Moreover, in Equation (10), the B signal is calculated as the pixel value outputPixel(I',J') of the output pixel in the position (I',J'). In this case, Σ of the denominator and the numerator of the fraction on the right-hand side of Equation (10) indicates a sum for all the B pixels in the contributing area among the pixels of the N photographed images after the positioning. InputPixel(k,i,j) indicates a pixel value of the B pixel in the position (i,j) of the kth image, a position of which after the positioning is a position in the contributing area.

When, for example, the G signal among the G signal, the R signal, and the B signal of the pixel value outputPixel (I', J') of the output pixel is calculated, only pixel values of the G pixels among the pixels of the photographed images, i.e., only the G signals are used. However, it is also possible to calculates the G signal of the pixel value outputPixel (I',J') of the output pixel using the R signals as the pixel values of the R pixels or the B signals as the pixel values of the B pixels other than the G signals as the pixel values of the G pixels among the pixels of the photographed images. The R signal and the B signal of the pixel value outputPixel (I',J') of the output pixel are calculated in the same manner.

The image generation processing in step S4 in FIG. 3 for generating an output, image by interpolating the G signal, the R signal, and the B signal as the pixel values of the output pixel will be explained with reference to a flowchart in FIG. 11.

First, in step S71, the arithmetic circuit 24 selects, with a certain output pixel on the reference coordinate system set as a pixel of interest, a position (I',J') of the pixel of interest as a position of interest (I',J').

The arithmetic circuit 24 proceeds from step S71 to step S72. The arithmetic circuit 24 calculates sets of (k, ig, jg), with which the positions (x,y) on the reference coordinate system obtained by affine-transforming the positions (ig−1, jg−1) of the G pixel of the kth image (a pixel of the G signal Gobs(k,ig,jg)) with the transformation parameters $(a_k, b_k, c_k, d_k, s_k, t_k)$ satisfy the expression I'−2≦x<I'+2 and the expression J'−2≦y<J'+2 representing the contributing area for the position of interest (I',J') for all of the first to Nth images. The arithmetic circuit 24 specifies the G pixels represented by (k,ig,jg) as contributing pixels contributing to interpolation of the pixel of interest and proceeds to step S73.

The transformation parameters $(a_k, b_k, c_k, d_k, s_k, t_k)$ in affine-transforming the position of the G pixel of the kth image to the position (x,y) on the reference coordinate system is supplied from the motion detecting circuit $23_{k-1}$ to the arithmetic circuit 24. For the first image as the reference image, i.e., for the case of k=1, (1,0,0,1,0,0) is sued as the transformation parameters $(a_1, b_1, c_1, d_1, s_1, t_1)$. Therefore, the first image is not substantially affine-transformed.

The position (x,y) after the affine transformation of the position of the pixel of the kth image onto the reference coordinate system is also referred to as a transformed position (x,y) as appropriate.

In step S73, the arithmetic circuit 24 calculates Equation (5) (Equation (10)) using all the sets of (k,ig,jg) calculated in step S72 to calculate a G signal Lg(I',J') (outputPixel(I',J')) of the pixel value of the pixel of interest and proceeds to step S74.

The arithmetic circuit 24 calculates the G signal Lg(I',J') (outputPixel(I',J')) of the pixel value of the pixel of interest by interpolation of Equation (5) (Equation (10)) using the G signals Gobs(k,ig,jg) as all pixel values of the contributing pixels specified by (k,ig,jg) calculated in step S72 and a bicubic function Bicubic (p(k,i,j),q(k,i,j)) as the interpolation function w((x,y),(I',J')) that changes according to the transformed position (x,y).

In step S74, the arithmetic circuit 24 calculates sets of (k, ir, jr), with which the positions (x,y) on the reference coordinate system obtained by affine-trans forming the positions (ir−1, jr−1) of the R pixel of the kth image (a pixel of the R signal Robs(k,ir,jr)) with the transformation parameters $(a_k, b_k, c_k, d_k, s_k, t_k)$ satisfy the expression I'−2≦x<I'+2 and the expression J'−2≦y<J'+2 representing the contributing area for the position of interest (I',J'), for all of the first to Nth images. The arithmetic circuit 24 specifies the R pixels represented by (k,ir,jr) as contributing pixels contributing to interpolation of the pixel of interest and proceeds to step S75.

In step S75, the arithmetic circuit 24 calculates Equation (6) (Equation (10)) using all the sets of (k,ir,jr) calculated in step S74 to calculate an R signal Lr(I',J') (outputPixel(I',J')) of the pixel value of the pixel of interest and proceeds to step S76.

The arithmetic circuit 24 calculates the R signal Lr(I',J') (outputPixel(I',J')) of the pixel value of the pixel of interest by interpolation of Equation (6) (Equation (10)) using the R signals Robs(k,ir,jr) as all pixel values of the contributing pixels specified by (k,ir,jr) calculated in step S74 and the bicubic function Bicubic(p(k,i,j),q(k,i,j)) as the interpolation function w((x,y),(I',J')) that changes according to the transformed position (x,y).

In step S76, the arithmetic circuit 24 calculates sets of (k, ib, jb), with which the positions (x,y) on the reference coordinate system obtained by affine-trans forming the positions (ib−1,jb−1) of the B pixel of the kth image (a pixel of the B signal Bobs(k,ib,jb)) with the transformation parameters $(a_k, b_k, c_k, d_k, s_k, t_k)$ satisfy the expression I'−2≦x<I'+2 and the expression J'−2≦y<+2 representing the contributing area for the position of interest (I',J'), for all of the first to Nth images. The arithmetic circuit 24 specifies the B pixels represented by (k,ib,jb) as contributing pixels contributing to interpolation of the pixel of interest and proceeds to step S77.

In step S77, the arithmetic circuit 24 calculates Equation (7) (Equation (10)) using all the sets of (k,ib,jb) calculated in step S76 to calculate a B signal Lb(I',J') (outputPixel(I',J')) of the pixel value of the pixel of interest and proceeds to step S78.

The arithmetic circuit 24 calculates the B signal Lb(I',J') (outputPixel (I',J')) of the pixel value of the pixel of interest by interpolation of Equation (7) (Equation (10)) using the B signals Gobs(k,ib,jb) as all pixel values of the contributing pixels specified by (k,ib,jb) calculated in step S76 and a bicubic function Bicubic(p(k,i,j),q(k,i,j)) as the interpolation function w((x,y),(I',J')) that changes according to the transformed position (x,y).

In step S78, the arithmetic circuit 24 determines whether all the output pixels of the output image have been set as the pixel of interest, i.e., whether the G signal Lg(I',J'), the R signal Lr(I',J'), and the B signal Lb(I',J'), which are the pixel values of all the output pixels of the output image, have been calculated.

When it is determined in step S78 that there is an output pixel that has not been set as the pixel of interest, the arithmetic circuit 24 returns to step S71 and the processing in steps S71 to S78 is repeated. The arithmetic circuit 24 sets the output pixel, which has not been set as the pixel of interest yet, as a new pixel of interest and calculates the G signal Lg(I',J'), the R signal Lr(I',J'), and the B signal Lb(I',J') of the new pixel of interest.

On the other hand, when it is determined in step S78 that all the output pixels have been set as the pixel of interest, the arithmetic circuit 24 proceeds to step S79. The arithmetic circuit 24 applies necessary processing such as filter processing, color correction processing, and opening correction to an output image having the G signal Lg(I',J'), the R signal Lr(I', J'), and the B signal Lb(I',J') calculated for all the output pixels as pixel values. In step S80, the arithmetic circuit 24 outputs the output image to the D/A converter 9 or the CODEC 12 and returns to the start of the processing.

As described above, the positional relation among the plural photographed images obtained by high-speed imaging is detected, the pixel values of the output pixels are calculated using the pixel values of the plural photographed images after the positioning subjected to the positioning on the basis of the positional relation and the interpolation function that changes according to the positions of the pixels of the plural photographed images after the positioning, and the output image is generated from the pixel values. Consequently, it is possible to obtain a clear output image without camera shake.

Figure 11:
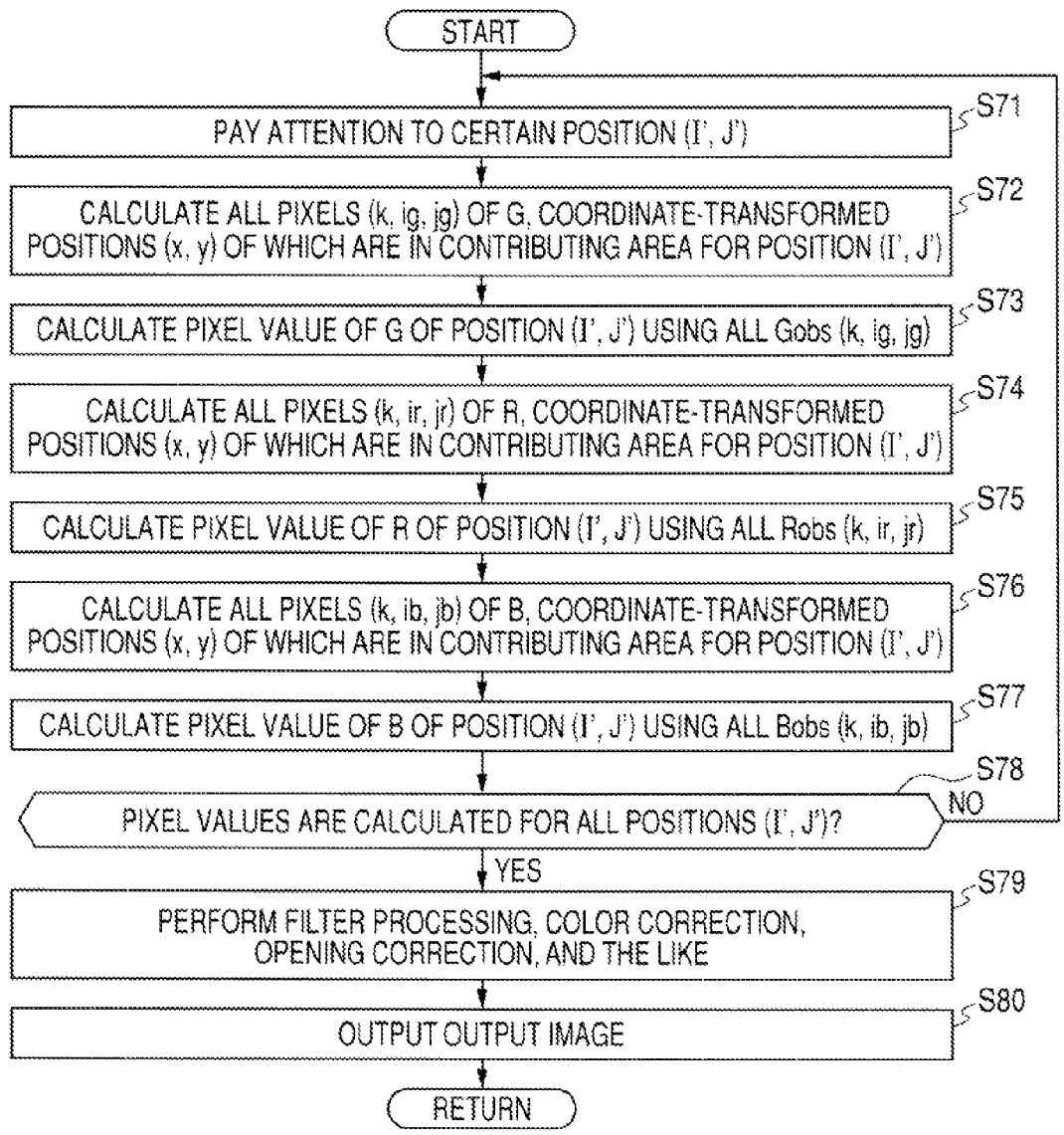
FIG. 11 is a flowchart for explaining image generation processing.

In the image processing in FIG. 11, among the pixels of the first to Nth images, pixels, positions of which after the positioning, i.e., the transformed positions (x,y) of which after the affine transformation are in the contributing area for the position of interest (I',J'), are specified as contributing pixels contributing to the interpolation of the pixel of interest. The pixel value outputPixel(I',J') of the pixel of interest is calculated according to the interpolation of Equation (10) performed by using pixel values of the contributing pixels and the bicubic function Bicubic(p(k,i,j),q(k,i,j)) as the interpolation function w((x,y),(I',J')).

As explained about Equation (11), (p(k,i,j),q(k,i,j)) represents a relative coordinate of the pixel in the position (i,j) of the kth image with the position (I',J') of the output pixel set as a reference. This relative coordinate (p(k,i,j),q(k,i,j)) is represented as (p,q) as appropriate.

To simplify the explanation, when the denominator of Equation (10) is neglected, in the interpolation of Equation (10), the contributing pixels, the transformed positions (x,y) of which are a position (p,q), contribute to the interpolation by an amount of a function value of a bicubic function Bicubic (p,q) obtained by calculating Equation (9).

A degree of (the pixel values of) the contributing pixels contributing to the interpolation is hereinafter referred to as a contribution rate as appropriate.

The bicubic function Bicubic (p,q) of Equation (9) as the interpolation function is a product of two cubic functions Cubic (p) and Cubic (q). Thus, regardless of what kind of pixel of the output image the pixel of interest is, the contributing pixels, the transformed positions (x,y) of which are the position (p,q), contribute to the interpolation at an identical contribution rats.

However, as the pixels of the output image, there are a pixel forming an edge (hereinafter also referred to as edge pixel as appropriate), a pixel that does not form an edge and on which, for example, a flat texture is displayed (hereinafter also referred to as non-edge pixel), and the like.

When the pixel of interest is, for example, the edge pixel, it is possible to control zipper noise and artifact caused in an edge direction as a direction of the edge by setting the contribution rate large for the contributing pixels present in the direction along an edge direction among contributing pixels.

Moreover, when the pixel of interest is the edge pixel, among the contributing pixels, it is possible to maintain a high-frequency component in the edge direction and prevent an edge from blurring by setting the contribution rate small for the contributing pixels present, in a direction orthogonal to the edge direction.

When the pixel of interest is the non-edge pixel on which a flat texture is displayed, it is possible to control noise caused in a flat section where the flat texture is displayed by setting the contribution rate large for all the contributing pixels present around the pixel of interest.

As described above, it is possible to prevent the edge from blurring and control noise and the like to obtain a high-quality output image by controlling the contribution rate of the contributing pixels contributing to the interpolation.

Thus, the arithmetic circuit 24 can determine an edge direction in the pixel of interest and control the contribution rate of the contributing pixels contributing to the interpolation according to a result of the determination.

The arithmetic circuit 24 performs the determination of the edge direction and the control of the contribution rate, for example, as described below.

Figure 12:
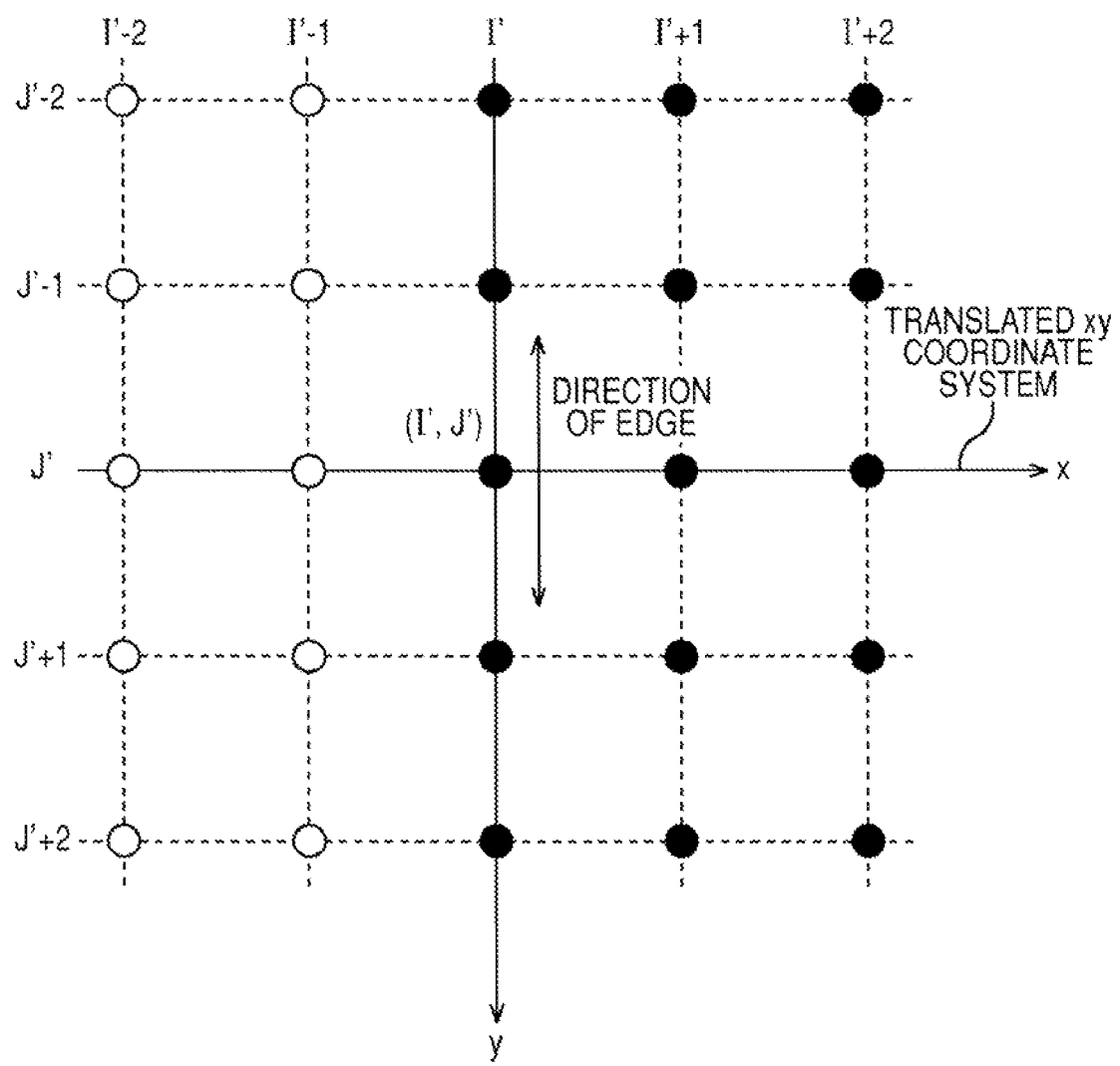
FIG. 12 is a diagram showing a reference image having an edge in the vertical direction.

FIG. 12 shows a reference image.

Positions of respective pixels of the output image coincide with positions of respective pixels of the reference image. Thus, the arithmetic circuit 24 performs edge determination for determining an edge direction in the pixel of interest, which is a pixel of the output image, using the reference image.

Specifically, in FIG. 12, in the reference image, a pixel value of 3×5 pixels on the right side including a pixel in the position of the pixel of interest is a certain value va and a pixel value of 2×5 pixels on the left side is a certain value vb.

Roughly speaking, in FIG. 12, when a difference between the pixel value va of the 3×5 pixels or the like arranged on the right side and the pixel value vb of the 2×5 pixels or the like arranged on the left side is equal to or larger than a fixed value, the arithmetic circuit 24 determines that the edge direction in the pixel of interest is the vertical direction (a y direction). When the difference is smaller than the fixed value, the arithmetic circuit 24 determines that the pixel of interest is the non-edge pixel.

In the same manner, the arithmetic circuit 24 determines, on the basis of a difference between a pixel value of pixels arranged on the upper side of the position (I',J') of the pixel of interest and a pixel value of pixels arranged on the lower side, that the edge direction in the pixel of interest is the horizontal direction (an x direction) or determines that the pixel of interest is the non-edge pixel.

The arithmetic circuit 24 controls the contribution rate of the contributing pixels contributing to the interpolation, for example, as described below on the basis of the determination that the edge direction in the pixel of interest is the vertical direction or the horizontal direction or the determination that the pixel of interest is the non-edge pixel.

When the pixel of interest is an edge pixel on which an edge with an edge direction in the vertical direction or the horizontal direction is displayed, the arithmetic circuit 24 controls the contribution rate such that, among the contributing pixels, the contribution rate of the contributing pixels present in the direction along the edge direction is large and the contribution rate of the contributing pixels present in the direction orthogonal to the edge direction is small.

When the pixel of interest is the non-edge pixel, the arithmetic circuit 24 controls the contribution rate such that the contribution rate of all the contributing pixels is large.

The control of the contribution rate is performed, for example, as described below.

When the arithmetic circuit 24 controls the contribution rate, for example, a bicubic function Bicubic (p,q) represented by Equation (12) is adopted as the bicubic function Bicubic(p,q) as the interpolation function.

$$\text{Bicubic}(p, q) = \text{Cubic}\left(\frac{p}{\text{scale}P}\right) \times \text{Cubic}\left(\frac{p}{\text{scale}Q}\right) \quad (12)$$

In Equation (12), scaleP and scaleQ are contribution parameters for controlling a contribution rate of a pixel value inputPixel(k,i,j) of the contributing pixels, which are multiplied by the bicubic function Bicubic(p,q) as the interpolation function, contributing to the interpolation. The arithmetic circuit 24 controls the contribution rate by adjusting (the bicubic function Bicubic(p,q) of Equation (12) defined by) the contribution parameters scaleP and scaleQ.

The contribution parameters scaleP and scaleQ are also parameters for adjusting high-pass characteristics of the bicubic function Bicubic(p,q) as the interpolation function. As the contribution parameters scaleP and scaleQ are larger, an effect of the interpolation function as a low-pass filter is larger. In other words, as the contribution parameters scaleP and scaleQ are larger, the interpolation function is a low-pass filter that controls the high-frequency component more.

As described above, when the pixel of interest is the edge pixel on which the edge with the edge direction in the vertical direction or the horizontal direction is displayed, the arithmetic circuit 24 controls the contribution rate such that, among the contributing pixels, the contribution rate of the contributing pixels present in the direction along the edge direction is large and the contribution rate of the contributing pixels present in the direction orthogonal to the edge direction is small. When the pixel of interest is the non-edge pixel, the arithmetic circuit 24 controls the contribution rate such that the contribution rate of all the contributing pixels is large. The control of the contribution rate is performed by adjusting (setting) the contribution parameters scaleP and scaleQ as described below.

When the pixel of interest is the edge pixel on which the edge with the edge direction in the horizontal direction is displayed, the arithmetic circuit 24 adjusts the contribution parameter scaleP to, for example, a value equal to or lager than 1 (a large value) $v_{big}$ and adjusts the contribution parameter scaleQ to, for example, a value larger than 0 and equal to or smaller than the value $v_{big}$ (a small value) $v_{small}$.

Moreover, when the pixel of interest is the edge pixel on which the edge with the edge direction in the vertical direction is displayed, the arithmetic circuit 24 adjusts the contribution parameter scaleQ to, for example, the value equal to or larger than 1 (the large value) $v_{big}$ and adjusts the contribution parameter scaleP to, for example, the value larger than 0 and equal to or smaller than the value $v_{big}$ (the small value) $v_{small}$.

When the pixel of interest is the non-edge pixel, the arithmetic circuit 24 adjusts the contribution parameters scaleP and scaleQ to, for example, a value equal to or larger than 1 (a large value) $v_N$.

As the large values $v_{big}$ and $v_N$ equal to or larger than 1, it is possible to adopt, for example, 1.5. However, the values $v_{big}$ and $v_N$ do not need to be identical. As the small value $v_{small}$ larger than 0 and equal to or smaller than the value $v_{big}$, it is possible to adopt, for example, 0.5.

Figure 13:
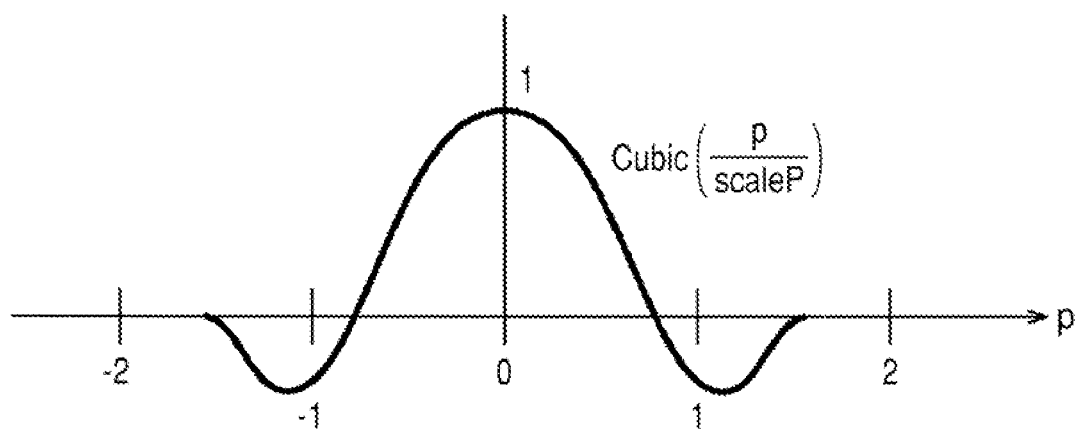
FIG. 13 is a diagram showing a cubic function Cubic(p/scaleP) with a contributing parameter scaleP adjusted to a small value.
Figure 14:
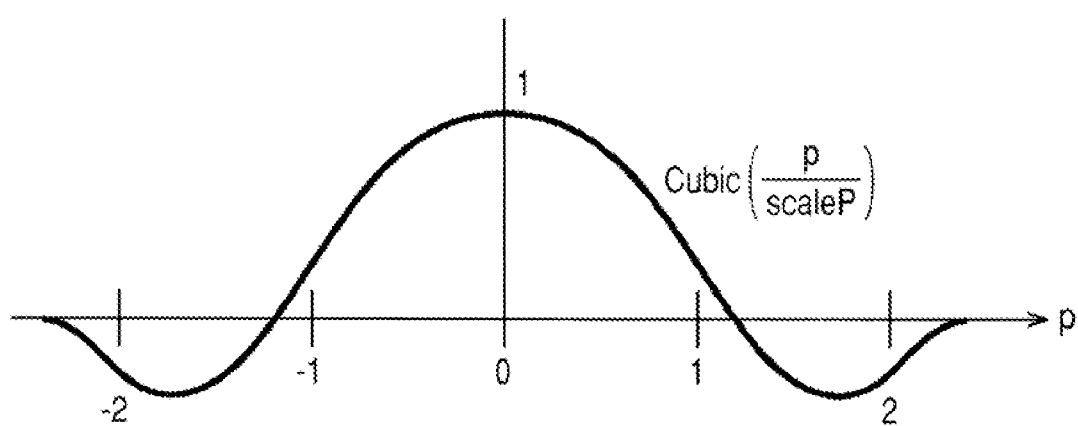
FIG. 14 is a diagram showing a cubic function Cubic(p/scaleP) with a contributing parameter scaleP adjusted to a large value.

Among two cubic functions Cubic(p/scaleP) and Cubic(q/scaleQ) that define the bicubic function Bicubic (p,q) as the interpolation function of Equation (12), if attention is paid to, for example, the cubic function Cubic(p/scaleP), this cubic function Cubic(p/scaleP) is as shown in FIGS. 13 and 14.

FIG. 13 shows the cubic function Cubic(p/scaleP) with the contribution parameter scaleP adjusted to a small value, for example, 0.5. FIG. 14 shows the cubic function Cubic(p/scaleP) with the contribution parameter scaleP adjusted to a large value, for example, 1.5.

In the cubic function Cubic(p/scaleP) with the contribution parameter scaleP adjusted to the small value in FIG. 13, a change with respect to "p" is steep. In the cubic function Cubic(p/scaleP) with the contribution parameter scaleP adjusted to the large value in FIG. 14, a change with respect to "p" is gentle.

As described above, in the interpolation, the pixel value inputPixel(k,i,j) of the contributing pixels is multiplied by (the cubic function Cubic(p/scaleP) forming) the bicubic function Bicubic(p,q) as the interpolation function.

Therefore, when the contribution parameter scaleP of the cubic function Cubic (p/scaleP) is adjusted to the small value, the contributing pixels in the position (p,q) represented by a certain non-zero value "p" are multiplied by the cubic function Cubic(p/scaleP) that changes steeply. Basically, the contribution rate of the contributing pixels contributing to the interpolation is small.

On the other hand, when the contribution parameter scaleP of the cubic function Cubic (p/scaleP) is adjusted to the large value, the contributing pixels in the position (p,q) represented by a certain non-zero value "p" are multiplied by the cubic function Cubic(p/scaleP) that changes gently. Basically, the contribution rate of the contributing pixels contributing to the interpolation is large.

Similarly, when the contribution parameter scaleQ of the cubic function Cubic (q/scaleQ) is adjusted to the small value, the contributing pixels in the position (p,q) represented by a certain non-zero value "q" are multiplied by the cubic function Cubic(q/scaleQ) that changes steeply. Basically, the contribution rate of the contributing pixels contributing to the interpolation is small.

When the contribution parameter scaleQ of the cubic function Cubic(q/scaleQ) is adjusted to the large value, the contributing pixels in the position (p,q) represented by a certain non-zero value "q" are multiplied by the cubic function Cubic (q/scaleQ) that changes gently. Basically, the contribution rate of the contributing pixels contributing to the interpolation is large.

When it is determined that the edge direction in the pixel of interest is the vertical direction or the horizontal direction and when it is determined that the pixel of interest is the non-edge pixel, the arithmetic circuit 24 performs the interpolation using an xy coordinate obtained by translating the reference coordinate system to set an origin in the position (I',J') of the pixel of interest (hereinafter referred to as translated xy coordinate system as appropriate) as an interpolation coordinate system used for the interpolation.

In performing the interpolation using the translated xy coordinate system as the interpolation coordinate system, "p" in the position (p,q) of the contributing pixel indicates an x coordinate of the translated xy coordinate system as the interpolation coordinate system and "q" indicates a y coordinate of the translated xy coordinate system.

Therefore, when the pixel of interest is the edge pixel on which the edge with the edge direction in the horizontal direction is displayed, the contribution parameter scaleP is adjusted to the large value $v_{big}$ and the contribution parameter scaleQ is adjusted to the small value $v_{small}$. Consequently, the contribution rate of the contributing pixels in the x direction in the translated xy coordinate system, i.e., the contributing pixels in the direction along the edge direction in the horizontal direction is large and the contribution rate of the contributing pixels in the y direction in the translated xy coordinate system, i.e., the contributing pixels in the direction orthogonal to the edge direction in the horizontal direction is small.

When the pixel of interest is the edge pixel on which the edge with the edge direction in the vertical direction is displayed, the contribution parameter scaleP is adjusted to the small value $v_{small}$ and the contribution parameter scaleQ is adjusted to the large value $v_{big}$. Consequently, the contribution rate of the contributing pixels in the x direction in the translated xy coordinate system, i.e., the contributing pixels in the direction orthogonal to the edge direction in the vertical direction is small and the contribution rate of the contributing pixels in the y direction in the translated xy coordinate system, i.e., the contributing pixels in the direction along the edge direction in the vertical direction is large.

Moreover, when the pixel of interest is the non-edge pixel, the contribution parameters scaleP and scaleQ are adjusted to the large value $v_N$. Consequently, both the contribution rate of the contributing pixels in the x direction and the contribution rate of the contributing pixels in the y direction in the translated xy coordinate system are large.

Figure 15:
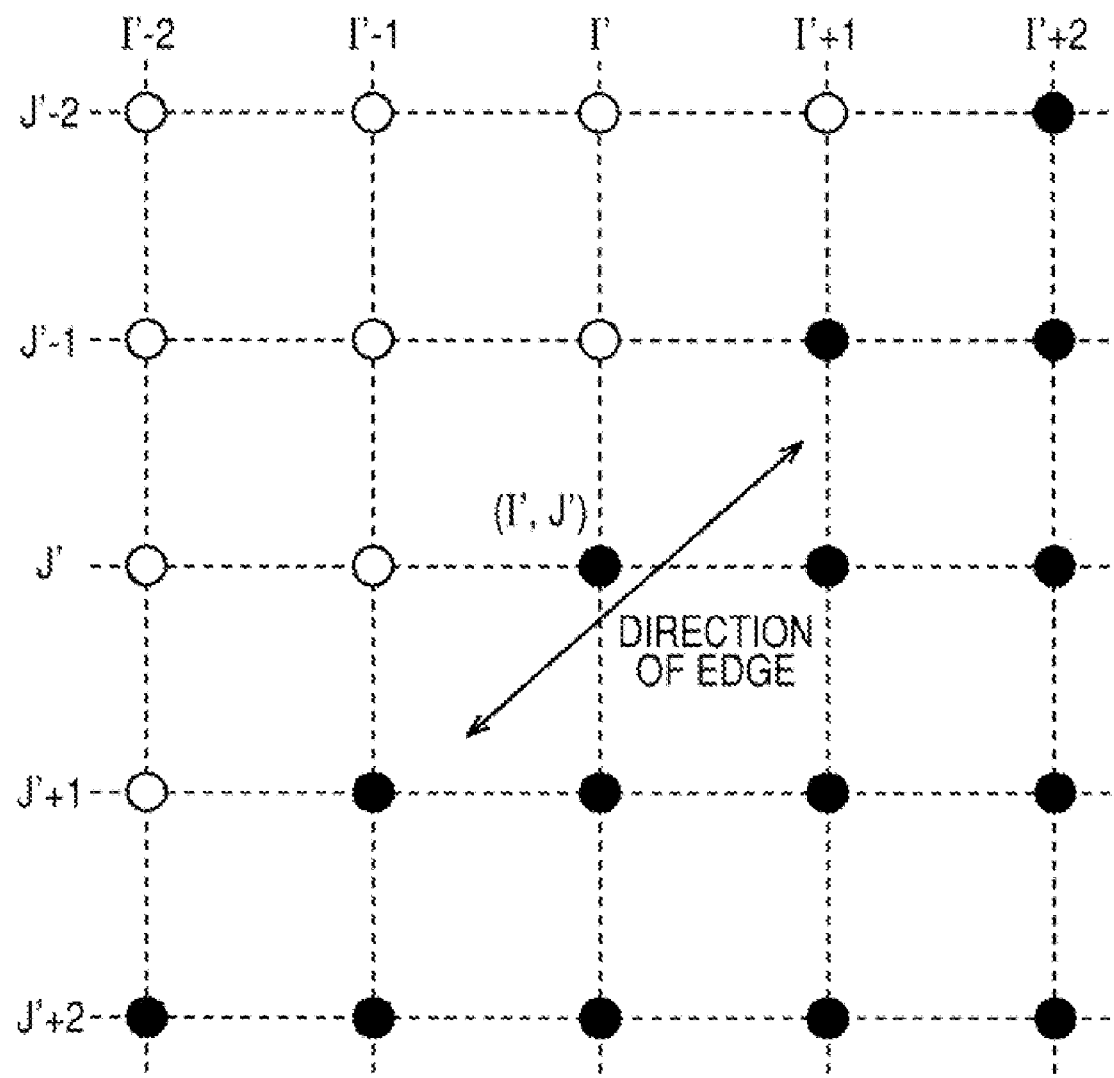
FIG. 15 is a diagram showing a reference image having an edge in a right oblique direction.

FIG. 15 shows another reference image.

As described above, positions of respective pixels of the output image coincide with positions of respective pixels of the reference image. The arithmetic circuit 24 performs the edge determination for determining an edge direction in the pixel of interest, which is a pixel of the output image.

In FIG. 15, in the reference image, a pixel value of fifteen pixels on the lower right side including a pixel in the position (I',J') of the pixel of interest is a value va and a pixel value of ten pixels on the upper left side is a value vb.

Roughly speaking, in FIG. 15, when a difference between the pixel value va of the fifteen pixels or the like on the lower right side and the pixel value vb of the ten pixels or the like on the upper left side is equal to or larger than a fixed value, the arithmetic circuit 24 determines that the edge direction in the pixel of interest is a right oblique direction (an upper right oblique direction or a lower left oblique direction). When the difference is smaller than the fixed value, the arithmetic circuit 24 determines that the pixel of interest is the non-edge pixel.

In the same manner, the arithmetic circuit 24 determines, on the basis of a difference between a pixel value of pixels on the upper right side of the position (I',J') of the pixel of interest and a pixel value of pixels arranged on the lower left side, that the edge direction in the pixel of interest is a left oblique direction (a upper left oblique direction or a lower right oblique direction) or determines that the pixel of interest is the non-edge pixel.

As in the case described above, when the pixel of interest is an edge pixel on which an edge with an edge direction in the right oblique direction or the right oblique direction is displayed, the arithmetic circuit 24 controls the contribution rate such that, among the contributing pixels, the contribution rate of the contributing pixels present in the direction along the edge direction is large and the contribution rate of the contributing pixels present in the direction orthogonal to the edge direction is small.

When the pixel of interest is the non-edge pixel, the arithmetic circuit 24 controls the contribution rate such that the contribution rate of all the contributing pixels is large.

The control of the contribution rate is also performed by adjusting the bicubic function Bicubic (p,q) of Equation (12) as the interpolation function and the contribution parameters scaleP and scaleQ as in the case described above.

However, when it is determined that, the edge direction in the pixel of interest is the left oblique direction or the right oblique direction, the arithmetic circuit 24 performs the interpolation using, as an interpolation coordinate system used for the interpolation, an xy coordinate system, obtained by translating the reference coordinate system to set the origin in the position (I',J') of the pixel of interest and further rotating an xy coordinate after the translation (a translated xy coordinate system) by 45 degrees (hereinafter referred to as rotated xy coordinate system as appropriate).

Figure 16:
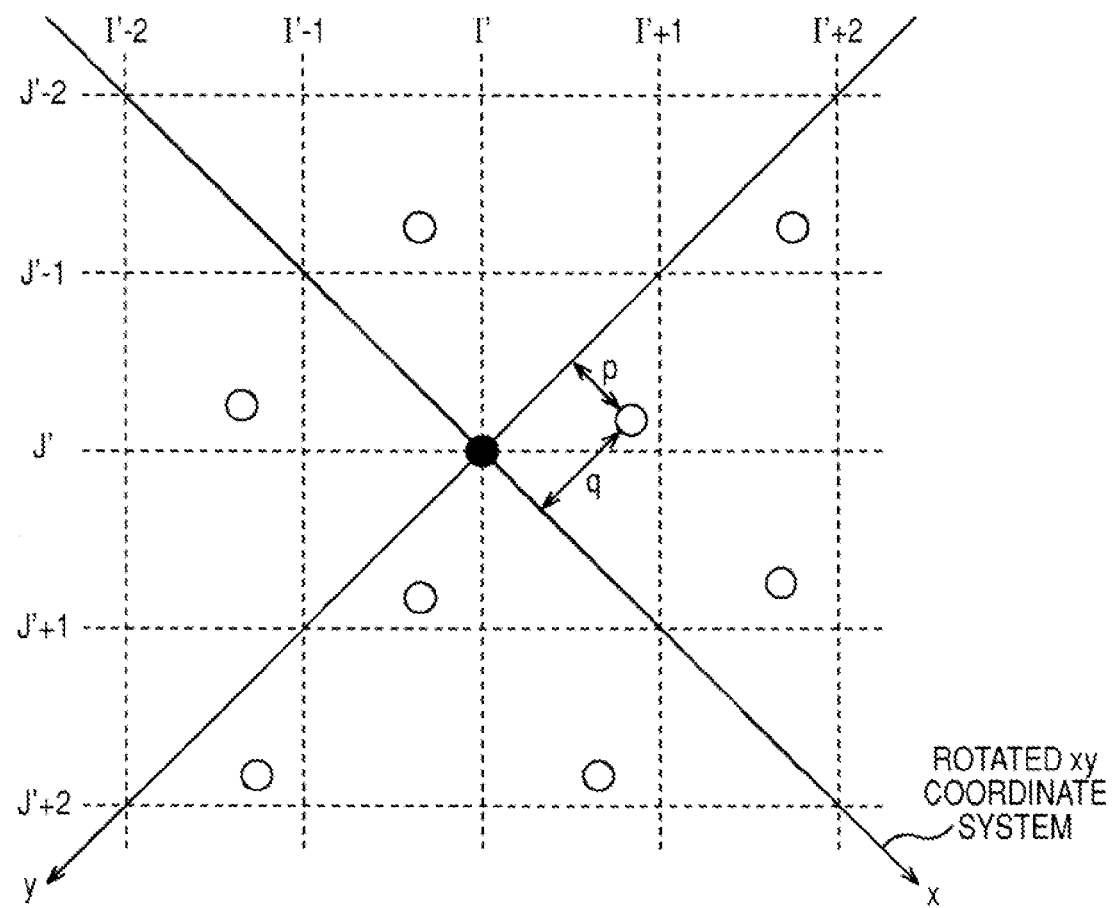
FIG. 16 is a diagram showing a rotated xy coordinate system.

FIG. 16 shows the rotated xy coordinate system.

In performing the interpolation using the rotated xy coordinate system as the interpolation coordinate system, "p" in the position (p,q) of the contributing pixel indicates an x coordinate of the translated xy coordinate system as the interpolation coordinate system and "q" indicates a y coordinate of the rotated xy coordinate system.

In the rotated xy coordinate system, a distance (a pixel pitch) between pixels adjacent to each other in the x direction or the y direction is $\sqrt{2}$ times as large as that in the translated xy coordinate system.

Therefore, when the rotated xy coordinate system is used as the interpolation coordinate system, as a value used for the adjustment of the contribution parameters scaleP and scaleQ, a value $\sqrt{2}$ times as large as that in the translated xy coordinate system is adopted.

When the pixel of interest is an edge pixel on which an edge with an edge direction in the left oblique direction is displayed, i.e., when a direction of the edge is the x direction of the rotated xy coordinate system, the arithmetic circuit 24 adjusts the contribution parameter scaleP to a large value $\sqrt{2} \times v_{big}$ and adjusts the contribution parameter scaleQ to a small value $\sqrt{2} \times v_{small}$.

When the pixel of interest is the edge pixel on which the edge with the edge direction in the right oblique direction is displayed, i.e., when a direction of the edge is the y direction of the rotated xy coordinate system, the arithmetic circuit 24 adjusts the contribution parameter scaleQ to the large value $\sqrt{2} \times v_{big}$ and adjusts the contribution parameter scaleP to a small value $\sqrt{2} \times v_{small}$.

When the arithmetic circuits 24 determines that the pixel of interest is the non-edge pixel, as the interpolation coordinate system, any one of the translated xy coordinate system and the rotated xy coordinate system may be adopted. When the rotated xy coordinate system is adopted as the interpolation coordinate system, the contribution parameters scaleP and scaleQ are adjusted to a value $\sqrt{2}$ times as large as that in the translated xy coordinate system, i.e., $\sqrt{2} \times v_N$.

As described above, when the pixel of interest is the edge pixel on which the edge with the edge direction in the left oblique direction is displayed, the contribution parameter scaleP is adjusted to the large value $\sqrt{2}\times v_{big}$ and the contribution parameter scaleQ is adjusted to the small value $\sqrt{2}\times v_{small}$. Consequently, the contribution rate of the contributing pixels in the x direction in the rotated xy coordinate system, i.e., the contributing pixels in the direction along the edge direction in the left oblique direction is large and the contribution rate of the contributing pixels in the y direction in the rotated xy coordinate system, i.e., the contributing pixels in the direction orthogonal to the edge direction in the left oblique direction is small.

When the pixel of interest is the edge pixel on which the edge with the edge direction in the right oblique direction is displayed, the contribution parameter scaleP is adjusted to the small value $\sqrt{2}\times v_{small}$ and the contribution parameter scaleQ is adjusted to the large value $\sqrt{2}\times v_{big}$. Consequently, the contribution rate of the contributing pixels in the x direction in the rotated xy coordinate system, i.e., the contributing pixels in the direction orthogonal to the edge direction in the right oblique direction is small and the contribution rate of the contributing pixels in the y direction in the rotated xy coordinate system, i.e., the contributing pixels in the direction along the edge direction in the right oblique direction is large.

When the pixel of interest is the non-edge pixel, it is possible to adjust the contribution parameters scaleP and scaleQ to the large value $\sqrt{2}\times v_N$ and set the contribution rats of the contributing pixels in the x direction and the contribution rate of the contributing pixels in the y direction in the rotated xy coordinate system large.

The image generation processing in step S4 in FIG. 3 for generating an output image by adjusting the contribution parameters of the interpolation function as described above and interpolating a G signal, an R signal, and a B signal, which are pixel values of the output pixel, will be explained with reference to a flowchart in FIG. 17.

First, in step S101, as in S71 in FIG. 11, the arithmetic circuit 24 sets a certain output pixel on the reference coordinate system as the pixel of interest, selects a position (I',J') of the pixel of interest as a position of interest (I',J'∝), and proceeds to step S102.

In step S102, the arithmetic circuit 24 performs the edge determination for determining an edge direction of an edge in the pixel of interest of the output image using, for example, a first image set as a reference image among N photographed images and proceeds to step S103.

In step S103, the arithmetic circuit 24 determines, on the basis of a result of the determination of the edge determination for the pixel of interest, an interpolation coordinate system used for interpolation and proceeds to step S104.

When, in the edge determination, a determination result indicating that the pixel of interest is an edge pixel on which an edge with an edge direction in the horizontal direction is displayed (hereinafter also referred to as horizontal edge pixel as appropriate) or an edge pixel on which an edge in the vertical direction is displayed (hereinafter also referred as vertical edge pixel as appropriate) is obtained and when a determination result indicating that the pixel of interest is the non-edge pixel is obtained, the arithmetic circuit 24 determines the translated xy coordinate system (FIG. 12) as the interpolation coordinate system.

When, in the edge determination, a determination result indicating that the pixel of interest is an edge pixel on which an edge with an edge direction in the left oblique direction is displayed (hereinafter also referred to as left oblique edge pixel as appropriate) or an edge pixel on which an edge in the right oblique direction is displayed (hereinafter also referred as right oblique edge pixel as appropriate) is obtained, the arithmetic circuit 24 determines the rotated xy coordinate system (FIG. 16) as the interpolation coordinate system.

In step S104, the arithmetic circuit 24 adjusts, on the basis of the determination result of the edge determination for the pixel of interest, the contribution parameters scaleP and scaleQ of, for example, the bicubic function Bicubic(p,q)=Cubic(p/scaleP)×Cubic(q/scaleQ) of Equation (12) as the interpolation function such that a degree of pixels of a photographed image present in the direction along the edge direction contributing to the interpolation is large and a degree of pixels of the photographed image present in the direction orthogonal to the edge direction contributing to the interpolation is small.

When a determination result indicating that the pixel of interest is the non-edge pixel is obtained in the edge determination, the arithmetic circuit 24 adjusts the contribution parameters scaleP and scaleQ to the large value $V_N$.

When a determination result indicating that the pixel of interest is the horizontal edge pixel is obtained in the edge determination, the arithmetic circuit 24 adjusts the contribution parameter scaleP to the large value $v_{big}$ and adjusts the contribution parameter scaleQ to the small value $v_{small}$.

Moreover, when a determination result indicating that the pixel of interest is the vertical edge pixel is obtained in the edge determination, the arithmetic circuit 24 adjusts the contribution parameter scaleP to the small value $v_{small}$ and adjusts the contribution parameter scaleQ to the large value $v_{big}$.

When a determination result indicating that the pixel of interest is the left oblique edge pixel is obtained in the edge determination, the arithmetic circuit 24 adjusts the contribution parameter scaleP to the large value $\sqrt{2}\times v_{big}$ and adjusts the contribution parameter scaleQ to the small value $\sqrt{2}\times v_{small}$.

Moreover, when a determination result indicating that the pixel of interest is the right oblique edge pixel is obtained in the edge determination, the arithmetic circuit 24 adjusts the contribution parameter scaleP to the small value $\sqrt{2}\times v_{small}$ and adjusts the contribution parameter scaleQ to the large value $\sqrt{2}\times v_{big}$.

Thereafter, in steps S105 to S113, processing same as the processing in steps S72 to S80 in FIG. 11 is performed and an output image is obtained.

However, in steps S106, S108, and S110, the pixel value outputPixel(I',J') of the pixel of interest is calculated by the interpolation performed by using, as the bicubic function Bicubic(p(k,i,j),q(k,i,j)) as the interpolation function of Equation (10), the bicubic function Bicubic(p,q)=cubic(p/scaleP)×Cubic(q/scaleQ) of Equation (12) with the contribution parameters scaleP and scaleQ adjusted in step S104 as the bicubic function Bicubic(p(k,i,j),q (k,i,j)). The interpolation performed by using the bicubic function Bicubic(p,q)=Cubic (p/scaleP)×Cubic(q/scaleQ) of Equation (12) is performed using the interpolation coordinate system determined in step S103.

As described above, the edge direction in the pixel of interest is determined and (the contribution parameters scaleP and scaleQ of) the bicubic function Bicubic (p,q) of Equation (12) as the interpolation function is adjusted such that a degree of the pixels of the photographed image present, in the direction along the edge direction contributing to the interpolation is large and a degree of the pixels of the photographed image present in the direction orthogonal to the edge direction contributing to the interpolation is small. Consequently, it is possible to obtain a high-quality output image without zipper noise and false colors (with zipper noise and false colors reduced) while maintaining the high-frequency components of the photographed image (without deteriorating resolution unnecessarily).

Moreover, as described above, by setting the contribution parameters scaleP and scaleQ large, the bicubic function Bicubic(p,q) of Equation (12) as the interpolation function has a large effect as the low-pass filter.

Therefore, as described above, by adjusting the contribution parameters scaleP and scaleQ to a large value as appropriate on the basis of the determination result of the edge determination, it is possible to cause the bicubic function Bicubic(p,q) of Equation (125 to function as the low-pass filter other than the interpolation function and perform removal and the like of noise and artifact caused in the output image.

As a result, when the removal and the like of noise and artifact is performed after the output image is obtained, it is unnecessary to separately perform processing for applying the low-pass filter to the output image. Therefore, it is possible to reduce an amount of calculation or reduce a circuit size.

When a determination result, indicating that the pixel of interest is the left oblique edge pixel or the right oblique edge pixel is obtained in the edge determination, i.e., when the edge direction in the pixel of interest is the left oblique direction or the right oblique direction, the interpolation of the pixel of interest is performed using the contributing pixels located in the x direction or the y direction in the rotated xy coordinate system, i.e., the contributing pixels located in the left oblique direction or the right oblique direction. Thus, it is possible to control jaggy that tends to occur in the edge in the left oblique direction or the right oblique direction. As a result, the edge in the oblique direction is smoothed and it is possible to generate a more natural output image.

In the interpolation of (the pixel value of) the pixel of interest in the image generation processing in FIG. 17, as in the image generation processing explained with reference to FIG. 11, sets of (k, i, j) are calculated for all of the first to Nth images. With the set of (k, i, j), the transformed positions (x,y) on the reference coordinate system obtained by affine-transforming the positions (i−1,j−1) of the pixels of the kth image with the transformation parameters $(a_k,b_k,c_k,d_k,s_k,t_k)$ satisfy the expression I'−2≦x<I'+2 and the expression J'−2≦y<J'+2 representing a contributing area for the position of interest (I',J') with, so to speak, a fixed size. The pixels represented by (k,i,j) are specified as contributing pixels contributing to interpolation of the pixel of interest. The interpolation of the pixel of interest is performed using the contributing pixels.

The bicubic function Bicubic(p,q)=Cubic(p/scaleP)×Cubic(q/scaleQ) of Equation (12) is 0 in the position (p,q) satisfying an expression |p|≧2×scaleP or an expression |q|≧2×scaleQ in the interpolation coordinate system (the xy coordinate system with the position (I',J') of the pixel of interest as the origin). Thus, in the interpolation performed by using the bicubic function Bicubic(p,q) of Equation (12) as the interpolation function, pixels, the transformed positions (x,y) of which on the interpolation coordinate system satisfy an expression |x|<2×scaleP and an expression |y|<2×scaleQ, among the pixels of the photographed image contribute to the interpolation of the pixel of interest.

Figure 17:
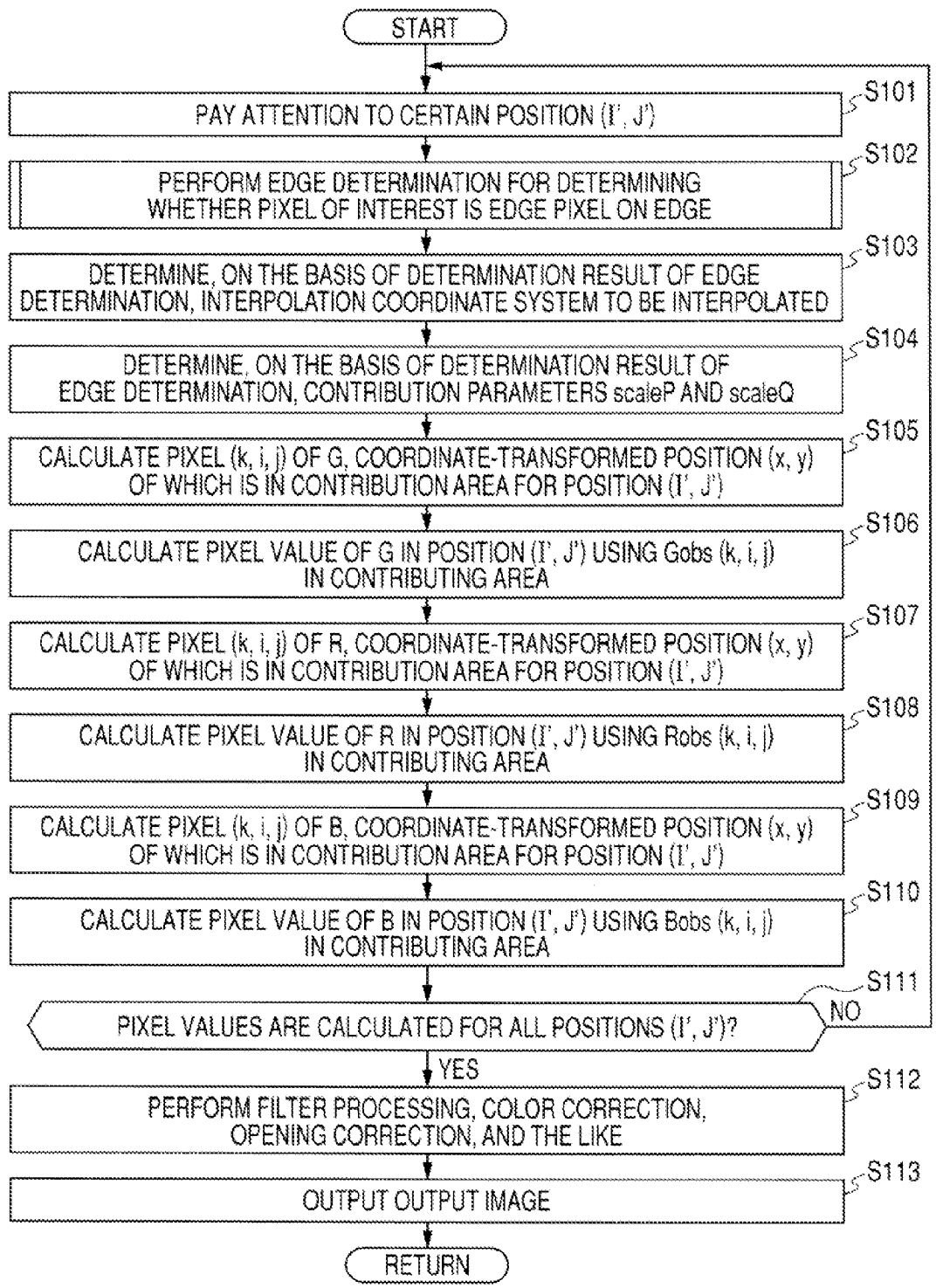
FIG. 17 is a flowchart for explaining image generation processing.

Therefore, in the image generation processing in FIG. 17, after all, the pixels, the transformed positions (x,y) of which are in the contribution area with the fixed size for the position of interest (I',J') and the transformed positions (x,y) of which on the interpolation coordinate system satisfy the expression |x|<2×scaleP and the expression |y|<2×scaleQ contribute, contribute to the interpolation of the pixel of interest.

It is possible to set an area with a size variable according to the contribution parameters scaleP and scaleQ, i.e., an area satisfying, for example, the expression |x|<2×scaleP and the expression |y|<2×scaleQ in the interpolation coordinate system as the contribution area and perform the interpolation of the pixel of interest in the position (I',J') using all pixels, the transformed positions (x,y) of which on the interpolation coordinate system are in this contribution area. In this case, as the contribution parameters scaleP and scaleQ are larger or smaller, the contribution area is a larger area or a smaller area.

Figure 18:
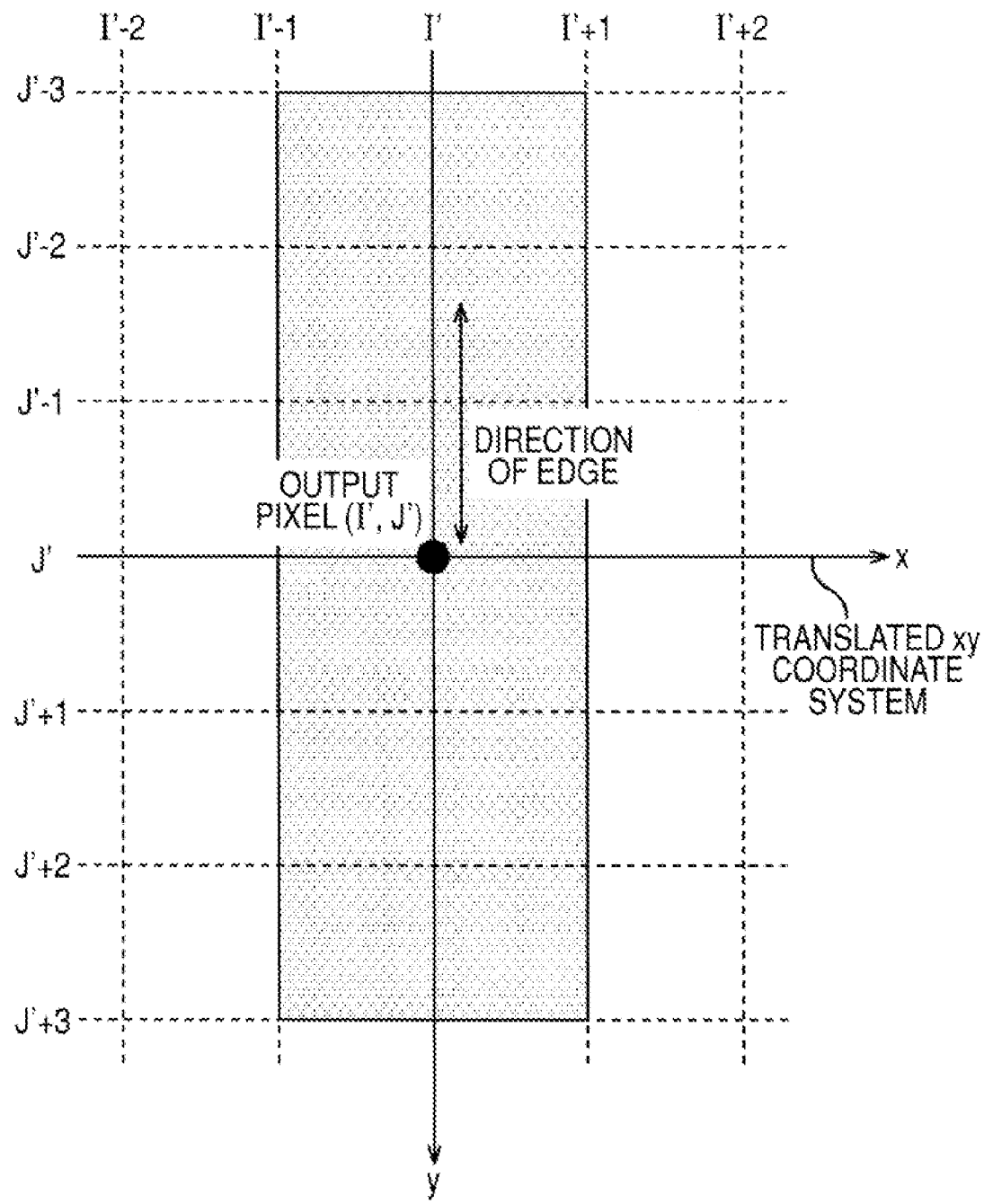
FIG. 18 is a diagram showing a contributing area with a variable size.
Figure 19:
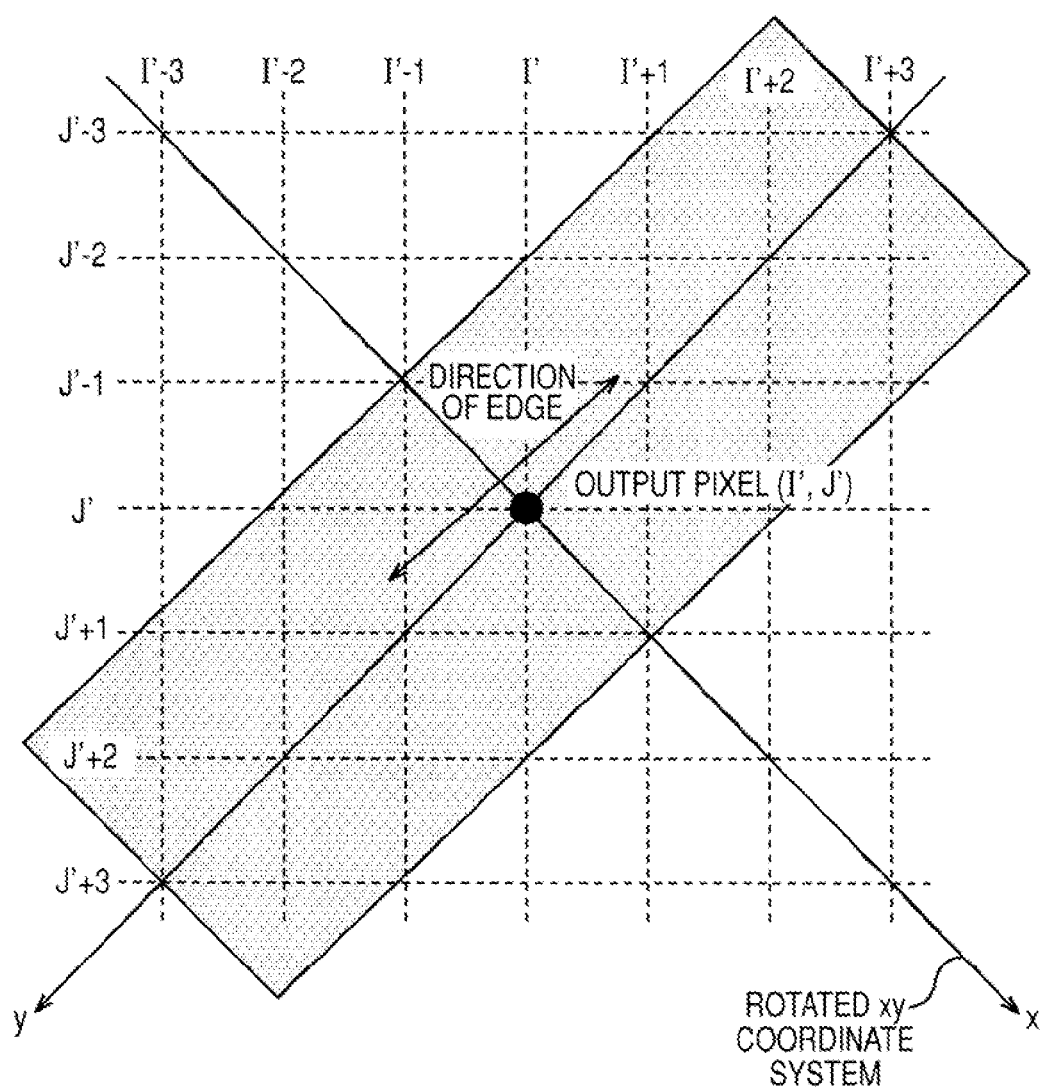
FIG. 19 is a diagram showing a contributing area with a variable size.

FIGS. 18 and 19 show the contribution area with a variable size described above.

For example, when the pixel of interest in the position (I',J') is the vertical edge pixel, the translated xy coordinate system is set as the interpolation coordinate system, the contribution parameter scaleP is adjusted to the small value $v_{small}$, and the contribution parameter scaleQ is adjusted to the large value $v_{big}$.

For example, when it is assumed that the value $v_{small}$ is 0.5, and the value $v_{big}$ is 1.5, in the translated xy coordinate system as the interpolation coordinate system, the contribution area is an area of 2×6 with an origin (the position of the pixel of interest) as the center as indicated by the hatching in FIG. 18. Only pixels of the photographed image, the transformed positions (x,y) of which on the interpolation coordinate system is in this contribution area of 2×6, contribute to the interpolation of the pixel of interest.

For example, when the pixel of interest in the position (I',J') is the right oblique edge pixel, the rotated xy coordinate system is set as the interpolation coordinate system, the contribution parameter scaleP is adjusted to the small value $\sqrt{2}\times v_{small}$, and the contribution parameter scaleQ is adjusted to the large value $\sqrt{2}\times v_{big}$.

As in the case described above, when it is assumed that the value $v_{small}$ is 0.5, and the value $v_{big}$ is 1.5, in the rotated xy coordinate system as the interpolation coordinate system, the contribution area is an area of $(\sqrt{2}\times 2)\times(\sqrt{2}\times 6)$ with the origin as the center as indicated by the hatching in FIG. 19. Only pixels of the photographed image, the transformed positions (x,y) of which on the interpolation coordinate system is in this contribution area of $(\sqrt{2}\times 2)\times(\sqrt{2}\times 6)$, contribute to the interpolation of the pixel of interest.

The processing of the edge determination performed by the arithmetic circuit 24 in step S102 in FIG. 17 will be explained with reference to a flowchart in FIG. 20.

In step S131, the arithmetic circuit 24 extracts, as pixels for determination used for the edge determination, plural pixels around the position (I',J') of the pixel of interest from, for example, the first image set as the reference image among the N photographed pixels and proceeds to step S132.

In step S132, the arithmetic circuit 24 calculates an edge degree indicating a degree of the edge direction in the pixel of interest being in the horizontal direction (hereinafter referred to as edge degree in the horizontal direction as appropriate) edgeH and an edge degree indicating a degree of the edge direction being in the vertical direction (hereinafter referred to as edge degree in the vertical direction as appropriate) edgeV using the pixels for determination and proceeds to step S133.

The arithmetic circuit 24 calculates an edge degree edge (I',J') for the pixel of interest in the position (I',J') in accordance with Equation (14) using a matrix "h" of 3×3 of Equation (13) as an operator for calculating an edge degree.

$$h = \begin{bmatrix} a_{0,0} & a_{0,1} & a_{0,2} \\ a_{1,0} & a_{1,1} & a_{1,2} \\ a_{2,0} & a_{2,1} & a_{2,2} \end{bmatrix} \quad (13)$$

$$\text{edge}(I', J') = \left| \sum_{k=0}^{2} \sum_{m=0}^{2} a_{m,k} \cdot \text{pixel}(I' + k - 1, J' + m - 1) \right| \quad (14)$$

When the matrix "h" is a matrix of 3×3 as indicated by Equation (13), nine pixels of 3×3 around the position (I',J') of the pixel of interest is used as the pixels for determination.

In Equation (14), $a_{m,k}$ indicates a component in mth row and kth column among 3×3 components of the matrix "h" of Equation (13). Moreover, in Equation (14), pixel(I'+k-1, J'+m-1) indicates a pixel value of a pixel k+1th from the left and mth from the top among the pixels for determination of 3×3 pixels.

It is possible to calculate the edge degree edgeH in the horizontal direction using, for example, the matrix "h" as the operator of Equation (15) and calculate the edge degree edgeV in the vertical direction using, for example, the matrix "h" as the operator of Equation (16), $$h = \begin{bmatrix} 0 & 0 & 0 \\ -1 & 0 & 1 \\ 0 & 0 & 0 \end{bmatrix} \quad (15)$$

$$h = \begin{bmatrix} 0 & -1 & 0 \\ 0 & 0 & 0 \\ 0 & 1 & 0 \end{bmatrix} \quad (16)$$

In step S133, the arithmetic circuit 24 calculates an edge degree ratio RatioE indicating possibility of the pixel of interest forming the edge with the edge direction in the horizontal or the vertical direction using the edge degree edgeH in the horizontal direction and the edge degree edgeV in the vertical direction and proceeds to step S134.

The arithmetic circuit 24 compares the edge degree edgeH in the horizontal direction and the edge degree edgeV in the vertical direction. When the edge degree edgeH in the horizontal direction is equal to or larger than (or larger than) the edge degree edgeV in the vertical direction, the arithmetic circuit 24 calculates edgeV/edgeH as the edge degree ratio RatioE. When the edge degree edgeV in the vertical direction is larger than the edge degree edgeH in the horizontal direction, the arithmetic circuit 24 calculates edgeH/edgeV as the edge degree ratio RatioE.

As the edge degree ratio RatioE is smaller, it is more likely that the pixel of interest forms the edge with the edge direction in the horizontal direction or the vertical direction.

In step S134, the arithmetic circuit 24 determines whether the edge degree ratio RatioE is equal to or lower than (or lower than) 0.5 as a predetermined threshold.

When it is determined in step S134 that the edge degree ratio RatioE is equal to or lower than 0.5 as the predetermined threshold, i.e., it is highly likely that the pixel of interest forms the edge with the edge direction in the horizontal or the vertical direction, the arithmetic circuit 24 proceeds to step S135. The arithmetic circuit 24 determines whether a function value of a function max(edgeH,edgeV) indicating a larger one of the edge degree edgeH in the horizontal direction and the edge degree edgeV in the vertical direction is smaller than a predetermined threshold threshNoEdge set in advance as a minimum value of an edge degree at the time when an edge is present.

When it is determined in step S135 that the function value of the function max(edgeH,edgeV) is smaller than the predetermined threshold threshNoEdge, i.e., when both the edge degree edged in the horizontal direction and the edge degree edgeV in the vertical direction are smaller than the predetermined threshold threshNoEdge, the arithmetic circuit 24 proceeds to step S136. The arithmetic circuit 24 determines that the pixel of interest is the non-edge pixel and returns to the start of the processing.

When it is determined in step S135 that the function value of the function max (edgeH,edgeV) is not smaller than the predetermined threshold threshNoEdge, i.e., when larger one of the edge degree edged in the horizontal direction and the edge degree edgeV in the vertical direction is at least equal to or larger than the predetermined threshold threshNoEdge, the arithmetic circuit 24 proceeds to step S137. The arithmetic circuit 24 determines whether the edge degree edgeH in the horizontal direction is larger than the edge degree edgeV in the vertical direction.

When it is determined in step S137 that the edge degree edgeH in the horizontal direction is larger than the edge degree edgeV in the vertical direction, the arithmetic circuit 24 proceeds to step S138. The arithmetic circuit 24 determines that the pixel of interest is the horizontal edge pixel and returns to the start of the processing.

When it is determined in step S137 that the edge degree edgeH in the horizontal direction is not larger than the edge degree edgeV in the vertical direction, the arithmetic circuit 24 proceeds to step S139. The arithmetic circuit 24 determines that the pixel of interest is the vertical edge pixel and returns to the start of the processing.

On the other hand, when it is determined in step S134 that the edge degree ratio RatioE is not equal to or lower than 0.5 as the predetermined threshold, i.e., when it is less likely that the pixel of interest forms the edge with the edge direction in the horizontal direction or the vertical direction, the arithmetic circuit 24 proceeds to step S140. The arithmetic circuit 24 calculates an edge degree indicating a degree of the edge direction in the pixel of interest being the left oblique direction (hereinafter referred to as edge degree in the left oblique direction as appropriate) edgeL and an edge degree indicating a degree of the edge direction being the right oblique direction (hereinafter referred to as edge degree in the right oblique direction) edgeR using the pixels for determination and proceeds to step S141.

It is possible to calculate the edge degree edgeL in the left oblique direction by calculating Equation (14) using, for example, the matrix "h" as the operator of Equation (17) and calculate the edge degree edgeR and calculating the edge degree edgeR in the right oblique direction by calculating Equation (14) using, for example, the matrix "h" as the operator of Equation (18).

$$h = \begin{bmatrix} -1 & 0 & 0 \\ 0 & 0 & 0 \\ 0 & 0 & 1 \end{bmatrix} \quad (17)$$

$$h = \begin{bmatrix} 0 & 0 & -1 \\ 0 & 0 & 0 \\ 1 & 0 & 0 \end{bmatrix} \quad (18)$$

The arithmetic circuit 24 proceeds to step S141 and determines whether a function value of a function max (edgeL, edgeR) indicating larger one of the edge degree edgeL in the left oblique direction and the edge degree edgeR in the right oblique direction is smaller than the predetermined threshold threshNoEdge set in advance as a minimum value of an edge degree at the time when an edge is present.

When it is determined in step S141 that the function value of the function max(edgeL,edgeR) is smaller than the predetermined threshold threshNoEdge, i.e., both the edge degree edgeL in the left oblique direction and the edge degree edgeR in the right oblique direction are smaller than the predetermined threshold threshNoEdge, the arithmetic circuit 24 proceeds to step S142. The arithmetic circuit 24 determines that the pixel of interest is the non-edge pixel and returns to the start of the processing.

When it is determined in step S141 that the function value of the function max(edgeL, edgeR) is not smaller than the predetermined threshold threshNoEdge, i.e., larger one of the edge degree edgeL in the left oblique direction and the edge degree edgeR in the right oblique direction is at least equal to or larger than the predetermined threshold threshNoEdge, the arithmetic circuit 24 proceeds to step S143. The arithmetic circuit 24 determines whether the edge degree edgeL in the left oblique direction is larger than the edge degree edgeR in the right oblique direction.

When it is determined in step S143 that the edge degree edgeL in the left oblique direction is larger than the edge degree edgeR in the right, oblique direction, the arithmetic circuit 24 proceeds to step S144. The arithmetic circuit 24 determines that the pixel of interest is the left oblique edge pixel and returns to the start of the processing.

When it is determined in step S143 that the edge degree edgeL in the left oblique direction is not larger than the edge degree edgeR in the right oblique direction, the arithmetic circuit proceeds to step S145. The arithmetic circuit 24 determines that, the pixel of interest is the right oblique edge pixel and returns to the start of the processing.

A method of the edge determination is not limited to the method of performing the edge determination by calculating an edge degree using the operator.

The operator of the matrix "h" of 3×3 indicated, by Equation (13) and Equations (15) to (13) is an example. In this embodiment, the reference image used in the calculation of the edge degree edge(I',J') together with the matrix "h" as the operator in Equation (14) is an image of the Bayer array. Actually, when the edge degree edge (I',J') is calculated using the reference image, which is the image of the Bayer array, and the operator, an operator and pixels for determination suitable for determining an edge with the image of the Bayer array as an object are used.

Moreover, the edge determination is performed using the first image itself set as the reference image among the N photographed images. Besides, for example, it is also possible to perform the edge determination using an image having all R, G, and B signals as pixel values for one pixel obtained by applying simple mosaic processing to the reference image or an image having all R, G, and B signals as pixel values for one pixel generated from the N photographed images according to the image generation processing in FIG. 11.

However, it is possible to reduce a processing amount more when the edge determination is performed using the reference image itself, which is one photographed image among the N photographed images, than when the edge determination is performed using the image obtained by applying the mosaic processing to the reference image or using the image generated from the N photographed images.

Figure 21:
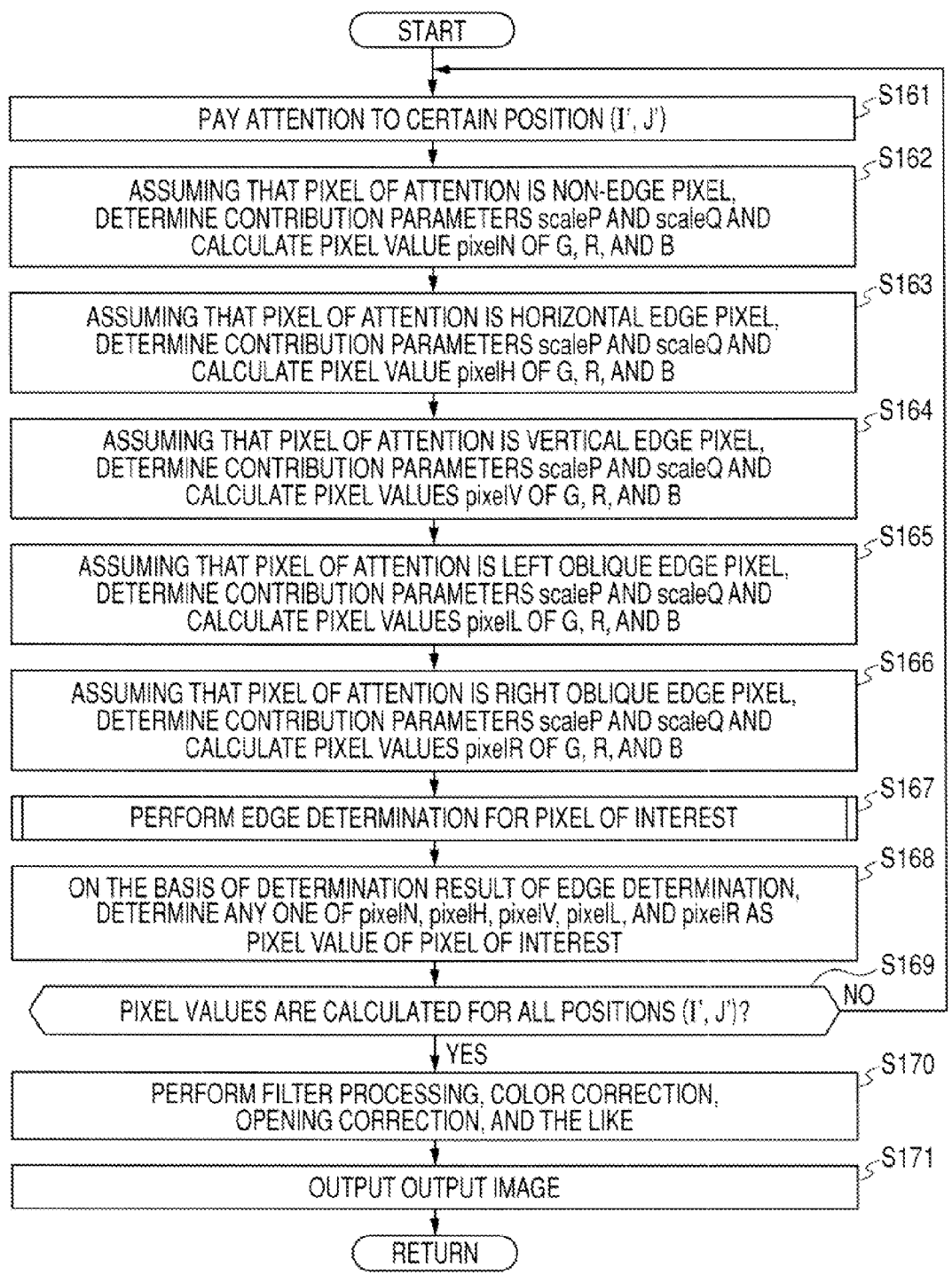
FIG. 21 is a flowchart for explaining image generation processing.

FIG. 21 is a flowchart for explaining another embodiment of the image generation processing in step S4 in FIG. 3.

In the image generation processing in FIG. 17, an edge direction in the pixel of interest is determined and (the contribution parameters scaleP and scaleQ of) the bicubic function Bicubic (p,q) of Equation (12) as the interpolation function is adjusted to perform interpolation. However, in the image generation processing in FIG. 21, first, the interpolation function is adjusted to perform interpolation and, then, an edge direction in the pixel of interest is determined.

In the image generation processing in FIG. 21, roughly speaking, for example, four directions of the horizontal direction, the vertical direction, the left oblique direction, and the right oblique direction as the plural directions are assumed as edge directions in the pixel of interest, respectively. An interpolation value as a provisional pixel value of the pixel of interest is calculated for each of the plural directions assumed as the edge directions by interpolation performed by using interpolation functions adjusted for the directions assumed as the edge directions. Thereafter, it is determined which of the horizontal direction, the vertical direction, the left oblique direction, and the right oblique direction an edge direction in the pixel of interest is. An interpolation value calculated by the interpolation function adjusted for the direction indicated by a result of the determination is set as a final pixel value of the pixel of interest.

Specifically, in step S161, as in S71 in FIG. 11, the arithmetic circuit 24 sets a certain output pixel on the reference coordinate system as a pixel of interest, selects a position (I',J') of the pixel of interest as a position of interest (I',J'), and proceeds to step S162.

In step S162, the arithmetic circuit 24 performs, assuming that the pixel of interest is the non-edge pixel, the determination of an interpolation coordinate system, and the adjustment of, for example, the contribution parameters scaleP and scaleQ of the bicubic function Bicubic(p,q)=Cubic(p/scaleP)×Cubic(q/scaleQ) of Equation (12) as the interpolation function. The arithmetic circuit 24 performs the interpolation performed by using the bicubic function Bicubic(p,q) of Equation (12) with the contribution parameters scaleP and scaleQ adjusted on the interpolation coordinate system. Consequently, the arithmetic circuit 24 calculates an interpolation value pixelN as a provisional pixel value of the pixel of interest at the time when it is assumed that the pixel of interest is the non-edge pixel and proceeds to step S163.

In other words, the arithmetic circuit 24 calculates the interpolation value at the time when it is assumed that the pixel of interest is the non-edge pixel (hereinafter also referred to as interpolation value of the non-edge pixel) pixelN by performing processing same as the processing in steps S103 to S110 performed when it is determined in step S102 of the image generation processing in FIG. 17 that the pixel of interest is the non-edge pixel.

In step S163, the arithmetic circuit 24 performs, assuming that the pixel of interest, is the horizontal edge pixel, the determination of an interpolation coordinate system and the adjustment of, for example, the contribution parameters scaleP and scaleQ of the bicubic function Bicubic(p,q)=Cubic(p/scaleP)×Cubic(q/scaleQ) of Equation (12) as the interpolation function. The arithmetic circuit 24 performs the interpolation performed by using the bicubic function Bicubic(p,q) of Equation (12) with the contribution parameters scaleP and scaleQ adjusted on the interpolation coordinate system. Consequently, the arithmetic circuit 24 calculates an interpolation value pixelH as a provisional pixel value of the pixel of interest at the time when it is assumed that the pixel of interest is the horizontal edge pixel and proceeds to step S164.

In other words, the arithmetic circuit 24 calculates the interpolation value at the time when it is assumed that the pixel of interest is the horizontal edge pixel (hereinafter also referred to as interpolation value of the horizontal edge pixel) pixelH by performing processing same as the processing in steps S103 to S110 performed when it is determined in step S102 of the image generation processing in FIG. 17 that the pixel of interest is the horizontal edge pixel.

In step S164, the arithmetic circuit 24 performs, assuming that the pixel of interest is the vertical edge pixel, the determination of an interpolation coordinate system and the adjustment of, for example, the contribution parameters scaleP and scaleQ of the bicubic function Bicubic(p,q)=Cubic(p/scaleP)×Cubic(q/scaleQ) of Equation (12) as the interpolation function. The arithmetic circuit 24 performs the interpolation performed by using the bicubic function Bicubic(p,q) of Equation (12) with the contribution parameters scaleP and scaleQ adjusted on the interpolation coordinate system. Consequently, the arithmetic circuit 24 calculates an interpolation value pixelV as a provisional pixel value of the pixel of interest at the time when it is assumed that the pixel of interest is the vertical edge pixel and proceeds to step S165.

In other words, the arithmetic circuit 24 calculates the interpolation value at the time when it is assumed that the pixel of interest is the vertical edge pixel (hereinafter also referred to as interpolation value of the vertical edge pixel) pixelV by performing processing same as the processing in steps S103 to S110 performed when it is determined in step S102 of the image generation processing in FIG. 17 that the pixel of interest is the vertical edge pixel.

In step S165, the arithmetic circuit 24 performs, assuming that the pixel of interest is the left oblique edge pixel, the determination of an interpolation coordinate system and the adjustment of, for example, the contribution parameters scaleP and scaleQ of the bicubic function Bicubic(p,q)=Cubic(p/scaleP)×Cubic(q/scaleQ) of Equation (12) as the interpolation function. The arithmetic circuit 24 per forms the interpolation performed by using the bicubic function Bicubic(p,q) of Equation (12) with the contribution parameters scaleP and scaleQ adjusted on the interpolation coordinate system. Consequently, the arithmetic circuit 24 calculates an interpolation value pixelL as a provisional pixel value of the pixel of interest at the time when it is assumed that the pixel of interest is the left oblique edge pixel and proceeds to step S166.

In other words, the arithmetic circuit 24 calculates the interpolation value at the time when it is assumed that the pixel of interest is the left oblique edge pixel, (hereinafter also referred to as interpolation value of the left, oblique edge pixel) pixelL by performing processing same as the processing in steps S103 to S110 performed when it is determined in step S102 of the image generation processing in FIG. 17 that the pixel of interest is the left oblique edge pixel.

In step S166, the arithmetic circuit 24 performs, assuming that the pixel of interest is the right oblique edge pixel, the determination of an interpolation coordinate system and the adjustment, of, for example, the contribution parameters scaleP and scaleQ of the bicubic function Bicubic(p,q)=Cubic(p/scaleP)×Cubic(q/scaleQ) of Equation (12) as the interpolation function. The arithmetic circuit 24 performs the interpolation performed by using the bicubic function Bicubic(p,q) of Equation (12) with the contribution parameters scaleP and scaleQ adjusted on the interpolation coordinate system. Consequently, the arithmetic circuit 24 calculates an interpolation value pixelR as a provisional pixel value of the pixel of interest at the time when it is assumed that the pixel of interest is the right oblique edge pixel and proceeds to step 2167.

In other words, the arithmetic circuit 24 calculates the interpolation value at the time when it is assumed that the pixel of interest is the right oblique edge pixel (hereinafter also referred to as interpolation value of the right oblique edge pixel) pixelR by performing processing same as the processing in steps S103 to S110 performed when it is determined in step S102 of the image generation processing in FIG. 17 that the pixel of interest is the right oblique edge pixel.

Figure 20:
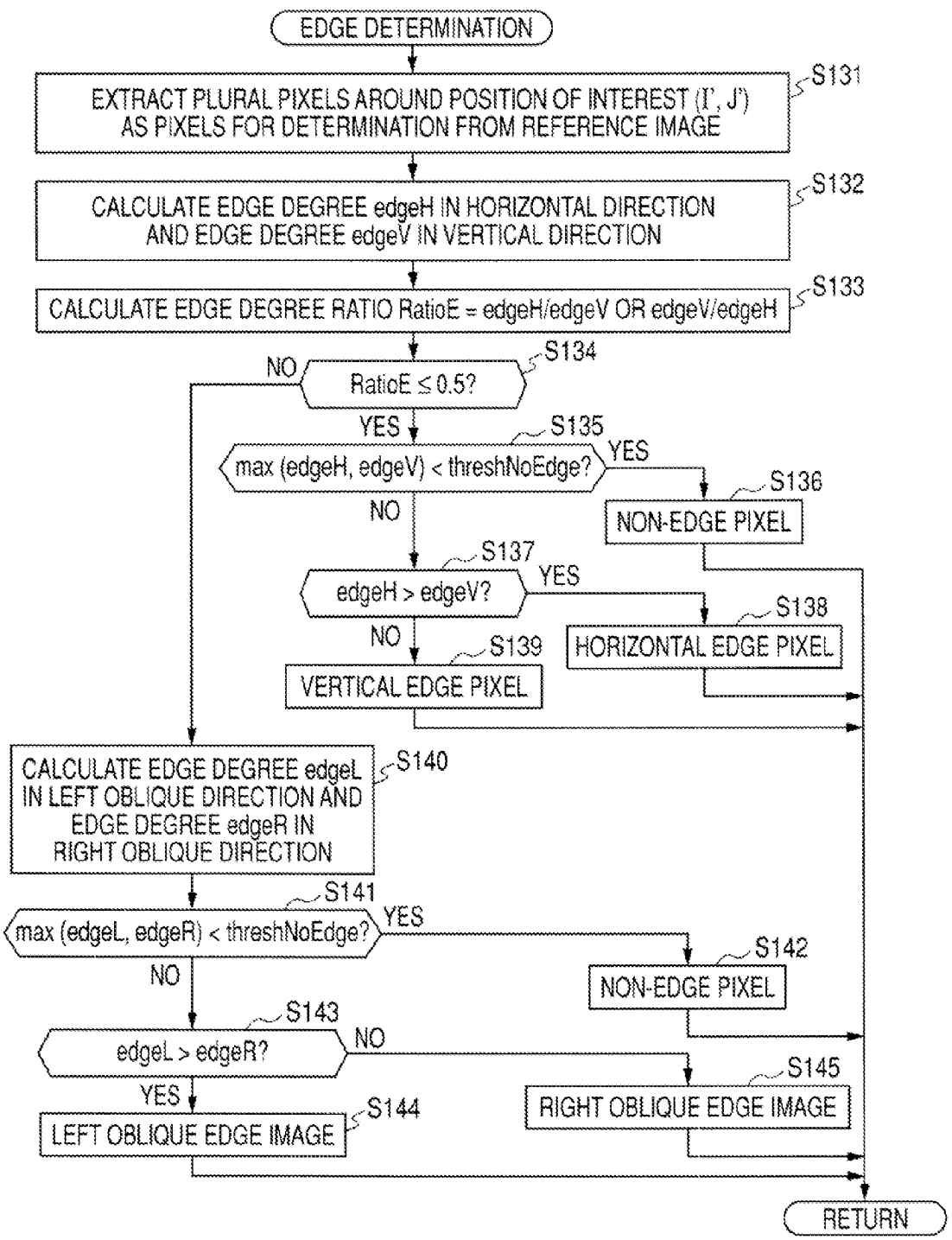
FIG. 20 is a flowchart for explaining processing of edge determination.

In step S167, the arithmetic circuit 24 applies the edge determination to the pixel of interest as in the case of step S102 in FIG. 17, i.e., as explained in the flowchart in FIG. 20 and proceeds to step S168.

In step S168, the arithmetic circuit 24 determines, on the basis of a determination result of the edge determination in step S167, any one of the five interpolation values pixelN, pixelH, pixelV, pixelL, and pixelR calculated in steps S162 to S166, respectively, as a pixel, value of the pixel of interest and proceeds to step S169.

In other words, when it is determined in the edge determination that the pixel of interest is the non-edge pixel, the horizontal edge pixel, the vertical edge pixel, the left oblique edge pixel, or the right oblique edge pixel, the arithmetic circuit 24 determines the interpolation value pixelN, pixelH, pixelV, pixelL, or pixelR as a pixel value of the pixel of interest.

In step S169, the arithmetic circuit 24 determines whether all output pixels of the output image have been set as the pixel of interest, i.e., whether the G signal Lg(I',J'), the R signal Lr(I',J'), and the B signal Lb(I',J'), which are the pixel values of all the output pixels of the output image, have been calculated.

When it is determined in step S169 that there is an output pixel that has not been set as the pixel of interest, the arithmetic circuit 24 returns to step S161 and the processing in steps S161 to S169 is repeated. The arithmetic circuit 24 sets the output pixel, which has not been set as the pixel of interest yet, as a new pixel of interest and calculates the G signal Lg(I',J'), the R signal Lr(I',J'), and the B signal Lb(I',J') of the new pixel of interest.

On the other hand, when it is determined in step S169 that all the output pixels have been set as the pixel of interest, the arithmetic circuit 24 proceeds to step S170. The arithmetic circuit 24 applies necessary processing such as filter processing, color correction processing, and opening correction to an output image having the pixel values (the G signal Lg(I',J'), the R signal Lr(I',J'), and the B signal Lb(I',J')) calculated for all the output pixels. In step S171, the arithmetic circuit 24 outputs the output image to the D/A converter 9 or the CODEC 12 and returns to the start of the processing.

The image generation processing in FIG. 17 and the image generation processing in FIG. 21 are substantially identical processing. In the image generation processing, when it is determined that the pixel of interest is the non-edge pixel, the horizontal edge pixel, the vertical edge pixel, the left oblique pixel, or the right oblique pixel, the interpolation value pixelN, pixelH, pixelV, pixelL, or pixelR itself suitable for the non-edge pixel, the horizontal edge pixel, the vertical edge pixel, the left oblique pixel, or the right, oblique pixel is determined as a pixel value of the pixel of interest.

Therefore, in the image generation processing in FIGS. 17 and 21, even if the photographed image is, for example, an image, a direction of an edge of which continuously changes as in a CZP (Circular Zone Plate) chart, and an edge direction in the pixel of interest is, for example, a direction in the middle of the horizontal direction or the vertical direction and the left oblique direction or the right oblique direction, the interpolation value pixelN, pixelH, pixelV, pixelL, or pixelR itself suitable for the horizontal edge pixel, the vertical edge pixel, the left oblique edge pixel, or the right oblique edge pixel is determined as a pixel value of the pixel of interest.

When the edge direction in the pixel of interest is, for example, a direction in the middle of the horizontal direction and the left oblique direction, the interpolation value pixelH or pixelL suitable for the horizontal edge pixel or the left oblique edge pixel is determined as a pixel value of the pixel of interest. Then, in the output image, a boundary portion between an output pixel for which the interpolation value pixelH suitable for the horizontal edge pixel is determined as a pixel value and an output pixel for which the interpolation value pixelL suitable for the left oblique edge pixel is determined as a pixel value may appear unnaturally.

Thus, when the edge direction in the pixel of interest is, for example, in the direction in the middle of the horizontal direction and the left oblique direction, the following method is possible. A blend ratio ratioB for blending the interpolation value pixelH suitable for the horizontal edge pixel and the interpolation value pixelL suitable for the left oblique edge pixel is calculated on the basis of a degree of the edge direction in the pixel of interest being the horizontal direction and a degree of the edge direction being the left oblique direction. A pixel value obtained by blending the interpolation value pixelH suitable for the horizontal edge pixel and the interpolation value pixelL suitable for the left oblique edge pixel at a ratio based on the blend ratio ratioB is set as a pixel value of the pixel of interest.

The above explanation also applies when the edge direction in the pixel of interest, is a direction in the middle of the horizontal direction and the right oblique direction, when the edge direction is a direction in the middle of the vertical direction and the left oblique direction, and when the edge direction is a direction in the middle of the vertical direction and the right oblique direction.

Figure 22:
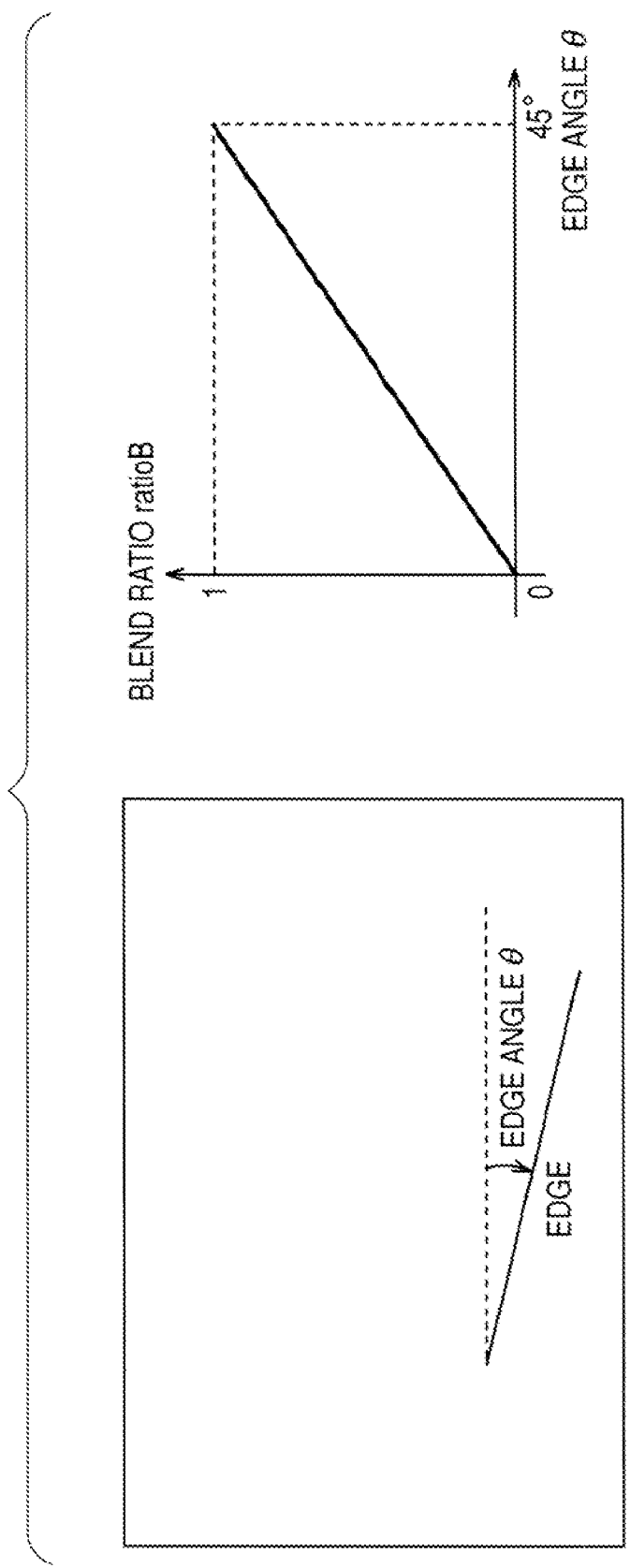
FIG. 22 is a diagram for explaining a blend ratio.

FIG. 22 shows a method of calculating the blend ratio ratioB.

For example, as shown on the left in FIG. 22, when an edge direction of an edge in the pixel of interest is tilted clockwise by a predetermined edge angle θ, which is equal to or larger than 0 degree and equal to or smaller than 45 degrees, with respect to the horizontal direction, it is possible to determine the blend ratioB of the interpolation value pixelH suitable for the horizontal edge pixel and the interpolation value pixelL suitable for the left oblique edge pixel as shown on the right in FIG. 22.

On the right in FIG. 22, when the edge angle θ is 0 degree, i.e., the edge direction is the horizontal direction, the blend ratio ratioB is set to a minimum value 0 and, as the edge angle θ increases, the blend ratio ratioB is also set larger. When the edge angle is 45 degrees, i.e., when the edge direction is the left oblique direction, the blend ratio ratioB is set to a maximum value 1.

After the blend ratio ratioB is determined as described above, it is possible to calculate a pixel value of the pixel of interest by blending the interpolation value pixelH suitable for the horizontal edge pixel and the interpolation value pixelL suitable for the left oblique edge pixel in accordance with, for example, a formula (1−ratioB)×pixelH+ratioB×pixelL.

Figure 23:
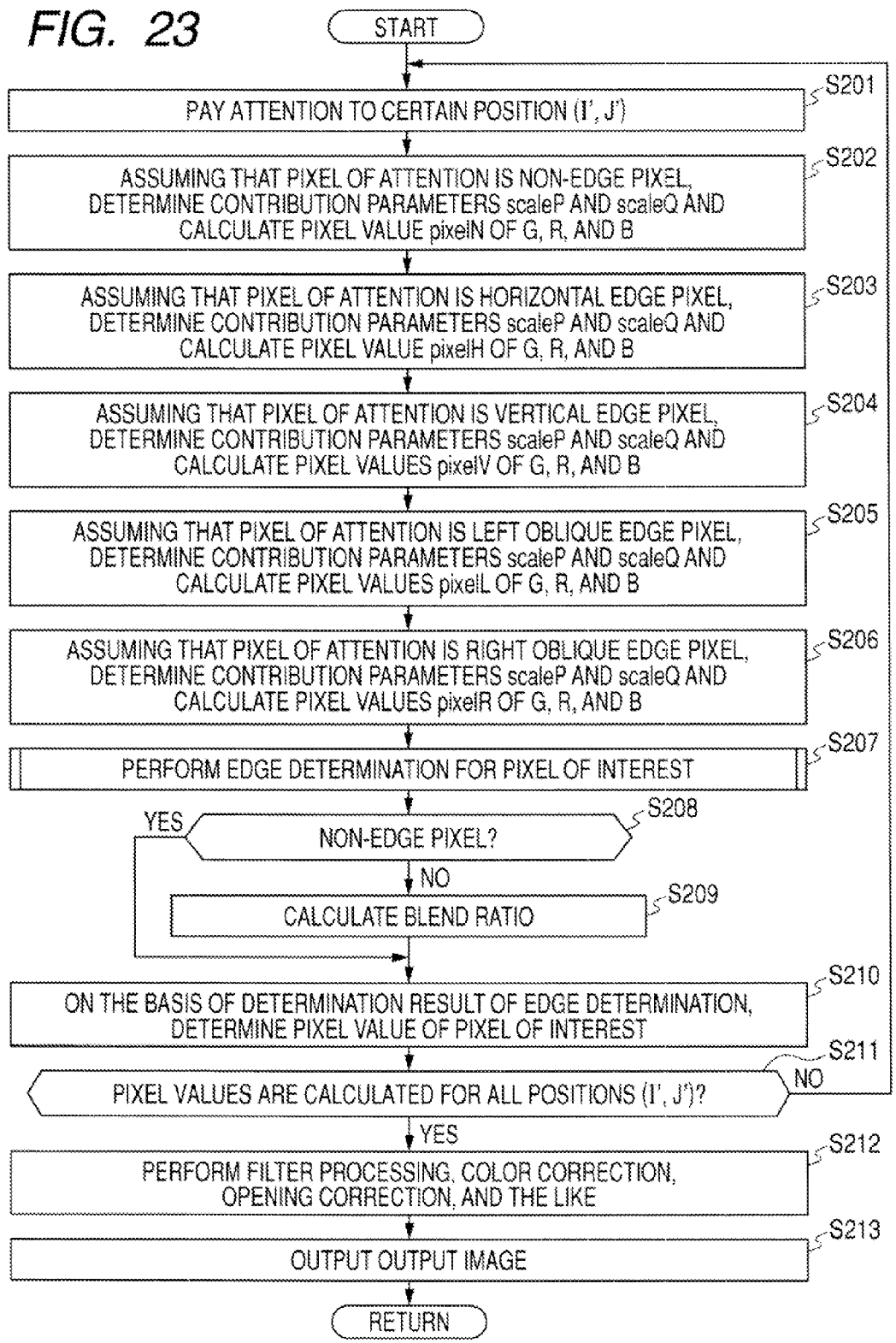
FIG. 23 is a flowchart for explaining the image generation processing.

FIG. 23 is a flowchart for explaining the image generation processing in step S4 in FIG. 3 for blending two interpolation values to calculate a pixel value of the pixel of interest as described above.

In steps S201 to S206, the arithmetic circuit 24 performs processing same as the processing in steps S161 to S166 in FIG. 21. According to the processing, the arithmetic circuit 24 calculates the interpolation values pixelN, pixelH, pixelV, pixelL, and pixelR suitable for the non-edge pixel, the horizontal edge pixel, the vertical edge pixel, the left oblique edge pixel, and the right oblique edge pixel and proceeds to step S207.

In step S207, the arithmetic circuit 24 performs edge determination for determining an edge direction of an edge in the pixel of interest of the output image and proceeds to step S208.

Processing for the edge determination in step S207 is different from the processing for the edge determination in FIG. 20.

In FIG. 20, in the edge determination, an edge degree is calculated and it is determined on the basis of the edge degree which of the five kinds of pixels, the non-edge pixel, the horizontal edge pixel, the vertical edge pixel, the left oblique edge pixel, and the right oblique edge pixel, the pixel of interest is. However, in the edge determination in step S207, an edge degree is calculated and it is determined, on the basis of the edge degree, which of nine kinds of pixels, the non-edge pixel, an intense horizontal edge pixel, an intense vertical edge pixel, an intense left oblique edge pixel, an intense right oblique edge pixel, an edge pixel in the middle of horizontal and left oblique, an edge pixel in the middle of horizontal and right oblique, an edge pixel in the middle of vertical and left oblique, and an edge pixel in the middle of vertical and right oblique, the pixel of interest is.

Figure 24:
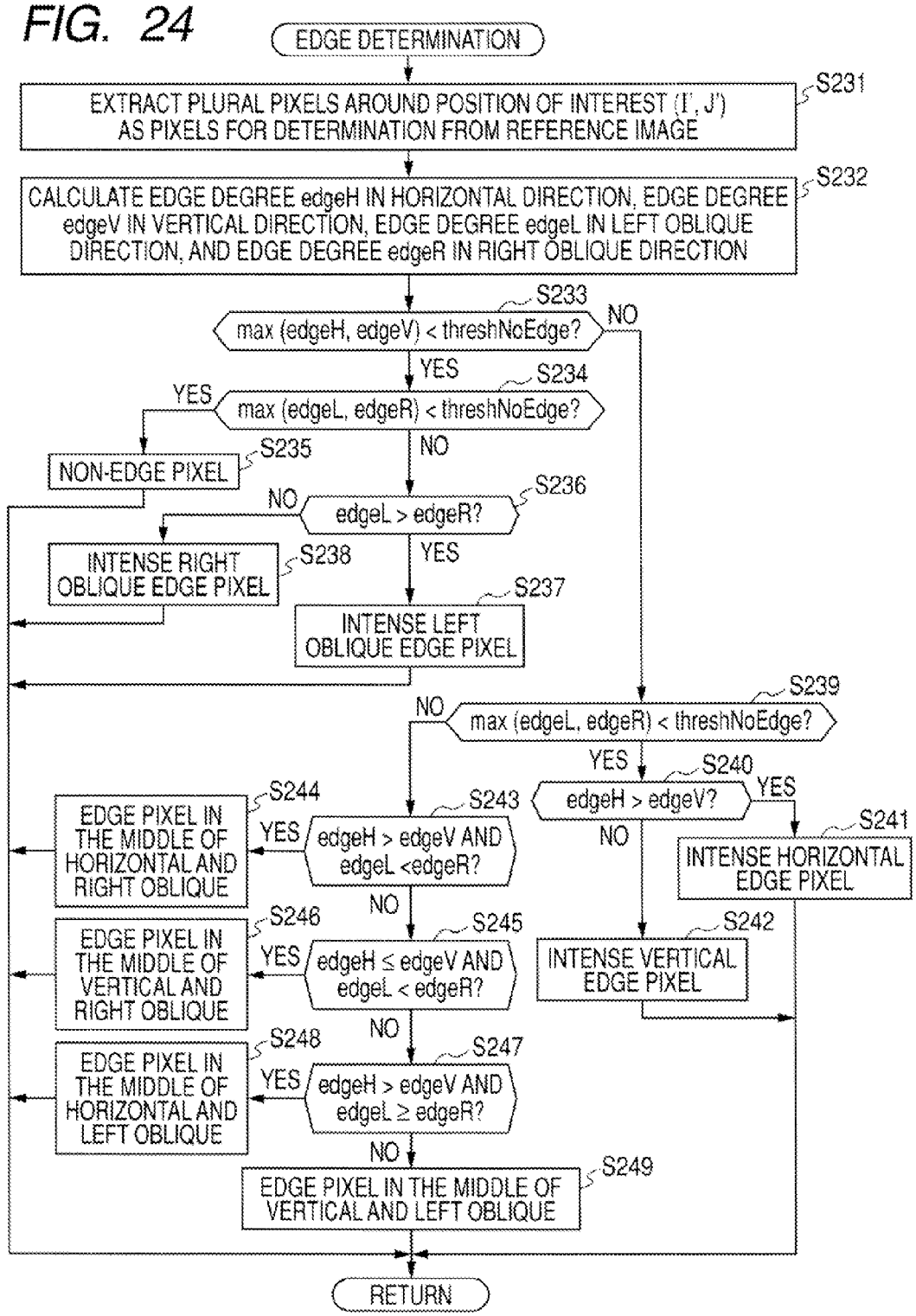
FIG. 24 is a flowchart for explaining the processing for edge determination.

Details of the processing for the edge determination in step S207 will be described later with reference to FIG. 24. The intense horizontal edge pixel is a pixel that forms an edge with an edge direction in a substantially horizontal direction. Similarly, the intense vertical edge pixel, the intense left oblique edge pixel, and the intense right oblique edge pixel are pixels that form edges with edge directions in substantially vertical, left oblique, and right oblique directions, respectively.

The edge pixel in the middle of horizontal and left oblique is a pixel that forms an edge with an edge direction in a direction in the middle of the horizontal direction and the left oblique direction. The edge pixel in the middle of horizontal and right oblique is a pixel that forms an edge with an edge direction in a direction in the middle of the horizontal direction and the right oblique direction.

Moreover, the edge pixel in the middle of vertical and left oblique is a pixel, that, forms an edge with an edge direction in a direction in the middle of the vertical direction and the left oblique direction. The edge pixel in the middle of vertical, and right oblique is a pixel that forms a pixel with an edge direction in a direction in the middle of the vertical direction and the right oblique direction.

In step S208, the arithmetic circuit 24 determines, on the basis of a determination result of the edge determination for the pixel, of interest, whether the pixel of interest is the non-edge pixel.

When it is determined in step S208 that the pixel of interest is the non-edge pixel, the arithmetic circuit 24 skips step S209 and proceeds to step S210. The arithmetic circuit 24 determines, on the basis of a determination result of the edge determination that the pixel of interest is the non-edge pixel, the interpolation value pixelN suitable for interpolation of the non-edge pixel as a pixel value of the pixel of interest and proceeds to step S211.

On the other hand, when it is determined in step S208 that the pixel of interest is not the non-edge pixel, i.e., it is determined in the edge determination that the pixel of interest is any one of the intense horizontal edge pixel, the intense vertical edge pixel, the intense left oblique edge pixel, the intense right oblique edge pixel, the edge pixel in the middle of horizontal and left oblique, the edge pixel in the middle of horizontal and right oblique, the edge pixel in the middle of vertical and left oblique, and the edge pixel in the middle of vertical and right oblique other than the non-edge pixel, the arithmetic circuit 24 proceeds to step S209. The arithmetic circuit 24 calculates the blend ratio ratioB and proceeds to step S210.

In step S210, the arithmetic circuit 24 calculates a pixel value of the pixel of interest by blending, on the basis of a determination result of the edge determination, two of the interpolation values pixelN, pixelH, pixelV, pixelL, and pixelR suitable for the non-edge pixel, the horizontal edge pixel, the vertical edge pixel, the left oblique edge pixel, and the right oblique edge pixel in accordance with the blend ratio ratioB and proceeds to step S211.

In other words, in the edge determination in step S207, as described later with reference to FIG. 24, the edge degree edgeH in the horizontal direction and the edge degree edgeV in the vertical direction are calculated. In step S209, the blend ratio ratioB is calculated using the edge degree edgeH in the horizontal direction and the edge degree edgeV in the vertical direction.

Specifically, in step S209, the edge degree edgeH in the horizontal direction and the edge degree edgeV in the vertical direction are compared and, when the edge degree edgeH in the horizontal direction is larger than the edge degree edgeV in the vertical direction, edgeV/edgeH is calculated as the blend ratio ratioB. When the edge degree edgeH in the horizontal direction is not larger than the edge degree edgeV in the vertical direction, edgeH/edgeV is calculated as the blend ratio ratioB.

In step S210, on the basis of the determination result of the edge determination indicating that the pixel of interest is the intense horizontal edge pixel, the intense vertical edge pixel, the intense left oblique edge pixel, the intense right oblique edge pixel, the edge pixel in the middle of horizontal and left oblique, the edge pixel in the middle of horizontal and right oblique, the edge pixel in the middle of vertical and left oblique, or the edge pixel in the middle of vertical and right oblique, two of the five interpolation values pixelN, pixelH, pixelV, pixelL, and pixelR suitable for the non-edge pixel, the horizontal edge pixel, the vertical edge pixel, the left oblique edge pixel, and the right oblique edge pixel are blended in accordance with the blend ratio B, whereby a pixel value of the pixel of interest is calculated.

Specifically, when it is determined in the edge determination that the pixel of interest is the intense horizontal edge pixel, the two interpolation values pixelN and pixelH among the five interpolation values pixelN, pixelH, pixelV, pixelL, and pixelR are blended in accordance with a formula (1−ratioB)×pixelH+ratioB×pixelN and a pixel value of the pixel of interest is calculated.

When it is determined in the edge determination that the pixel of interest is the intense vertical edge pixel, the two interpolation values pixelN and pixelV among the five interpolation values pixelN, pixelH, pixelV, pixelL, and pixelR are blended in accordance with a formula (1−ratioB)×pixelV+ratioB×pixelN and a pixel value of the pixel of interest is calculated.

When it is determined in the edge determination that the pixel of interest is the intense left oblique edge pixel, the two interpolation values pixelN and pixelL among the five interpolation values pixelN, pixelH, pixelV, pixelL, and pixelR are blended in accordance with a formula (1−ratioB)×pixelN+ratioB×pixelL and a pixel value of the pixel of interest is calculated.

When it is determined in the edge determination that the pixel of interest is the intense right oblique edge pixel, the two interpolation values pixelN and pixelR among the five interpolation values pixelN, pixelH, pixelV, pixelL, and pixelR are blended in accordance with a formula (1−ratioB)×pixelH+ratioB×pixelL and a pixel value of the pixel of interest is calculated.

When it is determined in the edge determination that the pixel of interest is the edge pixel in the middle between horizontal and left oblique, the two interpolation values pixelH and pixelR among the five interpolation values pixelN, pixelH, pixelV, pixelL, and pixelR are blended in accordance with a formula (1−ratioB)×pixelH+ratioB×pixelL and a pixel value of the pixel of interest is calculated.

When it is determined in the edge determination that the pixel of interest is the edge pixel in the middle between horizontal and right oblique, the two interpolation values pixelH and pixelR among the five interpolation values pixelN, pixelH, pixelV, pixelL, and pixelR are blended in accordance with a formula (1−ratioB)×pixelH+ratioB×pixelR and a pixel value of the pixel of interest is calculated.

When it is determined in the edge determination that, the pixel of interest is the edge pixel in the middle between vertical and left oblique, the two interpolation values pixelV and pixelL among the five interpolation values pixelN, pixelH, pixelV, pixelL, and pixelR are blended in accordance with a formula (1−ratioB)×pixelV+ratioB×pixelL and a pixel value of the pixel of interest is calculated.

Moreover, when it is determined in the edge determination that the pixel of interest is the edge pixel in the middle between vertical and right oblique, the two interpolation values pixelV and pixelR among the five interpolation values pixelN, pixelH, pixelV, pixelL, and pixelR are blended in accordance with a formula (1−ratioB)×pixelV+ratioB×pixelR and a pixel value of the pixel of interest is calculated.

In step S211, the arithmetic circuit 24 determines whether all output pixels of the output image have been set as the pixel of interest, i.e., whether the G signal Lg(I',J'), the R signal Lr(I',J'), and the R signal Lb(I',J'), which are pixel values of all the output pixels of the output image, have been calculated.

When it is determined in step S211 that there is an output pixel that has not been set as the pixel of interest, the arithmetic circuit 24 returns to step S201 and the processing in steps S201 to S211 is repeated. The arithmetic circuit 24 sets the output pixel, which has not been set as the pixel of interest yet, as a new pixel of interest and calculates pixel values (the G signal Lg(I',J'), the R signal Lr(I',J'), and the B signal Lb(I',J')) of the new pixel of interest.

On the other hand, when it is determined in step S211 that all the output pixels have been set as the pixel of interest, the arithmetic circuit 24 proceeds to step S212. The arithmetic circuit 24 applies necessary processing such as filter processing, color correction processing, and opening correction to an output image having the pixel values (the G signal Lg(I',J'), the R signal Lr(I',J'), and the B signal Lb(I',J')) calculated for all the output pixels. In step S213, the arithmetic circuit 24 outputs the output image to the D/A converter 9 or the CODEC 12 and returns to the start of the processing.

The processing of the edge determination performed by the arithmetic circuit 24 in step S207 in FIG. 23 will be explained with reference to a flowchart in FIG. 24.

In step S231, as in step S131 in FIG. 20, the arithmetic circuit 24 extracts, as pixels for determination used for the edge determination, plural pixels around the position (I',J') of the pixel of interest from, for example, the first image set as the reference image among the N photographed pixels and proceeds to step S232.

In step S232, as in steps S132 and S140 in FIG. 20, the arithmetic circuit 24 calculates the edge degree edgeH in the horizontal direction, the edge degree edgeV in the vertical direction, the edge degree edgeL in the left oblique direction, and the edge degree edgeR in the right oblique direction using the pixels for de termination and proceeds to step S233.

In step S233, the arithmetic circuit 24 determines whether a function value of the function max(edgeH,edgeV) indicating larger one of the edge degree edgeH in the horizontal direction and the edge degree edgeV in the vertical direction is smaller than the predetermined threshold threshNoEdge set in advance as the minimum value of an edge degree at the time when an edge is present.

When it is determined in step S233 that the function value of the function max(edgeH,edgeV) is smaller than the predetermined threshold threshNoEdge, i.e., when both, the edge degree edgeH in the horizontal direction and the edge degree edgeV in the vertical direction are smaller than the predetermined threshold threshNoEdge, the arithmetic circuit 24 proceeds to step S234. The arithmetic circuit 24 determines whether a function value of the function max(edgeL,edgeR) indicating larger one of the edge degree edgeL in the left oblique direction and the edge degree edgeR in the right oblique direction is smaller than the predetermined, threshold threshNoEdge set in advance as the minimum value of an edge degree at the time when an edge is present.

When it is determined in step S234 that, the function value of the function max(edgeL,edgeR) is smaller than the predetermined threshold threshNoEdge, i.e., when both the edge degree edgeL in the left oblique direction and the edge degree edgeR in the right oblique direction are smaller than the predetermined threshold threshNoEdge, the arithmetic circuit 24 proceeds to step S235. The arithmetic circuit 24 determines that the pixel of interest is the non-edge pixel and returns to the start of the processing.

When it is determined in step S234 that the function value of the function max(edgeL,edgeR) is not smaller than the predetermined threshold threshNoEdge, i.e., when larger one of the edge degree edgeL in the left oblique direction and the edge degree edgeR in the right oblique direction is at least equal to or larger than the predetermined threshold threshNoEdge, the arithmetic circuit 24 proceeds to step S236. The arithmetic circuit 24 determines whether the edge degree edgeL in the left oblique direction is larger than the edge degree edgeR in the right oblique direction.

When it is determined in step S236 that the edge degree edgeL in the left oblique direction is larger than the edge degree edgeR in the right oblique direction, the arithmetic circuit 24 proceeds to step S237. The arithmetic circuit 24 determines that the pixel of interest is the intense left oblique edge pixel and returns to the start of the processing.

When it is determined in step S236 that the edge degree edgeL in the left oblique direction is not larger than the edge degree edgeR in the right oblique direction, the arithmetic circuit 24 proceeds to step S238. The arithmetic circuit 24 determines that the pixel of interest is the intense right oblique edge pixel and returns to the start of the processing.

On the other hand, when it is determined in step S233 that the function value of the function max(edgeH,edgeV) is not smaller than the predetermined threshold threshNoEdge, i.e., when larger one of the edge degree edgeH in the horizontal direction and the edge degree edgeV in the vertical direction is at least equal to or larger than the predetermined threshold threshNoEdge, the arithmetic circuit 24 proceeds to step S239. As in step S234, the arithmetic circuit 24 determines whether the function value of the function max(edgeL, edgeR) indicating larger one of the edge degree edgeL in the left oblique direction and the edge degree edgeR in the right oblique direction is smaller than the predetermined threshold threshNoEdge.

When it is determined in step S239 that the function value of the function max(edgeL,edgeR) is smaller than the predetermined threshold threshNoEdge, i.e., both the edge degree edgeL in the left oblique direction and the edge degree edgeR in the right oblique direction are smaller than the predetermined threshold threshNoEdge, the arithmetic circuit 24 proceeds to step S240. The arithmetic circuit 24 determines whether the edge degree edgeH in the horizontal direction is Larger than the edge degree edgeV in the vertical direction.

When it is determined in step S240 that the edge degree edgeH in the horizontal direction is larger than the edge degree edgeV in the vertical direction, the arithmetic circuit 24 proceeds to step S241. The arithmetic circuit 24 determines that the pixel of interest is the intense horizontal edge pixel and returns to the start of the processing.

When it is determined in step S240 that the edge degree edgeH in the horizontal direction is not larger than the edge degree edgeV in the vertical direction, the arithmetic circuit 24 proceeds to step S242. The arithmetic circuit 24 determines that the pixel of interest is the intense vertical edge pixel and returns to the start of the processing.

On the other hand, when it is determined in step S239 that the function value of the function max(edgeL,edgeR) is not smaller than the predetermined threshNoEdge, i.e., when larger one of the edge degree edgeL in the left oblique direction and the edge degree edgeR in the right oblique direction is at least equal to or larger than the predetermined threshold threshNoEdge, the arithmetic circuit 24 proceeds to step S243. The arithmetic circuit 24 determines whether the edge degree edgeH in the horizontal direction is larger then the edge degree edgeV in the vertical direction and the edge degree edgeL in the left oblique direction is smaller than the edge degree edgeR in the right oblique direction.

When it is determined in step S243 that, the edge degree edgeH in the horizontal direction is larger than the edge degree edgeV in the vertical direction and the edge degree edgeL in the left oblique direction is smaller than the edge degree edgeR in the right oblique direction, the arithmetic circuit 24 proceeds to step S244. The arithmetic circuit 24 determines that the pixel of interest is the edge pixel in the middle of horizontal and right oblique and returns to the start, of the processing.

When it is determined in step S243 that the edge degree edgeH in the horizontal direction is not larger than the edge degree edgeV in the vertical direction or the edge degree edgeL in the left oblique direction is not smaller than the edge degree edgeR in the right, oblique direction, the arithmetic circuit 24 proceeds to step S245. The arithmetic circuit 24 determines whether the edge degree edgeH in the horizontal direction is equal to or smaller than the edge degree edgeV in the vertical direction and the edge degree edgeL in the left oblique direction is smaller than the edge degree edgeR in the right oblique direction.

When it is determined in step S245 that the edge degree edgeH in the horizontal direction is equal to or smaller than the edge degree edgeV in the vertical direction and the edge degree edgeL in the left oblique direction is smaller than the edge degree edgeR in the right oblique direction, the arithmetic circuit 24 proceeds to step S246. The arithmetic circuit 24 determines that the pixel of interest is the edge pixel in the middle of vertical and right oblique and returns to the start of the processing.

When it is determined in step S245 that the edge degree edged in the horizontal direction is not equal to or smaller than the edge degree edgeV in the vertical direction or the edge degree edgeL in the left oblique direction is not smaller than the edge degree edgeR in the right oblique direction, the arithmetic circuit 24 proceeds to step S247. The arithmetic circuit 24 determines whether the edge degree edgeH in the horizontal direction is larger than the edge degree edgeV in the vertical direction and the edge degree edgeL in the left oblique direction is equal to or larger than the edge degree edgeR in the right oblique direction.

When it is determined in step S247 that the edge degree edgeH in the horizontal direction is larger than the edge degree edgeV in the vertical direction and the edge degree edgeL in the left oblique direction is equal to or larger than the edge degree edgeR in the right oblique direction, the arithmetic circuit 24 proceeds to step S248. The arithmetic circuit 24 determines that the pixel of interest is the edge pixel in the middle of horizontal and left oblique and returns to the start of the processing.

When it is determined in step S247 that the edge degree edgeH in the horizontal direction is not larger than the edge degree edgeV in the vertical direction or the edge degree edgeL in the left oblique direction is not equal to or larger than the edge degree edgeR in the right oblique direction, i.e., the edge degree edgeV in the vertical direction is equal to or larger than the edge degree edgeH in the horizontal direction and the edge degree edgeL in the left oblique direction is equal to or larger than the edge degree edgeR in the right oblique direction, the arithmetic circuit 24 proceeds to step S249. The arithmetic circuit 24 determines that the pixel of interest is the edge pixel in the middle or vertical and left oblique and returns to the start of the processing.

Figure 25:
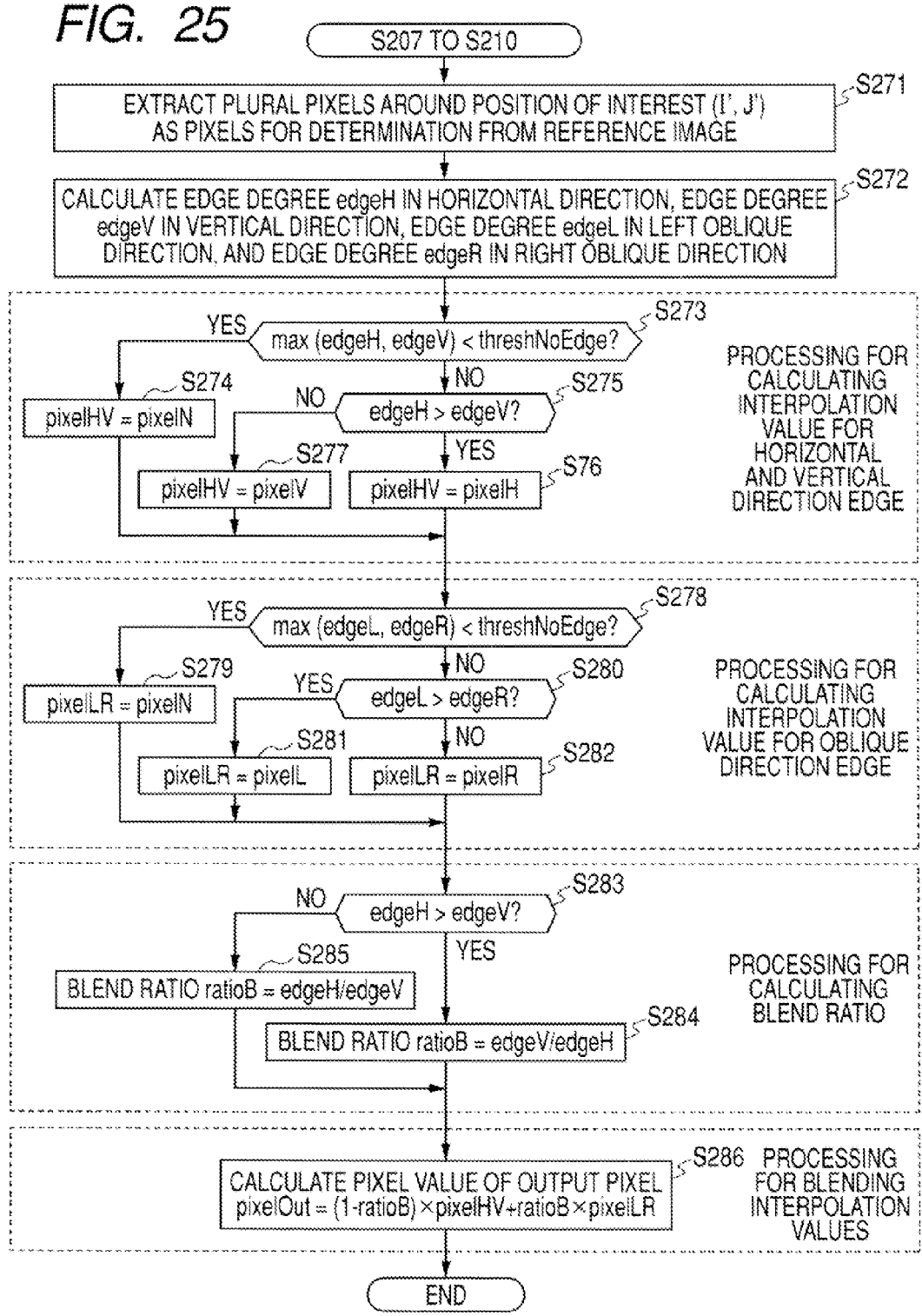
FIG. 25 is a flowchart for explaining processing in steps S207 to S210.

It is possible to perform, in implementation, the processing in steps S207 to S210 in FIG. 23, for example, as shown in FIG. 25.

FIG. 25 is a flowchart for explaining processing performed by the arithmetic circuit 24 when the arithmetic circuit 24 performs the processing in steps S207 to S210 in FIG. 23 in a procedure different from the procedure described above.

In FIG. 25, in step S271, as in step S131 in FIG. 20, the arithmetic circuit 24 extracts, as pixels for determination used for the edge determination, plural pixels around the position (I',J') of the pixel of interest from, for example, the first image set as the reference image among the N photographed pixels and proceeds to step S272.

In step S272, for example, as in steps S132 and S140 in FIG. 20, the arithmetic circuit 24 calculates the edge degree edgeH in the horizontal direction, the edge degree edgeV in the vertical direction, the edge degree edgeL in the left oblique direction, and the edge degree edgeR in the right oblique direction using the pixels for determination and proceeds to step S273.

In steps S273 to S277, calculation processing for calculating an interpolation value pixelHV for horizontal and vertical direction edges is performed.

In the calculation processing for calculating the interpolation value pixelHV for horizontal and vertical direction edges, when it is assumed that the pixel of interest is any one of the non-edge pixel, the horizontal edge pixel, and the vertical edge pixel, an interpolation value suitable as a pixel value of the pixel of interest is calculated as the interpolation value pixelHV for horizontal and vertical direction edges.

In step S273, the arithmetic circuit 24 determines whether a function value of the function max(edgeH,edgeV) indicating larger one of the edge degree edgeH in the horizontal direction and the edge degree edgeV in the vertical direction is smaller than the predetermined threshold threshNoEdge set in advance as the minimum value of an edge degree at the time when an edge is present.

When it is determined in step S273 that the function value of the function max(edgeH,edgev) is smaller than the predetermined threshold threshNoEdge, i.e., both the edge degree edgeH in the horizontal direction and the edge degree edgeV in the vertical direction are smaller than the predetermined threshold threshNoEdge, the arithmetic circuit 24 proceeds to step S274. The arithmetic circuit 24 selects the interpolation value pixelN suitable for the non-edge pixel as the interpolation value pixelHV for horizontal and vertical direction edges and proceeds to step S278.

When it is determined in step S273 that the function value of the function max(edgeH,edgeV) is not smaller than the predetermined threshold threshNoEdge, i.e., larger one of the edge degree edgeH in the horizontal direction and the edge value edgeV in the vertical direction is at least equal to or larger than the predetermined threshold threshNoEdge, the arithmetic circuit 24 proceeds to step S275. The arithmetic circuit 24 determines whether the edge degree edgeH in the horizontal direction is larger than the edge degree edgeV in the vertical direction.

When it is determined in step S275 that the edge degree edgeH in the horizontal direction is larger than the edge degree edgeV in the vertical direction, the arithmetic circuit 24 proceeds to step S276. The arithmetic circuit 24 selects the interpolation value pixelH suitable for the horizontal edge pixel as the interpolation value pixelHV for horizontal and vertical direction edges and proceeds to step S278.

When it is determined in step S275 that the edge degree edgeH in the horizontal direction is not larger than the edge degree edgeV in the vertical direction, the arithmetic circuit 24 proceeds to step S277. The arithmetic circuit 24 selects the interpolation value pixelV suitable for the vertical edge pixel as the interpolation value pixelHV for horizontal and vertical direction edges and proceeds to step S278.

In steps S278 to S282, calculation processing for calculating an interpolation value pixelLR for oblique direction edges is performed.

In the calculation processing for calculating the interpolation value pixelLR for oblique direction edges, when it is assumed that the pixel of interest is any one of the non-edge pixel, the left oblique edge pixel, or the right oblique edge pixel, an interpolation value suitable as a pixel value of the pixel of interest is calculated as the interpolation value pixelLR for oblique direction edges.

In step S278, the arithmetic circuit 24 determines whether a function value of the function max(edgeL,edgeR) indicating larger one of the edge degree edgeL in the left oblique direction and the edge degree edgeR in the right oblique direction is smaller than the predetermined threshold threshNoEdge set in advance as the minimum value of an edge degree at the time when an edge is present.

When it is determined in step S278 that the function value of the function max(edgeL,edgeR) is smaller than the predetermined threshold threshNoEdge, i.e., both the edge degree edgeL in the left oblique direction and the edge degree edgeR in the right oblique direction are smaller than the predetermined threshold threshNoEdge, the arithmetic circuit 24 proceeds to step S279. The arithmetic circuit 24 selects the interpolation value pixelN suitable for the non-edge pixel as the interpolation value pixelLR for oblique direction edges and proceeds to step S283.

When it is determined in step S278 that the function value of the function max(edgeL,edgeR) is not smaller than the predetermined threshold threshNoEdge, i.e., larger one of the edge degree edgeL in the left oblique direction and the edge value edgeR in the right oblique direction is at least equal to or larger than the predetermined threshold threshNoEdge, the arithmetic circuit 24 proceeds to step S280. The arithmetic circuit 24 determines whether the edge degree edgeL in the left oblique direction is larger than the edge degree edgeR in the right oblique direction.

When it is determined in step S280 that the edge degree edgeL in the left oblique direction is larger than the edge degree edgeR in the right oblique direction, the arithmetic circuit 24 proceeds to step S281. The arithmetic circuit 24 selects the interpolation value pixelL suitable for the left oblique edge pixel as the interpolation value pixelLR for oblique direction edges and proceeds to step S283.

When it is determined in step S280 that the edge degree edgeL in the left oblique direction is not larger than the edge degree edgeR in the right oblique direction, the arithmetic circuit 24 proceeds to step S282. The arithmetic circuit 24 selects the interpolation value pixelR suitable for the right oblique edge pixel as the interpolation value pixelLR for oblique direction edges and proceeds to step S283.

In steps S283 to S285, calculation processing for calculating a blend ratio ratioB indicating a ratio for blending the interpolation value pixelHV for horizontal and vertical direction edges and the interpolation value pixelLR for oblique direction edges is performed.

In step S283, the arithmetic circuit 24 determines whether the edge degree edgeR in the horizontal direction is larger than the edge degree edgeV in the vertical direction.

When it is determined in step S283 that the edge degree edgeH in the horizontal direction is larger than the edge degree edgeV in the vertical direction, the arithmetic circuit 24 proceeds to step S284. The arithmetic circuit 24 calculates edgeV/edgeH obtained by dividing the edge degree edgeV in the vertical direction by the edge degree edgeR in the horizontal direction as the blend ratio ratioB and proceeds to step S286.

When it is determined in step S283 that the edge degree edgeH in the horizontal direction is not larger than the edge degree edgeV in the vertical direction, the arithmetic circuit 24 proceeds to step S285. The arithmetic circuit 24 calculates edgeH/edgeV obtained by dividing the edge degree edgeH in the horizontal direction by the edge degree edgeV in the vertical direction as the blend ratio ratioB and proceeds to step S286.

In step S286, the arithmetic circuit 24 calculates a pixel value pixelOut of the pixel of interest by performing blend processing for blending the interpolation value pixelHV for horizontal and vertical direction edges and the interpolation value pixelLR for oblique direction edges in accordance with, for example, Equation (19).

$$pixelOut=(1-ratioB) \times pixelHV + ratioB \times pixelLR \quad (19)$$

As described above, the plural directions such as the horizontal direction are assumed as edge directions, respectively, and interpolation values are calculated for the respective plural directions assumed as the edge directions according to the interpolation performed by using the interpolation functions adjusted for the directions assumed as the edge directions. The interpolation values calculated for the plural directions are blended on the basis of a degree of an edge direction in the pixel of interest being a predetermined direction among the plural directions to calculate a pixel value of the pixel of interest. In other words, assuming that the pixel of interest is the non-edge pixel, the horizontal edge pixel, the vertical edge pixel, the left oblique edge pixel, or the right oblique edge pixel, the interpolation is performed by adjusting the interpolation functions to calculate the interpolation values pixelN, pixelH, pixelV, pixelL, and pixelR suitable for the non-edge pixel, the horizontal edge pixel, the vertical edge pixel, the left oblique edge pixel, and the right oblique edge pixel, respectively. According to the edge degree edgeH in the horizontal direction and the edge degree edgeV in the vertical direction, two interpolation values among the five interpolation values pixelN, pixelH, pixelV, pixelL, and pixelR are blended on the basis of the blend ratio ratioB as a degree of the edge direction being in the horizontal direction or the vertical direction to calculate a pixel value of the pixel of interest. In this case, when the photographed image is, for example, an image, a direction of an edge of which continuously changes as in a CZP chart, it is possible to prevent (reduce) appearance of an unnatural boundary portion of interpolation values described above in an output image and obtain a high-quality output image.

It is possible to perform the series of processing described above using hardware or software. In performing the series of processing using the software, a computer program forming the software is installed in a general-purpose computer or the like.

Figure 26:
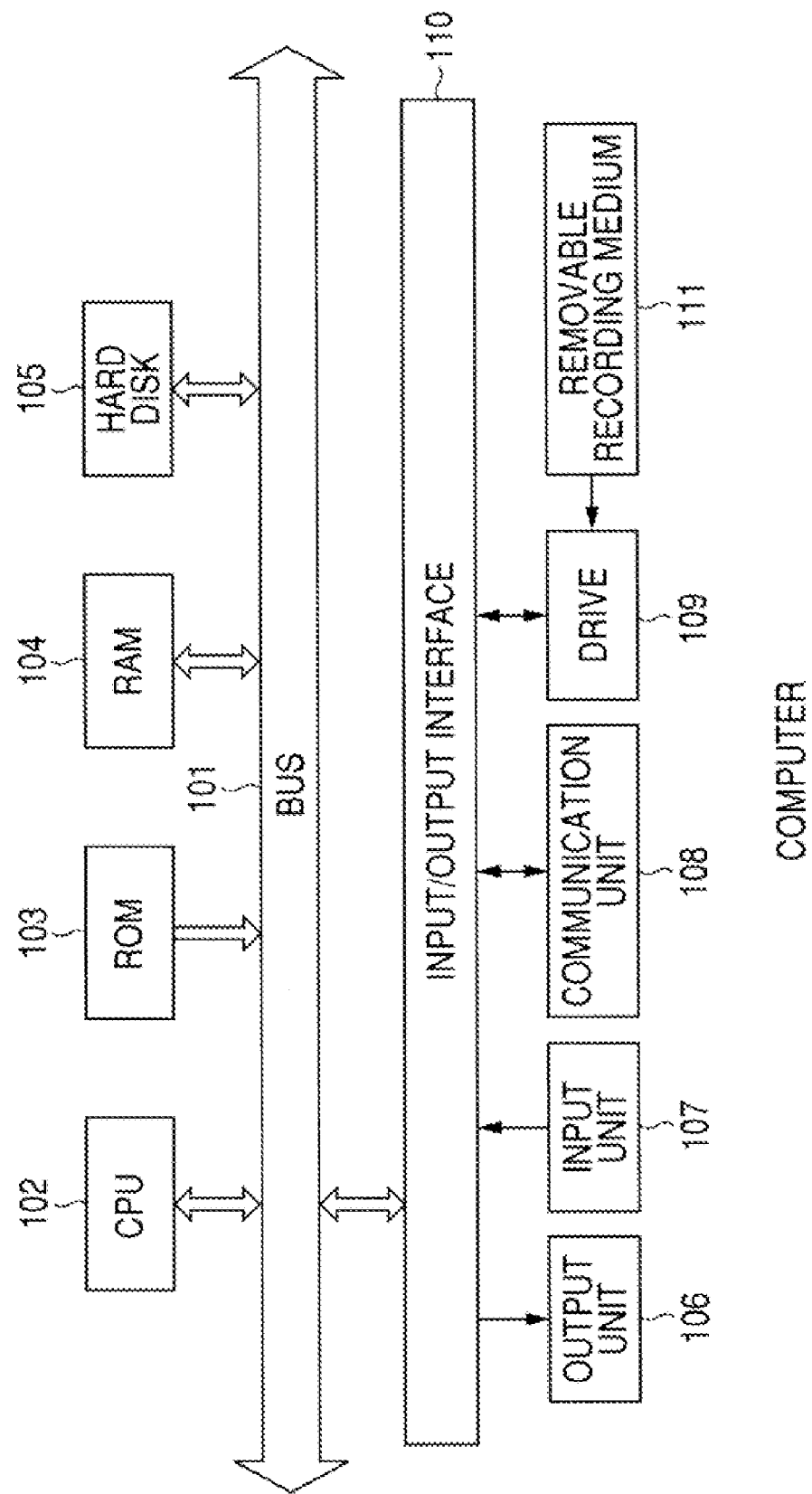
FIG. 26 is a block diagram showing an example of a structure of a computer according to an embodiment of the present invention.

FIG. 26 shows an example of a structure of a computer according to an embodiment of the present invention in which the computer program for executing the series of processing is installed.

It is possible to record the computer program in a hard disk 105 and a ROM 103, which are recording media built in the computer, in advance.

Alternatively, it is possible to temporarily or permanently store (record) the computer program in a removable recording medium 111 such as a flexible disk, a CD-ROM (Compact Disc Read Only Memory), an MO (Magneto Optical) disk, a DVD (Digital Versatile Disc), a magnetic disk, or a semiconductor memory. It is possible to provide such a removable recording medium 111 as so-called package software.

Other than installing the computer program in the computer from the removable recording medium 111 described above, it is also possible to transfer the computer program from a download site to the computer by radio through an artificial satellite for a digital satellite broadcast or transfer the computer program from the download site to the computer by wire through a network such as a LAN (Local Area Network) or the Internet. The computer can receive the computer program transferred in a communication unit 108 and install the computer program in the hard disk 105 built therein.

The computer has a CPU (Central Processing Unit) 102 built therein. An input/output interface 110 is connected to the CPU 102 through a bus 101. When the user inputs a command by operating an input unit 107 including a keyboard, a mouse, and a microphone through the input/output interface 110, the CPU 102 executes the computer program stored in the ROM (Read Only Memory) 103. Alternatively, the CPU 102 loads the computer program stored in the hard disk 105, the computer program transferred through the satellite or the network, received by the communication unit 108, and installed in the hard disk 105, or the computer program read out from the removable medium 111 inserted in a drive 109 and installed in the hard disk 105 to a RAM (Random Access Memory) 104 and executes the computer program. Consequently, the CPU 102 performs the processing conforming to the flowcharts described above or the processing performed by the components in the block diagrams described above. For example, the CPU 102 outputs a result of the processing from an output unit 106 including an LCD (Liquid Crystal Display) and a speaker, transmits the result from the communication unit 108, or record the result in the hard disk 105 through the input/output interface 110 when necessary.

In this specification, processing steps describing the computer program for causing the computer to perform various kinds of processing do not always have to be processed in time series according to the order described as the flowcharts. The processing steps also include processing executed in parallel or individually (e.g., parallel processing or processing executed according to an object).

The computer program may be a computer program processed by one computer or may be a computer program distributedly processed by plural computers. Moreover, the computer program may be a computer program transferred to a remote computer and executed.

The present invention applied to the digital still camera has been explained. However, it is also possible to apply the present invention to image processing apparatuses that process images such as a digital video camera other than the digital still camera.

In this embodiment, an output, image is generated using the photographed images of the Bayer array. However, it is also possible to generate an output image using photographed images of other color arrays.

In this embodiment, an output image is generated, using the photographed images of the Bayer array that has one kind of color signal as a pixel value for one pixel. However, it is also possible to generate an output image using photographed images that have plural kinds of color signals as pixel values for one pixel.

In other words, it is possible to generate an output image according to, for example, interpolation performed by using color signals of kinds identical with color signals to be obtained as pixel values of output pixels of photographed images obtained by 3CCD imaging device that outputs three color signals, an R signal, a G signal, and a B signal, for one pixel.

In this embodiment, the processing for generating one output image from plural, photographed images is performed as the image generation processing in step S4 in FIG. 3. However, according to the image generation processing, it is also possible to per form processing for generating one output image from one photographed image, i.e., for example, mosaic processing for changing, according to interpolation, one photographed image, a color array of which is the Bayer array, having any one of R, G, and B signals as a pixel value for one pixel to an image having all the R, G, and B signals as pixel values for one pixel.

Moreover, in this embodiment, in the edge determination, it is determined which of the five directions (the five patterns), i.e., no edge (the pixel of interest is the non-edge pixel), the horizontal direction, the vertical direction, the left oblique direction, and the right oblique direction, an edge direction in the pixel of interest is. It is possible to adopt an arbitrary direction as a direction determined as the edge direction in the edge determination.

Embodiments of the present invention are not limited to the embodiment described above. Various modifications of the embodiment are possible without departing from the spirit of the present invention.

It should be understood by those skilled in the art that various modifications, combinations, sub-combinations, and alterations may occur depending on design requirements and other factors insofar as they are within the scope of the appended claims or the equivalents thereof.

What is claimed is:

1. An image processing apparatus that generates an output image according to interpolation performed by using an input image, the image processing apparatus comprising:
    pixel value calculation means for calculating a pixel values of a pixel of the output image according to interpolation performed by using pixel values of pixel of the input image and a interpolation function;
    edge determining means for determining an edge direction, which is a direction of an edge in the pixel of the output image, using the input image; and
    adjusting means for adjusting the interpolation function such that a degree of pixels of the input image present is a direction along the edge direction contributing to the interpolation is large and a degree of pixels of the input image present in a direction orthogonal to the edge direction contributing to the interpolation is small.

2. An image processing apparatus according to claim 1, wherein the pixel-value calculating means calculates, assuming respective plural direction as the edge direction, interpolation values for the respective plural directions assumed as the edge direction according to interpolation performed by using the interpolation function adjusted for the directions assumed as the edge direction and calculates, on the basis of a degree of the edge direction in the pixel of the output image being a predetermined direction among the plural directions, a pixel value of the pixel of the output image by blending the interpolation values calculated for the plural directions.

3. An image processing apparatus according to claim 1, wherein
    the edge determining means calculates, for respective plural direction, edge degrees indicating degrees of the edge direction being a predetermined direction, and
    the adjusting means adjust, when any one of the edge degrees for the respective plural directions is equal to or larger than a predetermined threshold, with a direction of the edge degree equal to or larger than the predetermined threshold set as the edge degree, the interpolation function such that a degree of the pixels of the input image present in the direction along the edge direction contributing to the interpolation is large and a degree of the pixels of the input image present in the direction orthogonal to the edge direction contributing to the interpolation is small and adjusts, when the edge degrees for the respective plural directions are smaller than the predetermined threshold, the interpolation function such that a degree of pixels of the input image present around the pixel of the output image contributing to the interpolation is large.

4. An image processing apparatus according to claim 1, further comprising:
    detecting means for detecting a position relation among plural input images continuously photographed by imaging means for photographing an image,
    wherein the adjusting means adjust the interpolation function such that, among pixels of the plural input images after positioning obtained by performing positioning of the plural input images on the basis of the positional relating, a degree of pixels present in the direction along the edge direction contributing to the interpolation is large and a degree of pixels present in the direction orthogonal to the edge direction contributing to the interpolation is small, and
    the pixel-value calculating means calculates a pixel value of the pixel of the output image according to interpolation performed by using pixel values of the pixels of the plural input images and the interpolation function.

5. An image processing method of generating an output image according to interpolating performed by using an input image, the image processing method comprising the steps of:

calculating a pixel value of a pixel of the output image according to interpolating performed by using pixel values of pixels of the input image and an interpolating function;

determining an edge direction, which is a direction of an edge in the pixel of the output image, using the input image; and adjusting the interpolation function such that a degree of pixels of the input image present in a direction along the edge directing contributing to the interpolating is large and a degree of pixels of the input image present in a direction orthogonal to the edge directing contributing to the interpolation is small.

6. A computer program for causing a computer to execute image processing for generating an output image according to interpolation performed an output image according to program causing the computer to execute image processing comprising:

a pixel-value calculating step of calculating a pixel value of a pixel of the output image according to interpolating performed by using pixel values of pixels of the input image and an interpolating function;

an edge determining step of determining an edge direction, which is a directing of an edge in the pixel of the output image, using the input image; and an adjusting step of adjusting the interpolation function such that a degree of pixels of the input image present in a directing along the edge direction contributing to the interpolation is large and a degree of pixels of the input image present in a directing orthogonal to the edge direction contributing to the interpolation is small.

7. An image processing apparatus that generates an output image according to interpolating performed by using an input image, the image processing apparatus comprising:

a pixel-value calculating unit calculating a pixel value of a pixel of the output image according to interpolation performing by using a pixel values of pixels of the input image and an interpolation function;

an edge determining unit determining the interpolation function which is a direction of an edge in the pixel of the output image, using the input image; and an adjusting unit adjusting the interpolation function such that a degree of pixels of the input image present in a direction along the edge direction contributing to the interpolating is large and a degree of pixels of the input image present in a direction orthogonal to the edge direction contributing to the interpolation is small.

* * * * *